United States Patent
Sun et al.

(10) Patent No.: US 11,218,967 B2
(45) Date of Patent: Jan. 4, 2022

(54) METHOD AND APPARATUS FOR DETECTING INDICATION INFORMATION, AND METHODS AND DEVICES FOR RELAYING TRANSMISSION

(71) Applicant: Samsung Electronics Co., Ltd., Suwon-si (KR)

(72) Inventors: Feifei Sun, Beijing (CN); Miao Zhou, Beijing (CN); Jingxing Fu, Beijing (CN); Di Su, Beijing (CN); Chen Qian, Beijing (CN); Yingjie Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/149,562

(22) Filed: Jan. 14, 2021

(65) Prior Publication Data
US 2021/0144641 A1    May 13, 2021

Related U.S. Application Data

(63) Continuation of application No. 16/626,989, filed as application No. PCT/KR2018/008716 on Jul. 31, 2018.

(30) Foreign Application Priority Data

Jul. 31, 2017 (CN) .......................... 201710638659.3
Nov. 14, 2017 (CN) .......................... 201711122708.4
(Continued)

(51) Int. Cl.
*H04W 52/02* (2009.01)
*H04W 72/04* (2009.01)

(52) U.S. Cl.
CPC .... *H04W 52/0229* (2013.01); *H04W 52/0216* (2013.01); *H04W 72/042* (2013.01); *H04W 72/0446* (2013.01)

(58) Field of Classification Search
CPC .......... H04W 52/0229; H04W 72/042; H04W 52/0216; H04W 72/0446; H04W 48/12;
(Continued)

(56) References Cited

U.S. PATENT DOCUMENTS

2012/0275364 A1   11/2012   Anderson et al.
2014/0269480 A1*   9/2014   Han ..................... H04W 76/28
                                                        370/311
(Continued)

FOREIGN PATENT DOCUMENTS

CN    103428809 B    5/2017
EP    2621242 A1     7/2013
(Continued)

OTHER PUBLICATIONS

Qualcomm Incorporated, R1-1708802, Efficient monitoring of DL control channels, 3GPP TSG RAN WG1 #89, 3GPP (May 6, 2017) See sections 2, 4 and figures 1-3, 11. (Year: 2017).*
(Continued)

*Primary Examiner* — Marcos L Torres

(57) ABSTRACT

The present disclosure discloses a method for detecting indication information, including: determining a carrier/narrowband position and a time-domain position where indication information is located; in which the indication information is configured to indicate whether a user equipment (UE) monitors a paging message or a downlink control channel that indicates the paging message, on associated one or more paging occasions (POs); and detecting the indication information on the determined carrier/narrowband position and the time-domain position, and determining, accord-
(Continued)

```
┌─────────────────────────────────────────────┐
│ Determine a carrier/narrowband position and │
│ a time-domain position where indication     │── 101
│ information is located                      │
└─────────────────────────────────────────────┘
                      │
                      ▼
┌─────────────────────────────────────────────┐
│ Detect the indication information on the    │
│ determined carrier/narrowband position and  │
│ the time-domain position, and determine,    │
│ according to the indication information,    │── 102
│ whether to monitor the paging message or    │
│ the downlink control channel on the one or  │
│ more POs                                    │
└─────────────────────────────────────────────┘
``` ing to the indication information, whether to monitor the paging message or the downlink control channel on the one or more POs.

12 Claims, 27 Drawing Sheets

(30) Foreign Application Priority Data

Nov. 28, 2017 (CN) .......................... 201711218850.9
Jan. 25, 2018 (CN) .......................... 201810074927.8

(58) Field of Classification Search
CPC . H04W 76/28; H04W 68/00; H04W 72/0493; H04W 84/047; H04W 24/08; Y02D 30/70; H04L 12/2803
See application file for complete search history.

(56) References Cited

U.S. PATENT DOCUMENTS

| | | | |
|---|---|---|---|
| 2019/0141672 A1 | 5/2019 | Zhu et al. | |
| 2020/0029302 A1 | 1/2020 | Cox et al. | |
| 2020/0107294 A1 | 4/2020 | Ji et al. | |
| 2020/0137824 A1* | 4/2020 | Ingale | H04W 72/0406 |
| 2020/0229092 A1* | 7/2020 | Wu | H04W 76/11 |

FOREIGN PATENT DOCUMENTS

| | | |
|---|---|---|
| WO | 2016/146147 A1 | 9/2016 |
| WO | 2016184401 A1 | 11/2016 |

OTHER PUBLICATIONS

Guangdong OPPO Mobile Telecom, R1-1707690, Considerations on the DL power consumption reduction for feNB-IoT, 3GPP (May 6, 2017) See section 2. (Year: 2017).*
Nokia et al., R1-1708072, Signalling for efficient decoding of physical channels, 3GPP TSG RAN WG1 #89, 3GPP (May 6, 2017) See sections 2.1, 2.3. (Year: 2017).*
Samsung, R1-1709284, DL power consumption reduction for eMTC, 3GPP TSG RAN WG1 #89, 3GPP (May 16, 2017) See section 3 and figure 2. (Year: 2017).*
ISA/KR, International Search Report and Written Opinion of the International Searching Authority, International Application No. PCT/KR2018/008716, dated Nov. 28, 2018, 11 pages.
Ericsson, "Power consumption reduction for paging and connected-mode DRX for NB-IoT," R1-1706887, 3GPP TSG-RAN WG1 #89, Hangzhou, P.R. China, May 15-19, 2017, 5 pages.
Guangdong Oppo Mobile Telecom, "Considerations on the DL power consumption reduction for feNB-IoT," R1-1707690, 3GPP TSG-RAN WG1 #89, Hangzhou, P.R. China, May 15-19, 2017, 3 pages.
Intel Corporation, "Analysis of impact of Wake-up signaling on power consumption and resource efficiency for feNB-IoT," R1-1707319, 3GPP TSG-RAN WG1 #89, Hangzhou, P.R. China, May 15-19, 2017, 7 pages.
Nokia, et al., "Signalling for efficient decoding of physical channels," R1-1708072, 3GPP TSG RAN WG1 Meeting #89, Hangzhou, P.R. China, May 15-19, 2017, 6 pages.
Qualcomm Incorporated, "Efficient monitoring of DL control channels," R1-1708802, 3GPP TSG RAN WG1 Meeting #89, Hangzhou, P.R. China, May 15-19, 2017, 10 pages.
Supplementary European Search Report in connection with European Application No. 18841621.8 dated Mar. 23, 2020, 10 pages.
Non-Final Office Action dated Apr. 1, 2021 in connection with U.S. Appl. No. 16/626,989, 9 pages.
Intellectual Property India, "Examination report under sections 12 & 13 of the Patents Act" dated Mar. 12, 2021, in connection to Indian Patent Application No. 201927050108, 6 pages.
European Patent Office, "European Search Report", dated Apr. 15, 2021, in connection with European Patent Application No. 21150611.8, 9 pages.

* cited by examiner

METHOD AND APPARATUS FOR DETECTING INDICATION INFORMATION, AND METHODS AND DEVICES FOR RELAYING TRANSMISSION

CROSS-REFERENCE TO RELATED APPLICATIONS

This application is a continuation of application Ser. No. 16/626,989, which is the 371 National Stage of International Application No. PCT/KR2018/008716, filed Jul. 31, 2018, which claims priority to Chinese Patent Application No. 201710638659.3, filed Jul. 31, 2017, Chinese Patent Application No. 201711122708.4, filed Nov. 14, 2017, Chinese Patent Application No. 201711218850.9, filed Nov. 28, 2017, and Chinese Patent Application No. 201810074927.8, filed Jan. 25, 2018, the disclosures of which are herein incorporated by reference in their entirety.

BACKGROUND

1. Field

The present disclosure relates to radio communication systems, and particularly to a method and apparatus for detecting indication information, and a method and device for relay transmission.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

To meet the requirements of the communication rate and the communication quality, the terminal and the base station need to perform transmission through the relay technology to ensure the information interaction between the terminal and the base station, to improve the coverage expansion of the cell, the cell capacity, and the uniformization of the cell throughput. Therefore, how to implement relay transmission becomes a key issue.

The present application provides a method for detecting indication information, which includes the following. A determination unit is configured to determine a carrier/narrowband position and a time-domain position where indication information is located, wherein the indication information is configured to indicate whether a user equipment (UE) monitors a paging message or a downlink control channel that indicates the paging message on associated one or more paging occasions (POs). And a detection unit is configured to detect the indication information on the determined carrier/narrowband position and the time-domain position, and determine, according to the indication information, whether to monitor the paging message or the downlink control channel on the associated one or more POs.

By the method of the present application, power saving may be effectively achieved for user equipments.

DETAILED DESCRIPTION

Figure 1:
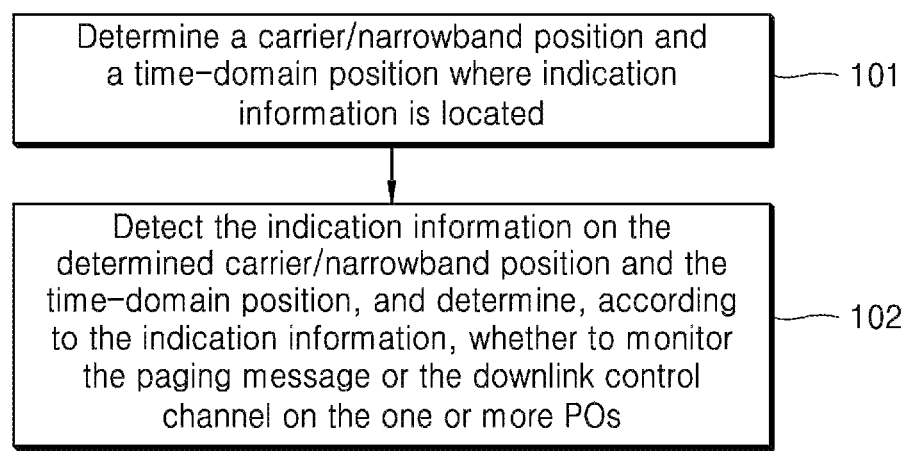
FIG. 1 is a schematic diagram of a basic flow of a method for detecting indication information according to an embodiment of the present disclosure.

The present disclosure discloses a method for detecting indication information, so as to effectively achieve power saving for user equipments.

To achieve the above object, embodiments of the present disclosure provide the following technical solutions:

A method for detecting indication information includes:

determining a carrier/narrowband position and a time-domain position where indication information is located; in which the indication information is configured to indicate whether a user equipment (UE) monitors a paging message or a downlink control channel that indicates the paging message on associated one or more paging occasions (POs); and detecting the indication information on the determined carrier/narrowband position and the time-domain position, and determining, according to the indication information, whether to monitor the paging message or the downlink control channel on the associated one or more POs.

Preferably, the determining a carrier/narrowband position where indication information is located includes:

determining that the carrier/narrowband position is a predefined carrier/narrowband position; or determining that the carrier/narrowband position is a carrier/narrowband where the paging message or the downlink control channel is located; or determining the carrier/narrowband position according to configuration information from a base station.

Preferably, the predefined carrier/narrowband position is an anchor carrier; and/or the determining the carrier/narrowband position according to configuration information from a base station includes: according to the configuration information, determining whether the carrier/narrowband position is a predefined carrier/narrowband or the carrier/narrowband where the paging message or the downlink control channel is located; or determining the carrier/narrowband position configured by the base station as the carrier/narrowband position where the indication information is located.

Preferably, the determining a time-domain position where indication information is located includes:

determining the time-domain position according to a period of the indication information; and/or determining a position or a starting position where the downlink control channel or the paging message is located, and then determining the time-domain position according to the position or the starting position where the downlink control channel or the paging message is located.

Preferably, one piece of indication information is present before each paging message or each group of paging messages or each downlink control channel or each group of downlink control channels; in which each piece of indication information is configured to indicate whether all UEs corresponding to the paging message or the downlink control channel perform monitoring on a PO or POs corresponding to the UEs; or each piece of indication information is configured to indicate whether all UEs corresponding to a group of paging messages or a group of downlink control channels perform monitoring on a group of POs corresponding to the UEs.

Preferably, more than one piece of indication information is present before each paging message or each downlink control channel, in which each of the more than one piece of indication information is configured to indicate whether a subset of UEs among a group of UEs corresponding to one piece of paging message or one downlink control channel perform monitoring on a PO or POs corresponding to the subset of UEs.

Preferably, one piece of indication information is present before each paging radio frame; in which each piece of indication information is configured to indicate whether all UEs corresponding to a paging radio frame perform monitoring on a PO or POs corresponding to the UEs corresponding to the paging radio frame; or each piece of indication information is configured to indicate whether all UEs corresponding to a group of paging radio frames perform monitoring on a PO corresponding to the UEs corresponding to the group of paging radio frames.

Preferably, more than one piece of indication information is present before each paging radio frame, in which each piece of indication information is configured to indicate whether a subset of UEs among a group of UEs corresponding to the paging radio frame perform monitoring on a PO corresponding to the subset of UEs.

Preferably, the time-domain position of the indication information is a system frame, a subframe and/or a time slot occupied to transmit the indication information.

Preferably, the determining the time-domain position according to a period of the indication information includes:

determining a system frame number (SFN) of a start or end system frame where the indication information is located according to the period of the indication information, and then determining subframe position information of the indication information.

Preferably, the determining the time-domain position according to a period of the indication information includes:

determining a start or end SFN and/or a start or end subframe position of the indication information according to the period of the indication information; or determining the start or end SFN where the indication information is located according to the period of the indication information, then determining the start or end subframe position of the indication information, and determining the time-domain position according to the start or end SFN and the start or end subframe position; or determining a SFN where the indication information is located according to the period of the indication information, then determining information of a subframe actually occupied by the indication information, and then determining the time-domain position according to the SFN and the information of the subframe actually occupied; or determining the start or end SFN where the indication information is located according to the period of the indication information, then determining the start or end subframe position of the indication information and the information of the subframe actually occupied by the indication information, and then determining the time-domain position according to the start or end SFN, the start or end subframe position and the information of the subframe actually occupied.

Preferably, the determining the start or end SFN where the indication information is located according to the period of the indication information includes: determining the start or end SFN according to the period of the indication information and an offset configured by the base station.

Preferably, the determining the start or end subframe position of the indication information according to the period of the indication information includes: determining the start or end subframe position according to the period of the indication information and the offset configured by the base station.

Preferably, the period of the indication information is determined according to a discontinuous reception (DRX) period of paging, or the period of the indication information and the DRX period of paging are configured independently from each other.

Preferably, the indication information being configured to indicate whether the UE monitors the paging message or the downlink control channel that indicates the paging message on the one or more POs includes: indication information that is located before a PO, that has a distance satisfying a guard period to the PO, and that is closest to the PO is configured to indicate whether the paging message or the downlink control channel is present on the PO or multiple POs subsequent to the PO.

Preferably, when the time-domain position is determined according to the indication information, a time gap between the time-domain position of the indication information and a PO position indicated by the indication information is larger than or equal to a predefined guard period.

Preferably, the determining the time-domain position according to the position or the starting or ending position where the downlink control channel or the paging message is located includes: determining the time-domain position according to the position or the starting position where the downlink control channel or the paging message is located and time-domain resource information of the indication information; or determining subframe position information of the indication information, and determining the time-domain position according to the subframe position information and the position or the starting position where the downlink control channel or the paging message is located.

Preferably, the determining the time-domain position according to the position or the starting position where the downlink control channel or the paging message is located includes:

determining a start or end subframe position of the indication information, and determining the time-domain position according to the position or the starting position where the downlink control channel or the paging message is located and the start subframe position; or determining information of a subframe actually occupied by the indication information, and determining the time-domain position according to the position or the starting position where the downlink control channel or the paging message is located and the information of the subframe actually occupied; or determining the start or end subframe position of the indication information and the information of the subframe actually occupied by the indication information, and determining the time-domain position according to the position or the starting position where the downlink control channel or the paging message is located, the start or end subframe position and the information of the subframe actually occupied.

Preferably, the time-domain resource information of the indication information includes one or more pieces of the following information: a number of repetitions of the indication information, a time duration occupied by the indication information, and a relative distance between the indication information and the position or the starting position where the downlink control channel or the paging message is located; and/or the time-domain resource information of the indication information is configured to the UE by the base station, or predefined.

Preferably, the number of repetitions of the indication information is determined according to a value Rmax configured by the system, and the value Rmax is the maximum number of repetitions of a search space of the downlink control channel.

Preferably, the number of repetitions of the indication information is determined according to the maximum number of repetitions of the indication information measured by the UE and/or configured by the base station.

Preferably, the subframe position information of the indication information is a start or end subframe position of the indication information and/or information of a subframe actually occupied by the indication information.

Preferably, the determining the start or end subframe position of the indication information includes: calculating the start or end subframe position according to a predefined rule; or the start or end subframe position of the indication information is a subframe position predefined or configured by the base station.

Preferably, the information of the subframe actually occupied by the indication information is a downlink valid subframe, or a specified downlink invalid subframe.

Preferably, the method further includes: when the UE has a timing offset, calculating a SFN and a subframe index where the indication information is detected, and according to the SFN and the subframe index calculated, performing timing synchronization.

Preferably, the method further includes: measuring a channel state measurement value including reference signal receiving power (RSRP) or reference signal receiving quality (RSRQ) or received signal strength indication (RSSI) of the carrier/narrowband where the indication information is located according to a received channel or a signal carrying the indication information; and/or the method further includes: performing channel estimation with the received indication information on the carrier/narrowband where the indication information is located; and/or the method further includes: determining a carrier/narrowband position and a time-domain position where indication information of a neighboring cell is located, and determining a channel state of the neighboring cell according to the received indication information of the neighboring cell.

Embodiments of the present disclosure provide an apparatus for detecting indication information, including: a determination unit and a detection unit, in which the determination unit is configured to determine a carrier/narrowband position and a time-domain position where indication information is located; in which the indication information is configured to indicate whether a user equipment (UE) monitors a paging message or a downlink control channel that indicates the paging message on associated one or more paging occasions (POs); and the detection unit is configured to detect the indication information on the determined carrier/narrowband position and the time-domain position, and determine, according to the indication information, whether to monitor the paging message or the downlink control channel on the associated one or more POs.

As can be seen from the above technical solutions, in the present disclosure, a carrier/narrowband position and a time-domain position where indication information is located are determined; in which the indication information is configured to indicate whether a UL monitors a paging message or a downlink control channel that indicates the paging message on one or more POs. Then the indication information is detected on the determined carrier/narrowband position and the time-domain position, and whether to monitor the paging message or the downlink control channel on the one or more POs is determined according to the indication information. By introducing the indication information, it is not necessary to keep on monitoring a downlink control channel or decoding paging messages, but only monitor a downlink control channel and decoding a paging message when necessary, and thus the power saving of the device is effectively achieved.

To overcome or at least partially solve the technical problem of how to implement relay transmission, the following technical solutions are particularly provided.

Embodiments of the present disclosure provide a method for relay transmission, executed by a first user equipment (UE), including:

receiving configuration information transmitted by a base station, wherein, the configuration information is used for receiving information of a second UE;

receiving the information of the second UE according to the configuration information; and forwarding the received information of the second UE.

The configuration information includes at least one of the followings:

identify of the second UE, radio network temporary identifier (RNTI) information of the second UE, physical downlink control channel configuration information of the second UE, physical downlink control channel configuration information of the first UE, shared channel configuration information of the first UL, and shared channel configuration information of the second UE;

in which, the physical downlink control channel (PDCCH) configuration information includes at least one of the followings: a physical downlink control channel search space type, a maximum repetition number Rmax, a starting subframe, an offset, valid subframes, a downlink control information (DCI) format, and physical downlink control channel resource configuration information;

the shared channel configuration information includes at least one of the followings: configuration information of a physical uplink shared channel (PUSCH), configuration information of a physical downlink shared channel (PDSCH), a transmission mode of the shared channel, reference signal information, uplink valid subframes, downlink valid subframes, and hybrid automatic repeat requests (HARQ) process parameters and a control region size within subframe.

Specifically, the receiving the information of the second UE according to the configuration information includes:

acquiring the configuration information of a physical downlink control channel of the second UE according to the configuration information, monitoring the physical downlink control channel of the second U according to the acquired physical downlink control channel configuration information of the second UE, and decoding monitored information to obtain first scheduling information, in which, the scheduling information corresponding to the shared channel of the second UE is used for indicating reception of the shared channel of the second UE, in which, the first scheduling information is used for indicating reception of the shared channel of the second UE;

receiving data information of the second UE according to the first scheduling information.

Specifically, the receiving the information of the second UE according to the configuration information includes:

acquiring the configuration information of physical downlink control channel of the first UE according to the configuration information, monitoring the physical downlink control channel of the first UE according to the acquired physical downlink control channel configuration information of the first U, and obtaining the first scheduling information by decoding;

receiving data information of the second UE according to the first scheduling information.

Specifically, the receiving the data information of the second UE according to the first scheduling information includes:

receiving uplink data information of the second UE on the physical uplink shared channel of the second UE according to the first scheduling information; and/or, receiving downlink data information of the second UE on the physical downlink shared channel of the second UE or the physical downlink shared channel of the first UE according to the first scheduling information.

Further, the uplink data information of the second U is transmitted by the second UE according to control information received from the base station, or, the uplink data information of the second UE is transmitted by the second E according to the control information forwarded by the first UE.

The forwarding the received information of the second UE includes:

receiving second scheduling information transmitted by the base station, in which, the second scheduling information is used for the first UE to forward the data information of the second UE; and forwarding the received data information of the second UE according to the second scheduling information.

Further, the data information of the second UE at the second UE is received according to the control information directly received from the base station, or, the data information of the second UE at the second UE is received according to the control information forwarded by the first UE.

Specifically, the receiving the second scheduling information transmitted by the base station, includes:

monitoring the physical downlink control channel of the second UE and/or physical downlink control channel of the first UE, and obtaining the second scheduling information by decoding.

Specifically, the monitoring the physical downlink control channel of the second UE and/or physical downlink control channel of the first UE, and obtaining the first scheduling information and the second scheduling information by decoding includes:

monitoring the physical downlink control channel of the second UE and/or the physical downlink control channel of the first UE, acquiring scheduling information of the shared channel, and determining the first scheduling information and/or the second scheduling information based on indication information in the scheduling information of the shared channel; and/or, monitoring the physical downlink control channel of the second UE and/or the physical downlink control channel of the first UE, acquiring scheduling information of the shared channel, determining the first scheduling information based on the indication information in the scheduling information of the shared channel, and determining the second scheduling information based on the first scheduling information and any one of predefined relay transmission configuration information and a predefined mapping relationship; and/or, monitoring the physical downlink control channel of the second UE and/or the physical downlink control channel of the first UE, acquiring scheduling information of the shared channel, determining the second scheduling information based on the indication information in the scheduling information of the shared channel, and determining the first scheduling information based on corresponding scheduling information for forwarding the data information of the second UE and any one of predefined relay transmission configuration information and a predefined mapping relationship.

The predefined mapping relationship is a mapping relationship between scheduling information corresponding to the shared channel of the second UE and corresponding scheduling information for forwarding the data information of the second UE.

Specifically, the monitoring the physical downlink control channel of the second UE and/or the physical downlink control channel of the first TE, and obtaining the first scheduling information and/or the second scheduling information by decoding includes:

monitoring a UE-specific search space of the first UE and/or a UE-specific search space of the second UE, and performing blind detection by the RNTI of the first UE and/or the RNTI of the second UE;

if the blind detection succeeds, obtaining the scheduling information corresponding to the physical uplink shared channel and/or the scheduling information corresponding to the physical downlink shared channel by decoding;

determining the scheduling information being used to schedule the first UE and/or the second UE, by at least one of an RNTI used for the blind detection, a corresponding search space for receiving the scheduling information, and an information bit carried in the scheduling information;

determining the first scheduling information and/or the second scheduling information based on the determined scheduling information for scheduling the first UE and/or the second UE.

Specifically, the monitoring the UE-specific search space of the first UE and/or the UTE-specific search space of the second UE, and performing blind detection by the RNTI of the first UE and/or the RNTI of the second UE, includes:

monitoring the UE-specific search space of the first UE, and performing blind detection by the RNTI of the first UE; and/or, monitoring the UE-specific search space of the first TE, and performing blind detection by the RNTI of the first TE and the RNTI of the second UE; and/or, monitoring the UE-specific search space of the first UE and the UE-specific search space of the second UE, and performing blind detection by the RNTI corresponding to the search space respectively; and/or, monitoring the UE-specific search space of the first UE and the UE-specific search space of the second UE, and performing blind detection by the RNTI of the second UE and the RNTI of the first UE in each UE-specific search space.

Further, the method further includes: when acquiring more than one corresponding piece of scheduling information for forwarding the data information of the second UE and/or more than one piece of scheduling information corresponding to the shared channel of the second UE, determining a mapping relationship between the corresponding scheduling information for forwarding the shared channel of the second UE and the scheduling information corresponding to each shared channel of the second UE according to a predefined mapping rule, wherein the predefined mapping rule is a mapping rule between the corresponding scheduling information for forwarding the data information of the second UE and the scheduling information corresponding to the shared channel of the second UE.

Specifically, the forwarding the received information of the second UE includes:

adding a medium access control (MAC) header or radio link control (RLC) header before the received data information of the second TE; and forwarding the data information of the second UE after adding the header.

Specifically, the receiving the information of the second UE according to the configuration information includes:

acquiring the physical downlink control channel configuration information of the second UE and/or physical downlink control channel configuration information of the first UE according to the configuration information;

monitoring the physical downlink control channel of the first UE and/or physical downlink control channel of the second UE according to the acquired physical downlink control channel configuration information of the second UE and/or physical downlink control channel configuration information of the first UE; and obtaining the DCI of the second UE by decoding;

in which, the forwarding the received information of the second UE includes:

forwarding the DCI of the second UE to the second UE on the physical downlink control channel of the second UE.

Further, after the receiving the configuration information transmitted by the base station, the method further includes:

deciding whether the control information, which is obtained by decoding according to configuration information, is used for scheduling the first UE and/or the second UE according to at least one of the following information:

information bit carried in the control information, scrambling RNTI of the control information, and a search space for decoding the control information.

The contents carried in the information bit includes at least one of the followings: identify of the first UE identify of the second UE, the RNTI of the first UE the RNTI of the second UE and identification information of a mapping relationship between the first UE and the second UE.

Further, the method further includes: when the first UE performs forwarding, changing the forwarded message content and/or information bits.

Further, the first UE reports at least one of the following capabilities to the base station:

capability of receiving on the uplink frequency band or uplink subframe;

capability of transmitting on the downlink frequency band or downlink subframe;

capability of full-duplex.

Embodiments of the present disclosure provide a method for relay transmission, including:

transmitting configuration information to a first user equipment (UE) by a base station;

transmitting, by the base station, information of a second UE to the second UE through the first UE according to the configuration information; and/or, receiving, by the base station, the information of the second UE forwarded by the first UE according to the configuration information;

in which, the configuration information is used for forwarding the information of the second UE at the first UE.

The configuration information includes at least one of the followings:

identify of the second UE, RNTI information of the second UE, physical downlink control channel configuration information of the second UE, physical downlink control channel configuration information of the first UE, shared channel configuration information of the first UE, and shared channel configuration information of the second UE;

in which, the physical downlink control channel configuration information includes at least one of the followings: a physical downlink control channel search space type, a maximum repetition number Rmax, a starting subframe, an offset, valid subframes, a downlink control information (DCI) format, and physical downlink control channel resource configuration information;

the shared channel configuration information includes at least one of the followings: configuration information of a physical uplink shared channel, configuration information of a physical downlink shared channel, a transmission mode of a shared channel, reference signal information, uplink valid subframes, downlink valid subframes, and HARQ process parameters and a control region size within subframe.

Specifically, the transmitting, by the base station, the information of the second UE to the second UE through the first UE according to the configuration information, includes:

transmitting, by the base station, control information and data information of the second UE to the second UE through the first UE according to the configuration information; or, transmitting, by the base station, the control information to the second UE according to the configuration information, and transmitting, by the base station, the data information of the second UE to the second UE through the first UE.

Specifically, the receiving, by the base station, the information of the second UE forwarded by the first UE according to the configuration information includes:

transmitting, by the base station, the control information of the second UE to the second UE through the first UE according to the configuration information, and receiving, by the base station, the data information of the second UE that is forwarded by the first UE; or, transmitting, by the base station, the control information to the second UE according to the configuration information, and receiving, by the base station, the data information of the second UE that is forwarded by the first UE.

Specifically, the transmitting, by the base station, the data information of the second UE to the second UE through the first UE includes:

transmitting second scheduling information and first scheduling information to the first UE on a physical downlink control channel of the second UE and/or a physical downlink control channel of the first UE by the base station according to the configuration information, in which the first scheduling information is used for indicating reception of the shared channel of the second UE, the second scheduling information is used for the first UL to forward data information of the second UE;

transmitting the data information of the second UE to the second UE through the first UE based on the second scheduling information and the first scheduling information.

Specifically, the transmitting, by the base station, the control information of the second UE to the second UE through the first UE includes:

transmitting, by the base station, the control information of the second UE to the second UE through the first UE on the physical downlink control channel of the second UE and/or the physical downlink control channel of the first UE according to the configuration information.

Specifically, the receiving, by the base station, the data information of the second UE forwarded by the first UE includes:

transmitting, by the base station, the second scheduling information and the first scheduling information to the first UE on the physical downlink control channel of the second UE and/or the physical downlink control channel of the first UE according to the configuration information, in which the first scheduling information is used for indicating reception of the shared channel of the second UE, the second scheduling information is used for the first UE to forward data information of the second UE;

receiving the data information of the second UE that is forwarded by the first UE based on the second scheduling information and the first scheduling information.

The method further includes: the base station indicates scheduling information transmitted in the physical downlink control channel is used for scheduling the first UE and/or scheduling the second UE, by using at least one of the following manners:

scrambling the physical downlink control channel by using the RNTI in the configuration information;

transmitting a DCI on a search space of the first UE and/or a search space of the second UE according to the physical downlink control channel configuration information of the first UE or the second UE in the configuration information;

generating information bits in the DCI carried by the physical downlink control channel according to a predefined rule, in which the content carried in the information bit includes at least one of the followings: an identity of the first UE, an identity of the second TE, RNTI of the first UE, RNTI of the second UE, and identification information of a mapping relationship between the first UE and the second UE.

Specifically, the receiving, by the base station, the information of the second UE that is forwarded by the first UE and/or the information that is transmitted by the second UE, according to the configuration information, includes:

transmitting, by the base station, a DCI to the first UE on the physical downlink control channel of the second UE and/or the physical downlink control channel of the first UE according to the configuration information, in which the DCI is the scheduling information used for indicating the second UE to transmit information; and/or, transmitting, by the base station, a DCI to the second E on the physical downlink control channel of the second UE according to the configuration information, in which the DCI is the scheduling information used for indicating the second UE to transmit information; and/or, receiving, by the base station, the information transmitted by the second UE according to the scheduling information.

The method further includes: scrambling, by the base station, the uplink grant message corresponding to the uplink data of the second UE and/or the downlink grant message corresponding to the downlink data of the second UE by the RNTI of the second UE and/or the RNTI of the first UE; and, transmitting, by the base station, according to the physical downlink control channel configuration information, the scrambled uplink grant message corresponding to the uplink data of the second FE and/or the scrambled downlink grant message corresponding to the downlink data of the second FE in the corresponding physical downlink control channel of the second UE and/or the physical downlink control channel of the first TE, in which, the uplink grant message carries the scheduling information corresponding to the uplink data of the second UE, and the downlink grant message carries the scheduling information corresponding to the downlink data of the second UE.

The method further includes:

transmitting the uplink grant message of the uplink data which is needed to be forwarded by the first UE and/or the downlink grant message of the downlink data which is needed to be forwarded by the first UE in the physical downlink control channel of the first UE, according to the physical downlink control channel configuration information of the first UE; and/or, transmitting the uplink grant message of the uplink data which is needed to be forwarded by the first UE and/or the downlink grant message of the downlink data which is needed to be forwarded by the first UE in the physical downlink control channel of the second UE, according to the physical downlink control channel configuration information of the second UE, in which, the uplink grant message carries the scheduling information indicating the first UE to forward the uplink data, and the downlink grant message carries the scheduling information indicating the first UE to forward the downlink data.

The method further includes:

the base station acquires scheduling information for enabling a transmission between the first UE and the second UL by at least one of the following ways:

transmitting an uplink grant message of the uplink data service of the second UE and/or a downlink grant message of the downlink data service of the second UE in the physical downlink control channel of the second UE;

transmitting an uplink grant message of the uplink data service of the second UE and/or a downlink grant message of the downlink data service of the second UE in the physical downlink control channel of the first UE;

transmitting a transmission grant message of a data service between the first UE and the second UE in a physical downlink control channel of the first LE.

The grant message is scrambled by the RNTI of the first UE or the RNTI of the second UE.

Specifically, performing an uplink reception by scheduling the first UE and/or scheduling the second UE and based on the configuration information of the data information and/or the configuration information of the control information, includes:

receiving the uplink data transmitted by the first UE on the physical uplink shared channel at the scheduled resource position according to the scheduling information forwarded by the uplink of the first UE;

in which, performing a downlink transmission by scheduling the first UE and/or scheduling the second UE and based on the configuration information of the data information and/or the configuration information of the control information, includes:

transmitting the downlink data to the first UL through the physical downlink shared channel at the scheduled resource position according to reception on the corresponding scheduling information for the downlink of the first UE.

Embodiments of the present disclosure provide a first UE, including:

a first receiving module, configured to receive configuration information transmitted by a base station, in which, the configuration information is used for receiving information of a second UE;

the first receiving module is further configured to receive information of a second UL according to the configuration information; and a forwarding module, configured to forward the information of the second UE that is received by the first receiving module.

Embodiments of the present disclosure provide a base station, including:

a transmitting module, configured to transmit configuration information to a first UE;

the transmitting module is further configured to transmit information of a second UE to the second UE through the first UE; and a second receiving module, configured to receive the information of the second UE forwarded by the first UE according to the configuration information.

The configuration information is information used for forwarding the information of the second UE at the first UE.

Embodiments of the present disclosure provide a terminal device, including: a processer; and a memory, configured to store machine readable instructions that, when executed by the processor, cause the processor to perform the method of relay transmission of the first aspect.

Embodiments of the present disclosure further provide a base station, including: a processor; and a memory configured to store machine readable instructions that, when executed by the processor, cause the processor to perform the method of relay transmission of the second aspect.

A first UE and a method of relay transmission are provided according to the present disclosure. Compared with the prior art, in the present disclosure, the first UE receives configuration information transmitted by a base station, in which the configuration information is used for receiving information of the second UE, receives the information of the second UE according to the configuration information, and forwards the received information of the second UE, so that a relay node (the first UE) can be used to perform relay transmission between the base station and a remote node (the second UE).

A base station and a method of relay transmission is provided according to the present disclosure. Compared with the prior art, in the present disclosure, the base station transmits configuration information to the first UE, and the base station transmits the information of the second UE to the second UE through a first UE according to the configuration information; and/or, the base station receives the information of the second UE forwarded by the first UE according to the configuration information, in which, the configuration information is used for forwarding the information of the second UE at the first UE, so that a relay node (the first UE) can be used to perform relay transmission between the base station and a remote node (the second UE).

Additional aspects and advantages of the present disclosure will be partially appreciated and become apparent from the descriptions below, or will be well learned from the practices of the present disclosure.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "terminal" and "terminal apparatus" as used herein compasses not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

Power consumption and battery life is very important for terminals in an internet of thing (IoT). In a narrowband IoT (NB-IoT) or an enhanced machine type communication (eMTC) system, the power of terminal devices can be saved by means of configuring a power saving mode (PSM) or an extended discontinuous reception (eDRX) mode. However, a UE is unable to listen paging messages during sleep in the PSM mode or the eDRX mode. In some IoT application scenarios, a UE is required to establish a connection with a network within a certain period of time after receiving a network command. Then the UE that has the requirement cannot be configured with the PSM mode or the eDRX mode that has a relatively long period.

In a Rel-15 NB-IoT and an enhanced version of eMTC system, to enable a UE to be paged, and meanwhile to save power, a wake-up or sleep signal/channel is introduced after study and research. The wake-up signal/channel is configured to wake up a UE, i.e., a case where the UE needs to continue to monitor a subsequent MTC physical downlink control channel (MPDCCH) that is used to indicate a paging message. The sleep signal/channel is configured to instruct that a UE may enter into a sleep state, i.e., a case where the UE does not need to monitor a subsequent MPDCCH that is used to indicate a paging message.

In a system with multiple carriers, a carrier that transmits a synchronization signal is defined as an anchor carrier, and in a Rel-13 system, a paging message is transmitted on the anchor carrier. In a Rel-14 NB-IoT system, a method for transmitting paging messages on non-anchor carriers is introduced. In the eMTC system, multiple narrowbands are defined, in which a narrowband has 6 physical resource blocks (PRBs), and the concept of paging narrowband is introduced. In addition, in the eMTC system, a downlink control channel for MTC, MPDCCH, is configured to indicate a paging message, and different UEs may monitor MPDCCHs on different narrowbands. Similarly, in an ongoing 5G new radio (NR) system, there is a situation where the bandwidth of a UE is smaller than a system bandwidth, and in this case, multiple bandwidth parts may be defined for a paging channel. For the case of multiple carriers or narrowbands or bandwidth part (BWP), it is an issue yet to be solved that how to transmit and receive a wake-up or sleep signal.

In addition, in long term evolution (LTE) technology, information exchange occurs between a base station and a terminal device. Since some terminal devices may be located far from the base station, the terminal devices cannot access to the base station or the signal is poor. To meet the requirements of the communication rate and the communication quality, the terminal and the base station need to perform transmission through the relay technology to ensure the information interaction between the terminal and the base station, to improve the coverage expansion of the cell, the cell capacity, and the uniformization of the cell throughput. Therefore, how to implement relay transmission becomes a key issue.

First, the relationship between indication information and a paging signal in the present disclosure will be explained. In the present disclosure, information transmitted by awake-up or sleep signal or channel as mentioned in the background part is referred to as indication information of a paging message, and the indication information may be used to indicate whether a user equipment (UE) needs to monitor the downlink control channel on one or multiple paging occasions (POs), or the indication information may be used to indicate whether the UE needs to monitor paging messages on one or multiple POs. In the present disclosure, the indication information may be transmitted or carried by a signal (e.g., a waveform, or a sequence) or a channel (e.g., a downlink control channel, or a new synchronization channel). The downlink control channel is used to indicate a downlink data channel (a physical downlink shared channel (PDSCH)) that carries a paging message, and for different systems, the downlink control channel and the downlink data channel may be different channels, for example, a downlink data control channel (a physical downlink control channel (PDCCH), an enhanced downlink data control channel (enhanced physical downlink control channel (EPDCCH)), a MPDCCH, a narrowband downlink control channel (narrowband physical downlink control channel (NPDCCH)) or a PDCCH of a NR, etc., or a NPDSCH. The downlink control channel and the PDSCH may be on the same carrier or the same narrowband, or may be on different carriers or different narrowbands, and a carrier or a narrowband that transmits a PDCCH or a PDSCH is referred to as a paging carrier or a paging narrowband, which may be defined in standards in advance, or may be obtained by calculation according to a predefined method. Parameters necessary for the calculation may be configured through radio resource control (RRC). For a carrier or a narrowband where the PDSCH is located, it may be indicated by means of downlink control information (DCI) besides of the foregoing method.

For different systems, the downlink control channel may be transmitted on a carrier or a narrowband. Thus, in eMTC system, the concept of paging narrowband is introduced, and a UE determines a narrowband where an MPDCCH is located according to the following formula (1), and the UE monitors the MPDCCH on the narrowband determined:

$$PNB = \text{floor}(UE\_ID/(N*Ns)) \bmod Nn \qquad (1)$$

where

N: the number of paging frames in a DRX period

Ns: the number of POs in a paging frame

Nn: the number of paging narrowbands

Nb=N*Ns: the number of POs in a DRX period.

UE_ID/(N*Ns) is to ensure that PNB is independent from paging frame (PF)/PO.

In a NB-IoT system, a downlink control channel is transmitted on a carrier, and weights on different paging carriers are further introduced. The purpose of introducing the weights is to provide a base station with enough flexibility to adjust a paging load on each carrier, especially when considering that Rel-13 NB-IoT UE and Rel-14 UE that does not support non-anchor carriers can only receive a paging channel from the anchor carrier.

The minimal n that satisfies the following formula is the paging carrier to be monitored by the UE:

$$\text{floor}(UE\_ID/(N*Ns)) \bmod W < W(0)+W(1)+ \cdots +W(n) \qquad (2)$$

where W(i) is a weight on a NB-IoT carrier i, configured through RRC in system information, W is a sum of weights of all paging carriers, i.e., W=W(0)+W(1)+ ⋯ +W(Nn−1), and Nn is the number of paging narrowbands.

FIG. 1 is a flow of a method for detecting indication information provided according to an embodiment of the present disclosure, and as shown in FIG. 1, the method includes the following steps.

Step 101, a carrier/narrowband position and a time-domain position where indication information is located is determined.

The indication information is configured to indicate whether a UE needs to monitor a paging message or a downlink control channel that indicates the paging message on associated one or more POs.

Step 102, the indication information is detected on the determined carrier/narrowband position and the time-domain position, and according to the indication information, whether to monitor the paging message or the downlink control channel on the associated one or more POs is determined.

Figure 2:
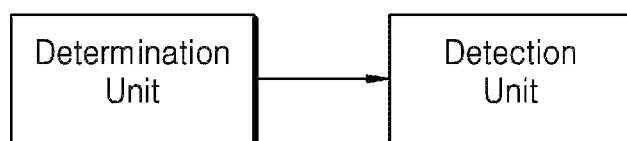
FIG. 2 is a schematic diagram of a basic structure of an apparatus for detecting indication information according to an embodiment of the present disclosure.

The present disclosure further provides an apparatus for detecting indication information, and the apparatus may be used to implement the above method. FIG. 2 is a schematic diagram of a basic structure of the apparatus for detecting the indication information. As shown in FIG. 2, the apparatus includes a determination unit and a detection unit.

The determination unit is configured to determine a carrier/narrowband position and a time-domain position where indication information is located. The detection unit is configured to detect the indication information on the determined carrier/narrowband position and the time-domain position, and determine whether to monitor the paging message or the downlink control channel on the one or more POs according to the indication information.

In the following, the detecting method and the detecting apparatus will be described in detail.

First, the present disclosure will describe how to determine the carrier/narrowband position of the indication information.

Method 1: The carrier/narrowband position of the indication information is predefined, and the UE monitors the indication information on the predefined carrier/narrowband position.

The predefined carrier may be the anchor carrier.

Method 2: The indication information is transmitted on a carrier/narrowband where a paging message or a downlink control channel (e.g., a PDCCH) is transmitted. The UE may obtain configuration information that indicates the carrier/narrowband where the paging message is located from higher layer signaling (e.g., a system information block (SIB) or a UE-specific RRC message), so as to determine the carrier/narrowband position of the indication information. In addition, the UE may know the carrier where the paging message is transmitted according to an indication from the physical layer (e.g., a PDCCH).

Method 3: the carrier/narrowband position of the indication information is determined according to configuration information from a base station. For example, the configuration information from the base station configures the UE that the indication information is transmitted on a specified carrier/narrowband among multiple carriers/narrowbands. The specified carrier/narrowband may be one or more carriers/narrowbands. Or, for example, the configuration information from the base station configures the UE to use the Method 1 or the Method 2 to determine the carrier/narrowband position of the indication information. Preferably, the higher layer signaling may configure whether the UE only monitors the indication information on the anchor carrier, or whether monitors the indication information on a non-anchor carrier. For a configuration method and a calculation method, please refer to those for multi-carrier paging in the NB-IoT or eMTC. In addition, the configuration method may be dependent on or independent from the configuration method of multi-carrier paging.

The carrier/narrowband position(s) determined using the above methods may be on one or more carriers/narrowbands. The indication information may indicate whether there is a downlink control channel or a paging message transmitted on POs on multiple carriers/narrowbands or on one carrier/narrowband. For example, scheduling information of a PDSCH that carries a paging message is configured to the UE through semi-static scheduling, or is predefined in the specification, and in this case, the indication information may indicate whether there is a paging message transmitted on POs on multiple carriers/narrowbands or on one carrier/narrowband; and when the scheduling information of the PDSCH that carriers the paging message is transmitted to the UE through a downlink control channel, then the indication information may indicate whether there is a downlink control channel transmitted on POs on multiple carriers/narrowbands or on one carrier/narrowband. The scheduling information of the PDSCH may include one or multiple pieces of the following information: an encoding and modulation mode, a transmission block size, a time-frequency resource position, etc. The indication information may indicate whether a UE or a group of UEs or all UEs (associated to one PO) need to continue to monitor a downlink control channel.

When the indication information is transmitted only on one carrier (e.g., the anchor carrier), after the UE detects the indication information, if the UE needs to continue to monitor paging message or downlink control channel(s) on a corresponding PO(s), the UE may continue to monitor paging message or downlink control channel(s) on the same carrier, or one different carriers.

In the following, several detailed examples will be provided.

Figure 3:
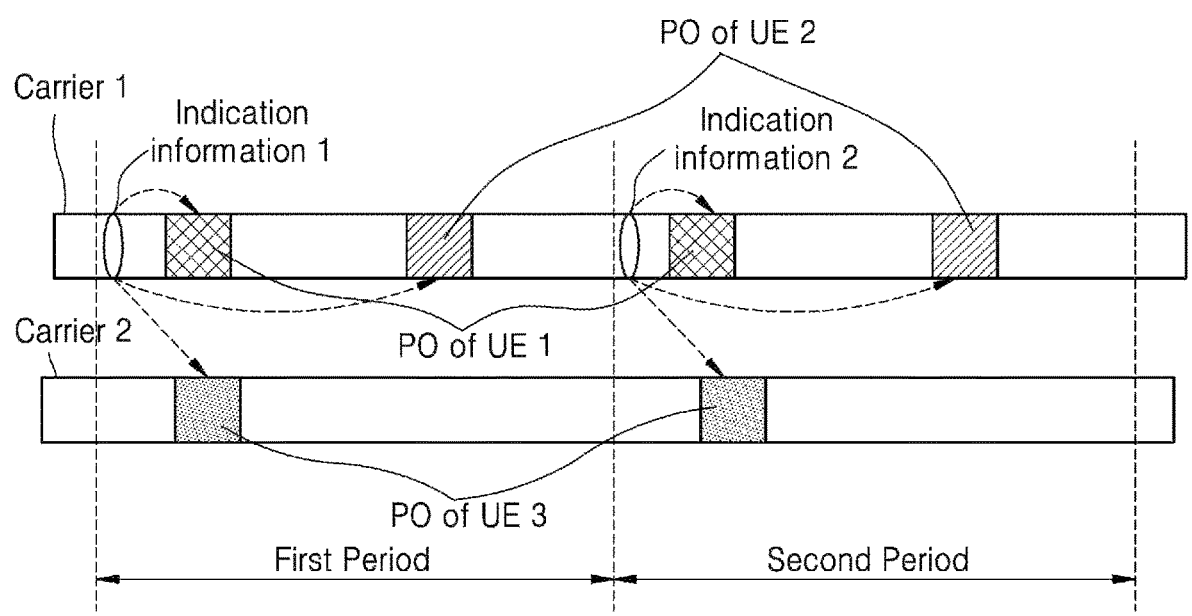
FIG. 3 is a first schematic diagram of determining a carrier/narrowband position of indication information.

In Example 1, the Method 1 is used to determine a carrier/narrowband position of indication information, and the indication information is configured to indicate whether to detect a PDSCH that carries a paging message on one or more POs, and/or indicate a downlink control channel (which is referred to as a PDCCH in the following examples) of scheduling information thereof. Specifically, as shown in FIG. 3, respective UEs obtain configuration information of a paging carrier or a paging narrowband, and determine that indication information is transmitted on a predefined carrier 1 (e.g., carrier 1 is the anchor carrier). In this case, the respective UEs will monitor indication information 1 and indication information 2 corresponding to a next period on the carrier 1. If the indication information 1 indicates that there is a PDCCH or a PDSCH transmitted on the corresponding PO(s), then the UEs continue to monitor the PDCCH or try to decode the PDSCH according to a PO rule. If the indication information 1 indicates that there is no PDCCH or PDSCH transmitted on corresponding PO(s), then the UEs do not monitor PDCCH or do not decode PDSCH on the corresponding PO(s), but continues to detect indication information on the next time-frequency resource position of indication information 2. In the first period, if there is a PDCCH that indicates a paging message or a PDSCH that carries a paging channel transmitted on POs of UE1~UE3, then the base station uses the indication information 1 to indicate that there is a PDCCH or a PDSCH transmitted on the corresponding POs. From the UE aspect, after a UE detects the indication information 1, it continues to monitor a PDCCH or try to decode a PDSCH on a corresponding PO(s). To be specific, since the POs of the UE1 and the UE2 are on the carrier 1, the UE1 and the UE2 continue to monitor their respective POs on the carrier 1, and since the POs of the UE3 is on the second carrier, and then after the UE3 detects the indication information 1 on the carrier 1, the UE3 monitors a PDCCH that indicates a paging signal on the POs corresponding to the carrier 2 or tries to decode a PDSCH on a semi-static scheduling resource. If a UE is a narrowband UE, e.g., a NB-IoT UE, an eMTC UE or a narrowband UE in a NR system, then the UE returns to a center frequency to a carrier (e.g., the carrier 2) where a PO of it is located, and continues to monitor a PDCCH or tries to decode a PDSCH.

It is to be noted that, in this case, from the base station aspect, as long as there is a paging message or a downlink control channel that indicates a paging message transmitted on one of POs related to one piece of indication information in a DRX period, then the base station will transmit the indication information, and then all UEs will be woken up. In other words, even if a UE detects indication information, the UE will not certainly detect a downlink control channel (e.g., a PDCCH) or will not certainly successfully decode a PDSCH.

Figure 4:
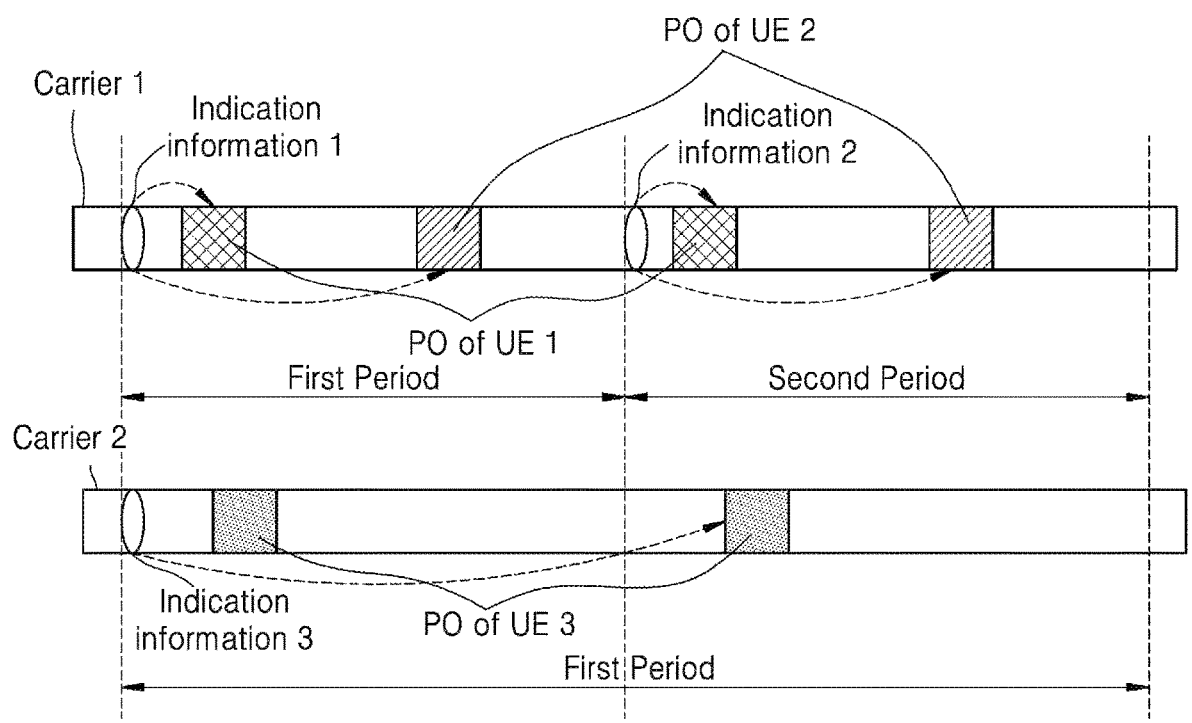
FIG. 4 is a second schematic diagram of determining a carrier/narrowband position of indication information.

Example 2, the Method 2 is used to determine a carrier/narrowband position of indication information, and the indication information is configured to indicate whether there is a downlink control channel that indicates PDSCH or PDSCH that carries a paging message on one or more POs. Specifically, as shown in FIG. 4, a UE obtains configuration information of a paging carrier or a paging narrowband; determines that indication information is transmitted on the paging carrier. Assume that indication information 1 and indication information 3 is transmitted respectively on two carriers, e.g., a carrier 1 and a carrier 2. The paging carrier of a UE1 and a UE2 is the carrier 1, and the paging carrier of a UE3 is the carrier 2. In this case, the UE1 and the UE2 will monitor the indication information 1 and indication information 2 corresponding to the next indication information period on the carrier 1, but the UE3 monitors the indication information 3 on the carrier 2. In an example, different carriers have different indication information/channel periods. For example, an indication information period on the carrier 1 is identical to the DRX period, but an indication information period on the carrier 2 is an integer multiple of the DRX period, e.g., 2 times. If the indication information indicates that there is a PDCCH or a PDSCH that carries a paging channel transmitted on a corresponding PO, then the UE continues to monitor the PDSCH or try to decode the PDSCH according to a PO rule. Similarly, in the first DRX period on the carrier 1, as long as there is a PDCCH that indicates a paging message or a PDSCH that carries a paging channel transmitted on POs of the UE1 and the UE2, the base station will indicate that the PDCCH that indicates the paging message or the PDSCH that carries the paging channel is transmitted on a corresponding PC through the indication information 1. From the UE aspect, after a UE detects the indication in the indication information 1, the UE continues to monitor a downlink control channel on a corresponding P, or continues to try to decode a PDSCH on a pre-allocated resource. The UE3 monitors the indication information 3 on the carrier 2. In an example, the period of the indication information 3 is relatively long, e.g., two DRX periods, and the indication information 3 indicates whether there is a PDCCH or PDSCH decoding on two POs in the period 2, and in this case, if the UE3 detects indication information, the indication information indicates that there is a PDCCH transmitted, or a PDSCH that carries a paging message transmitted on a semi-static scheduling resource on a corresponding PO, then the UE3 needs to detect two POs in its period, and conversely, if the indication information detected indicates that there is no PDCCH or PDSCH transmitted on a corresponding PO, then the UE3 will not need to monitor a PDCCH or will not need to try to decode a PDSCH on multiple corresponding POs.

For a system that supports multi-narrowband/multi-carrier paging, the base station may separately configure information related to the indication information for each carrier, e.g., may configure one or more pieces of the following information: a period, an offset for determining a time-domain position, a transmission duration, the number of repetitions, valid subframes.

In the following, how to determine the time-domain position of the indication information will be described.

The time-domain position of the indication information may be determined according to any of the following information:

A. A period of the indication information;

B. A position or a starting position (referred to as a paging position A) where a downlink control channel that indicates a paging message or a PDSCH that carries a paging message of each UE or a group of UEs are located.

The paging position A of each UE is a definite position, corresponding to a unique system frame number (SFN) and a unique subframe. To be specific, if a PDSCH is scheduled by a downlink control channel, then the paging position A herein refers to a position or a starting position of a downlink control channel that indicates a paging message; and if a PDSCH is semi-static scheduling, then the paging position A herein refers to a position or a starting position where a PDSCH that carries a paging message is located. When a downlink control channel that indicates a paging message or a PDSCH that carries a paging message is not repeatedly transmitted, then the paging position A is a position where the downlink control channel that indicates the paging message or the PDSCH that carries the paging message is located; and when the downlink control channel that indicates the paging message or the PDSCH that carries the paging message is repeatedly transmitted, then the paging position A is a starting position where the downlink control channel that indicates the paging message or the PDSCH that carries the paging message is located.

The base station may configure different methods to determine the position of the indication information according to different requirements and different scenarios.

The time-domain position refers to position information of the indication information in the time domain, and it may be a system frame position and a subframe position, or may be a time slot position. In the following, the description is based on using the system frame position and the subframe position as an example.

For the information A, the base station may configure an indication information period, and the UE calculates a SFN where indication information is located according to the indication information period, and then determines subframe position information and symbol position information where the indication information is located. Then the UE determines an accurate position of the indication information according to the SFN, the subframe position information and the symbol position information.

Figure 5:
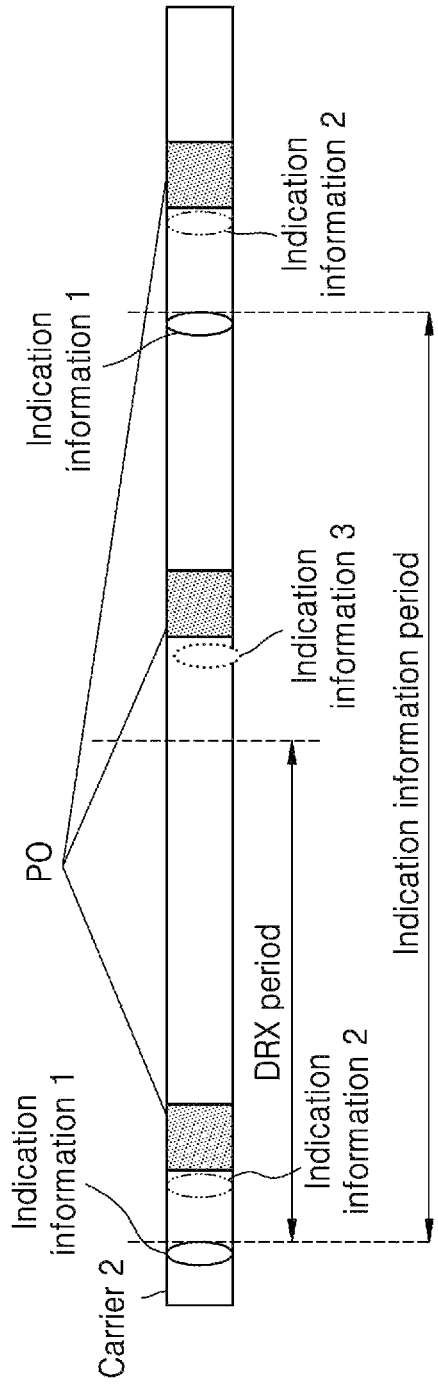
FIG. 5 is a first schematic diagram of determining a time-domain position of indication information according to a period of the indication information.

As shown in FIG. 5, the indication information period may be dependent on the DRX period of paging (e.g., the indication information period is one or several times of the DRX period or is a fraction of the DR-X period), or independent from it (the indication information period and the DRX period are configured independently from each other).

Specifically, the system frame of the indication information may be calculated using an existing method of determining a paging frame, i.e., according to the UE ID. For example, it is determined that a SFN that satisfies SFN mod T2=(T2 div N)*(UE_ID mod N2) is the system frame of the indication information, where T2 is the indication information period (may be obtained through configuration by the base station), and N2 is the minimum value of the period T2 and nB2. NB2 is a parameter configured by a higher layer. For example, nB2 may be: 4T2, 2T2, T2, T2/2, T2/4, T2/8, T2/16, T2/32, T2/64, T2/128, T2/256, T2/512, or T2/1024. In the indication information period T2, since the UE ID of each UE is different, indication information for each UE will correspond to a different SFN or a different subframe. As shown in FIG. 5, in an indication information period, different UEs may obtain a time-domain position where the indication information 2 is located and a time-domain position where the indication information 3 is located. Preferably, the method of calculating the system frame of the indication information may be independent from the UE ID, e.g., SFN mode T2=0. In addition, the system frame where the indication information is located may be calculated according to a start offset configured by the system. The start offset may be cell-specific, or UE-specific, or UE-group-specific. For example, an SFN that satisfies SFN mod T2=offset is the system frame of the indication information. The offset is a start offset, and a value of which may be obtained by being configured by an eNB (e.g., through RRC), or may be predefined, or may be calculated according to a UE_ID, and/or a carrier/narrowband ID, etc. Specially, offset=0, or T2-1, or T2-M, where M is a value configured by the base station. M may be equal to actual transmission duration of the indication information or may be equal to the actual transmission duration of the indication information plus one guard period. Therefore, M may be inferred from the transmission duration of the indication information and/or the guard period. In this method, for each period T2, there is a piece of indication information corresponding to it, as shown by the indication information 1 in FIG. 5. As another example in FIG. 6, the indication information period T2 and the paging DRX period T are the same. In this case, it is convenient to define a way of transmitting an absolute SFN and/or a subframe index. In a DRX period, different UEs may have different POs (SFNs and subframe indexes). For example, the POs of the UE1 and the UE2 are different, but in a DRX period, i.e., in an indication information period, they are indicated by means of the same piece of indication information. The offset may be combined with the first method to determine a system frame where the indication information is located. Specifically, the system frame may be determined by offsetting an offset value based on an SFN calculated using the first method. For example, SFN mod T2=offset(T2 div N)*(UE_ID mod N2) or SFN mod T2=(T2 div N)*(UE_ID mod N2)-offset.

Through the foregoing method, the SFN of the start system frame where the indication information is located may be determined according to the indication information period. During implementation, after other system frames where the indication information is located are determined, the Method B in the following may be used to determine a subframe position where the indication information is located, and a method of processing this situation will be introduced in the Method B.

Figure 7:
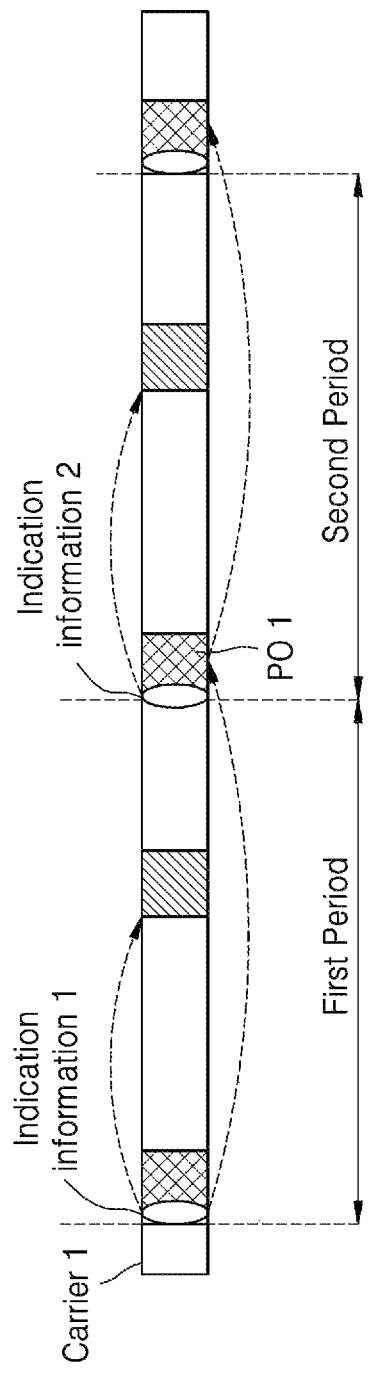
FIG. 7 is a third schematic diagram of determining a time-domain position of indication information according to a period of the indication information.

To keep a low-complexity UE, between the indication information and the paging position A, i.e., a PO, a certain time gap should be reserved for the UE to detect the indication information. For indication information that does not have a time gap with a PO, the UE cannot rapidly determine whether there is a downlink control channel or a downlink data channel that carries paging information on a PO following the indication information, and in this case, the PO may be defined to be indicated by previous one piece (i.e., that is closest to the PO and satisfies the guard period) of indication information. Detailed information is shown in FIG. 7, where since there is not a sufficient guard period (GP) between the indication information 2 and the paging position A1, then whether there is a PDCCH on the paging position A1 is indicated by the previous one piece of indication information 1.

What described above is how to determine a SFN where indication information is located under the circumstance A. In the following, how to determine subframe position information and symbol position information of indication information will be described.

Figure 8:
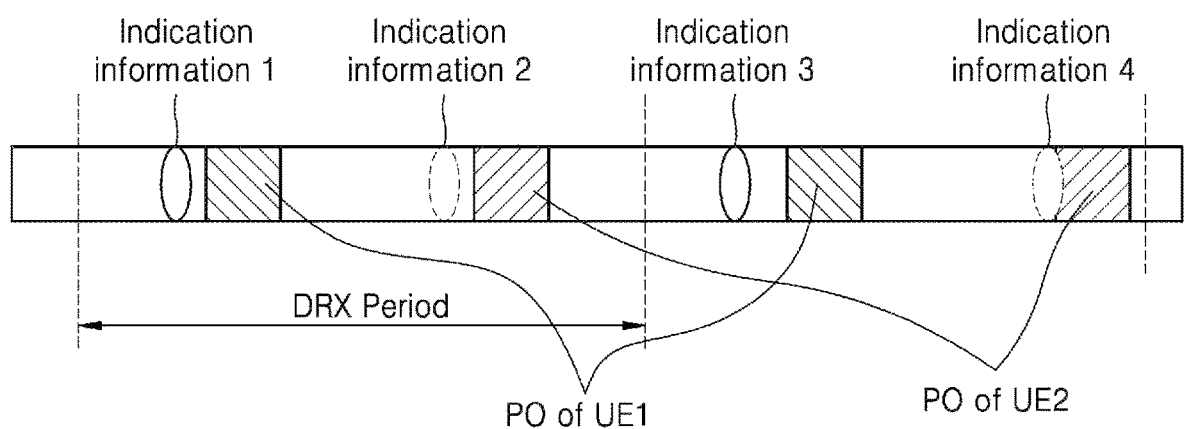
FIG. 8 is a first schematic diagram of determining a time-domain position of indication information according to a paging position A.

For the circumstance B, a UE may determine a paging position A (a SFN and a subframe) using existing technologies, and then determine a time-domain position where the indication information is located according to time-domain resource information of the indication information, or according to subframe position information of the indication information. As shown in FIG. 8, the base station will send a piece of indication information before each paging message or before each downlink control channel that indicates a paging message. As shown in FIG. 8, the UE1 and the UE2 calculate their paging positions A, i.e., POs, according to a predefined rule and a configured parameter, and the indication information 1 and the indication information 3 is applicable to the UE1, and the indication information 2 and the indication information 4 is applicable to the UE2.

Preferably, there are two detailed processing methods:

1. Time-domain resource information of indication information is determined, and a time-domain position where the indication information is located is determined according to a paging position A and the time-domain resource information of the indication information.

Specifically, the time-domain resource information of the indication information may be: the number of repetitions of the indication information and/or a time duration occupied by the indication information, and/or a time gap between the indication information and the paging position A. The time-domain resource information may be configured by the base station, or may be defined in a protocol. To be specific, when determining the time-domain position where the indication information is located according to the time-domain resource information of the indication information and the paging position A, the time-domain position of the indication information may be determined according to the number of repetitions of the indication information, the time duration occupied by the indication information, and the time gap between the indication information and the paging position A; or when there is not a time gap between the indication information and the paging position A, the time-domain position where the indication information is located may be determined according to the number of repetitions of the indication information and the time duration occupied by the indication information. The time gap between the indication information and the paging position A may be represented by the number of downlink valid subframes, or may be represented by the absolute number of subframes, or may be the number of downlink valid subframes plus one absolute subframe (time). Further, the subframe may be a time slot or other time units.

In addition, the number of repetitions of the indication information in the time-domain resource information may be deduced from the maximum repetition number Rmax in a search space of a PDCCH that indicates a paging channel. For example, it is predefined that the number of repetitions of the indication information is equal to Rmax or Rmax/X, where X may be predefined, e.g., in a protocol. X may be configured by the base station. In addition, the UE may need to monitor a channel or a signal that carries the indication information possible with one or more number of repetitions, and the number of repetitions it needs to monitor or the maximum repetition number may be configured by the base station or may be specified in the protocol. A detailed design thereof may refer to the design of a MPDCCH or NPDCCH search space. Then, the starting position of the indication information may be determined according to the maximum repetition number, or different starting positions may be obtained according to different numbers of repetitions.

2. Subframe position information of indication information is determined, and then a time-domain position where the indication information is located is determined according to the subframe position information and a paging position A.

It is to be specified that, in the foregoing Method A, the subframe position information of the indication information also needs to be determined, and the subframe position information in the Method 2 may be the same with the subframe position information in the Method A, and they may be determined in a same way. Therefore, in the following, they will be described together.

Specifically, the subframe position information of the indication information may include a start subframe position of the indication information and/or information of a subframe actually occupied by the indication information.

When the subframe position information of the indication information includes the start subframe position, the start subframe position may be determined in the following ways:

1 The start subframe position of the indication information is calculated according to a predefined rule.

The UE may calculate the start subframe position that is used to transmit the indication information according to the predefined rule. Specifically, the UE may continue to use the subframe paging method in the LTE technologies, and determine the start subframe position according to the UE ID and N2=min(T2, nB2) and a predefined table, specifically: i_s2=floor (UE_ID/N2) mod Ns2, where T2 is the indication information period, nB2 is a parameter configured by the higher layer, and Ns2=max (1, nB2/T2).

An example of the predefined table is shown as follows

| Ns2 | when i_s2 = 0 | when i_s2 = 1 | when i_s2 = 2 | when i_s2 = 3 |
|---|---|---|---|---|
| 1 | 9 | N/A | N/A | N/A |
| 2 | 3 | 8 | N/A | N/A |
| 4 | 9 | 3 | 4 | 9 |

In an example, the table indicates previous one or x subframes (x is a predefined integer) of the subframe paging table in LTE.

2. The start subframe position of the indication information is determined by being predefined or according to RRC configuration.

*?* Predefined: For example, the start subframe position is fixed to be one or more subframes, e.g., fixed to be a subframe 9 of each odd frame (to avoid a narrowband secondary synchronization signal (NSSS) in the NB-IoT system), or fixed to be subframes 3, 4 and 9, or the first subframe of each SFN, i.e., subframe 0.

* RRC configuration: The base station may configure a specific subframe number. The specific subframe index may be a start subframe position of the indication information. A subframe position actually occupied by the indication information may be from the starting position to N' valid subframes, or N' continuous subframes, or N' specific pointers, where N' is the number of subframes occupied for transmitting the indication information, or the number of repetitions.

After the start subframe position is determined according to the above Method, for the Method A, the time-domain position where the indication information is located may be determined by combining the SFN and the start subframe position; and for the Method B, the time-domain position where the indication information is located may be determined by combining the paging position A and the start subframe position, e.g., determining that a start subframe position that is closest to the paging position A before the paging position A and that has a gap enough to transmit the indication information with the start subframe of a PDSCH that carries the downlink control channel or a downlink control channel as the start subframe position.

3. The SFN of the starting position and the subframe position for transmitting the indication information may be determined directly according to the indication information period.

For example, $(10n_f+\lfloor n_s/2 \rfloor) \mod T2=0$ or $(10n_f+\lfloor n_s/2 \rfloor) \mod T2=\text{offset}$ or $(10n_f+\lfloor n_s/2 \rfloor) \mod T2=T2-\text{offset}$, where $n_f$ is an SFN index, $n_s$ is a time slot index, i.e., $\lfloor n_s/2 \rfloor$ is a subframe index. In the above formulas, the value of offset may be a value configured by the base station independently, or may be a value calculated according to the time-domain resource information of the indication information. For example, the value of offset may be a sum of the transmission duration (including the number of repetitions) and a gap between the indication information and the paging position A, and may further be calculated according to valid subframes. The method of calculating the subframe starting position herein may be only applicable to the Method A, not applicable to the Method B.

The subframe position information of the indication information may include information of a subframe actually occupied by the indication information. When the indication information is transmitted, it may need to be transmitted many times, and during the repeated transmissions, some subframes may not be used to transmit the indication information, and therefore, in some cases, the information of the subframe actually occupied by the indication information also needs to be determined to finally determine the time-domain position occupied by the indication information.

Specifically, the information of the subframe actually occupied refers to that the indication information only occupies a downlink valid subframe, or that the indication information may only occupy a part of specified invalid subframes.

The downlink valid subframe may be defined as that in the existing technologies. For example, in the NB-IoT system, the downlink valid subframe may be defined as:

(a) A subframe not used for transmitting NPSS/NSSS/NPBCH/NB-SIB1 and other SIBs;

(b) For an anchor carrier, after the UE receives system information SIB1, the subframe is configured to be an NB-IoT downlink subframe, i.e., a valid subframe; and (c) For a non-anchor carrier, the subframe is configured by the higher layer signaling to be an NB-IoT downlink subframe of the non-anchor carrier, i.e., a valid subframe.

Based on the foregoing definitions, the indication information is only transmitted in a valid downlink subframe which specifically: satisfies (a)+(b) on an anchor carrier, or satisfies (c) on a non-anchor carrier; or the indication information is only transmitted in a part of downlink invalid subframes, specifically: the indication information is transmitted in a subframe that satisfies (a) but that is configured to be invalid on an anchor carrier, or the indication information is transmitted in an invalid subframe on a non-anchor carrier.

The advantage of transmitting the indication information in a part of downlink invalid subframes is being able to effectively avoid a potential collision between the transmission of other signals of previous versions of UEs (note: the previous versions of UEs are not aware of the transmission of the indication information) and the transmission of the new indication information. This method is more applicable to a connected mode.

When the time-domain position where the indication information is located is determined based on the paging position A according to the Method B, before each paging position A, there is one piece of indication information used to indicate whether to perform monitor on a corresponding position. Specifically, the situation may be that one piece of indication information indicates whether UEs corresponding to one paging position A need to perform monitoring, or may be that one piece of indication information indicates whether UEs corresponding to a group of paging positions A need to perform monitoring, or may be that one piece of indication information indicates whether a subset of UEs of all UEs corresponding to one paging position A need to perform monitoring. In the following, these situations will be described in detail.

Figure 6:
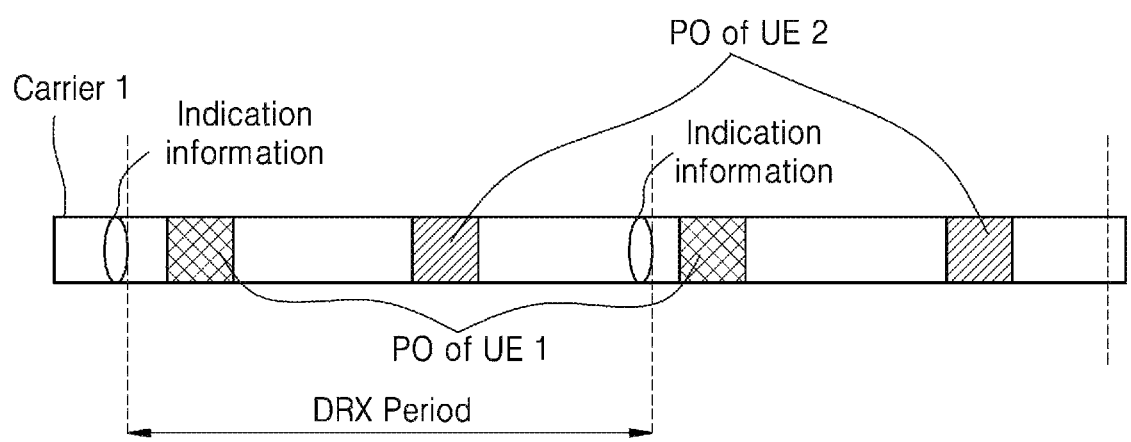
FIG. 6 is a second schematic diagram of determining a time-domain position of indication information according to a period of the indication information.

What shown in FIG. 6 may also be implemented using the Method B. For example, before a PO of each group of UEs (including the UE1 and the UE2), a piece of indication information is transmitted, and the position A of the indication information is determined according to a PO position of the first UE in the group of UEs, i.e., the UE1. In this case, the first it in the group of UEs may be calculated starting from SFN=0. A UE closest to SFN=0 is the first UE. Specifically, the UEs may be re-divided into Y groups in which each group corresponds to one piece of indication information. For the case where only one carrier is configured, when Y=N*Ns (N*Ns represents the number of POs in each DRX period), i.e., an indication signal before each PO; when Y>N*Ns, it indicates that the number of pieces of indication information is larger than the number of POs in a DRX period, i.e., that multiple pieces of indication information correspond to one PO, and therefore the UEs of each PO should be further grouped; and when Y<N*Ns, it indicates that in a DRX period, multiple POs correspond to one piece of indication information. Especially, when Y=1, i.e., each DRX period only has one piece of indication information used to indicate all UEs on the carrier. For the case of Y>N*Ns, the method of further re-grouping the UEs described hereinafter may be used to decide the time-domain position of the indication information.

For the case of Ns>1, it may be difficult to find an indication information position before each PO, and in this case, the PO mentioned in the above may be replaced with PF, and when performing the calculation, the number N of PFs in each DRX period may be used to replace the number of POs, N*Ns. For example, when the parameter nB configured by the system is larger than T, nB>T, one piece of indication information may be used to indicate UEs of multiple POs in a PF.

In an example, if Ns=1, for the case of Y<N, the UEs of multiple POs need to find the position of the same indication information, and a method of implementation thereof includes:

the group number of the indication information y=U_ID mod Y.

The position of a PF that is closest to the indication information is (T div N)*floor((UE_ID mod N)/(Y/N)) *floor(Y/N). The position of the first PO of the PF is the paging position A. Then the following methods may be used to determine the time-domain position of the indication information.

For the Method A, it may determine the time-domain position of the indication information by combining the SFN, the start subframe position of the indication information, and the information of a subframe actually occupied by the indication information. For the Method B, it may determine the time-domain position of the indication information by combining the paging position A and the information of the subframe actually occupied by the indication information, or may determine the time-domain position of the indication information by combining the paging position A, the start subframe position of the indication information, and the information of the subframe actually occupied by the indication information.

Figure 9:
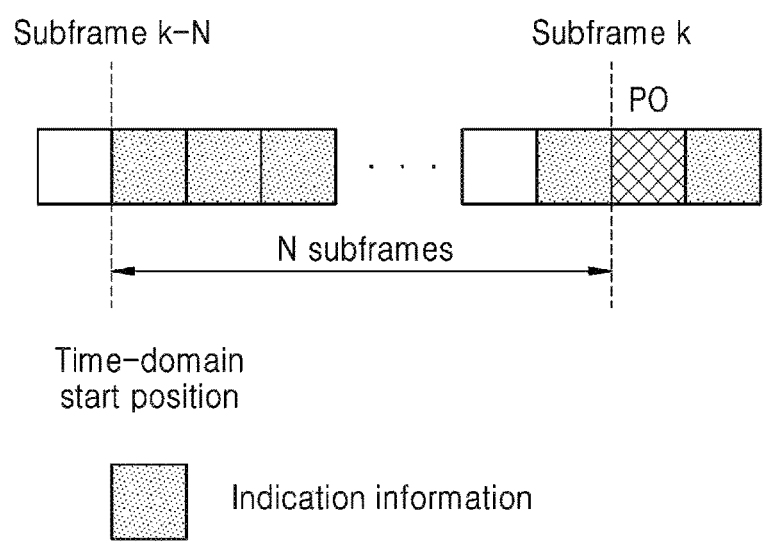
FIG. 9 is a second schematic diagram of determining a time-domain position of indication information according to a paging position A.

In the following, two detailed examples of determining the time-domain position of the indication information according to the paging position A are provided. As shown in FIG. 9, the UE determines a paging position A, i.e., an SFN and a subframe where a PO is located, e.g., SFN=m, and a subframe k, and in a case where there is a repetition in a downlink control channel that indicates a paging message or a downlink data channel that carries a paging message, the PO is its starting position. Then, the UE determines that the start subframe of the indication information is a subframe k-N, according to the number N of subframes occupied by the indication information or according to a gap between the start subframe of the indication information and the paging position A. In practice, a range of subframe indexes may be only 0-9, and in this case, the SFN should be introduced for calculation. For example, the position of the PO is SFN=m, and the subframe index is k, where k=0,~,9. The starting position of the indication signal/channel is SFN=m-floor(N/10), and the subframe index is K-N mod 10. The number of subframes occupied by the indication information may be configured by the base station, or may be predefined in the protocol.

Figure 10:
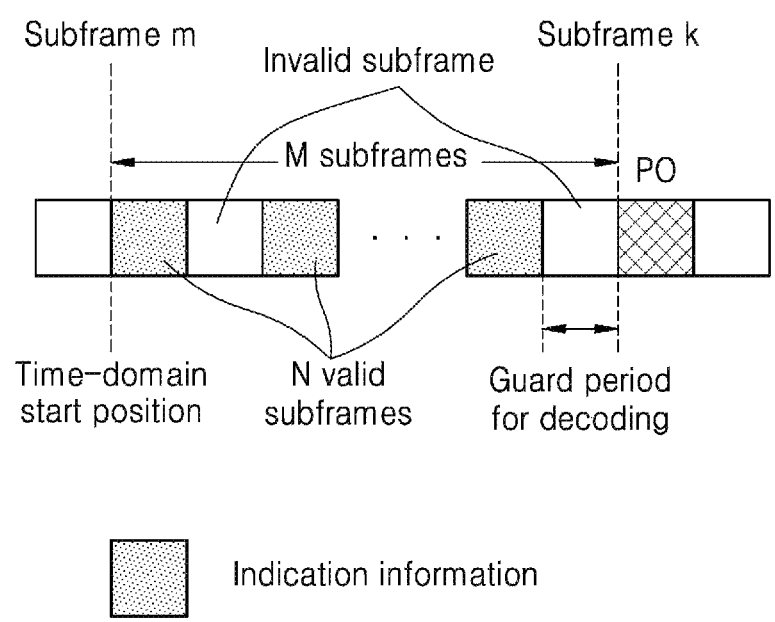
FIG. 10 is a third schematic diagram of determining a time-domain position of indication information according to a paging position A.

As shown in FIG. 10, the UE determines the paging position A, i.e., the SFN n and the subframe k where the PO is located, and then determines that the start subframe of the indication information is a subframe in according to the number N of subframes occupied by the indication information or according to a gap M between the start subframe of the indication information and the paging position A. In an example, there are N valid subframes between the subframe in and the subframe k. In addition, to keep the low complexity of the UE, and to guarantee that the UE can determine whether it needs to decode a PDCCH when a PO arrives, a guard period, e.g., a period of a subframe or a period of several symbols may be reserved between the indication information (an end position in case of a repetition) and the paging position A. Especially, when different hardware units are used for PDCCH decoding and indication information detecting, a certain time needs to be reserved to wake up a new hardware unit.

For the TDD system, the indication information may be transmitted in a downlink part of a special subframe DwPTS. compared to an entire subframe, only a part of signals may be transmitted in the special subframe DwPTS. Or the indication information may be punctured or rate matching may be performed for a valid RE.

If a UE is in the idle mode, a channel state information reference signal (CSI-RS) or a position reference signal (PRS) is transparent to the UE, i.e., the UE may assume that there is no transmission of CSI-RS and PRS. From the base station aspect, when a CSI-RS and an indication channel/signal are transmitted on a same time-frequency resource position, the indication channel/signal is punctured, i.e., only transmitting the CSI-RS, and not transmitting the indication channel/signal. In addition, the base station may avoid transmitting a CSI-RS or a PRS through scheduling, e.g., by configuring a downlink valid subframe. If the UE is in the connected mode, then the UE may consider that a subframe that is configured with a PRS or a CSI-RS is an invalid subframe. Or the UE may consider that the indication channel/signal may puncture the CSI-RS, or perform rate matching, so as to guarantee the performance.

After determining the subframe position through the above method, the UE may further determine the position of a symbol where the indication information is located.

Preferably, the symbol may be predefined as all symbols in a subframe, or first 3 OFDM symbols in a subframe. Since in the NB-IoT system, in the standalone mode, first 3 OFDM symbols of subframes 0, 5 and 9 (even frames) on an anchor carrier are idle. Therefore, the 3 OFDM symbols may be used to transmit the indication information/channel.

In the above, the method of determining the time-domain position where the indication information is located is described. In addition, provided with the position information of the indication information, when there is an offset in UE timing (out of synchronization), the IT may obtain the values of the SFN, the subframe, and the symbol by detecting the indication information. For example, if the UE has known that the indication information is transmitted in subframe 0 of SFN mode 256=0, after the UE is out of synchronization, the UE may set the position where the UE successfully detects the indication information as the SFN in the memory of the UE and/or as a value closest to the value of the subframe, e.g., the positions of SFN=0 and the subframe 0. That is to say, the UE may perform the timing synchronization according to the indication information and a counter relevant to time in the memory of the UE.

When performing indication information resource element (RE) mapping, pilot signals should be avoided, e.g., the CRS in the LTE system or the NRS in the NB-IoT system. Since in the idle mode of the NB-IoT, for specific subframes on an anchor carrier, or for first subframes of each PO on a non-anchor carrier, it is necessary to assume that there is an NRS, and in other subframes, it is unnecessary to assume that there is an NRS. In this case, the indication information may be mapped to REs that are previously used to transmit the NRS, i.e., assuming that there is no NRS transmission. This case may better keep the sequence correlation and improve the detection performance. When the format of transmitting the indication information is a channel, then it is assumed that NRSs exist in subframes of transmitting the indication information, and the UE needs to use the NRSs to perform channel estimation and decode the indication channel. In addition, the UE may assume that first subframes of the indication channel transmission subframes always exist, and the UE may perform frequency offset estimation through the NRSs.

Figure 11:
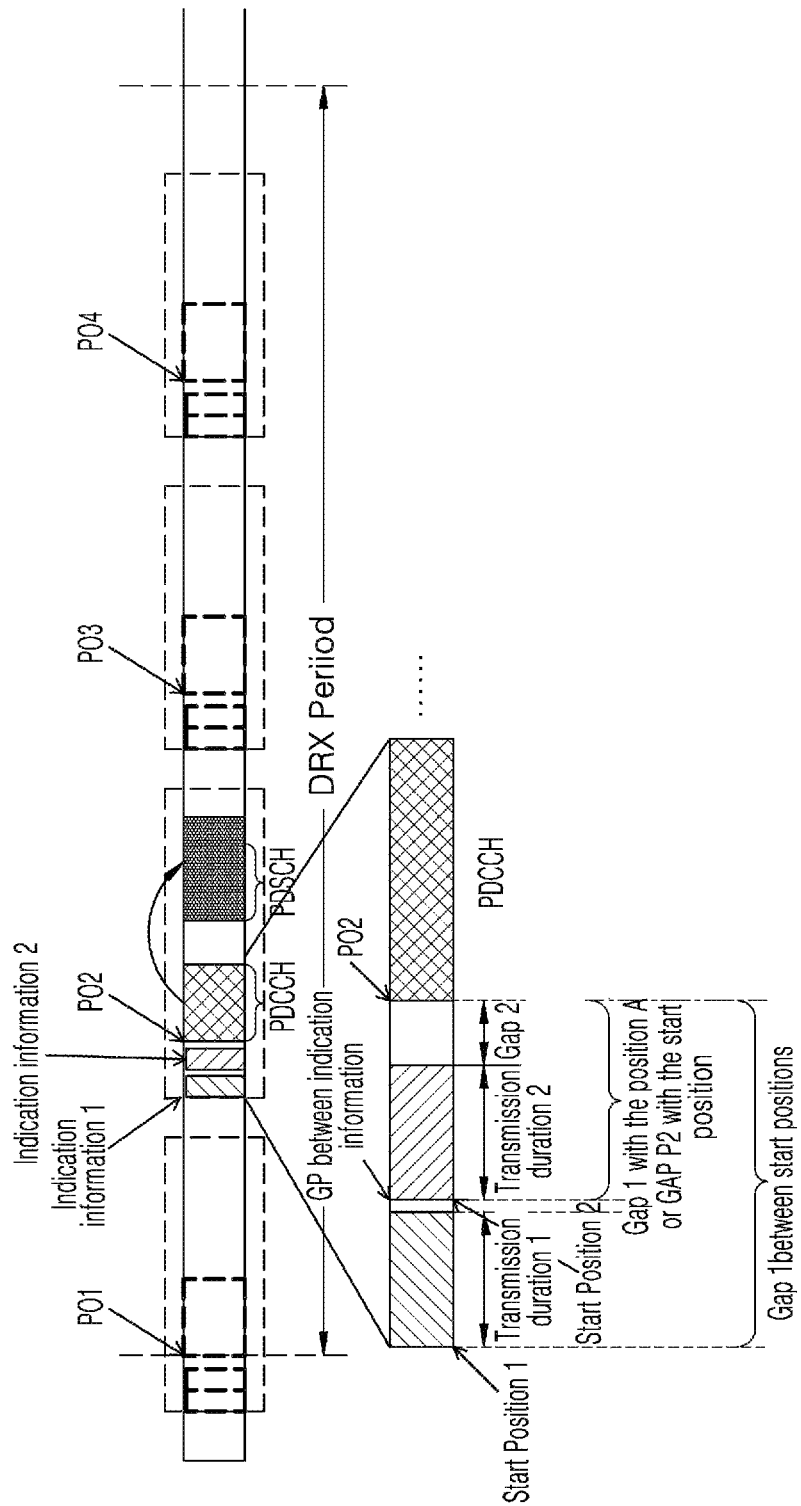
FIG. 11 is a fourth schematic diagram of determining a time-domain position of indication information according to a paging position A.

For the NB-IoT system, the UE may determine the mobility, e.g., cell attach or re-selection, in the idle mode according to channel state indicators such as RSRP and/or RSRQ and/or RSSI of anchor carriers. If the UE needs only to monitor the indication information or channel on an anchor carrier, then it is easy for the UE to obtain the channel state of the carrier RSRP. Especially, due to the restriction by the RF capacity, power boosting is only performed for an anchor carrier, and if all the UEs monitor indication information on anchor carriers, then a unified rule of mobility management may be used, e.g., using a same RSRP threshold, to perform the cell attachment or re-selection. For example, in the NB-IoT system, the mobility management in the idle state is decided according to the channel state of the anchor carrier. Similarly, the indication information may be used for communication systems such as eMTC, NR, LTE. In another aspect, since power boosting may be perform on an anchor carrier/narrowband, then the signal performance of the indication information on an anchor carrier/narrowband is better than that on a non-anchor carrier/narrowband, e.g., power boosting of 6 dB may be performed for an anchor carrier/narrowband, then the transmission duration (the number of repetitions, or the time-frequency domain resources occupied, or the length of the sequence) needed by the indication information will be shorter, e.g., only ¼ length is needed. In this way, it is advantageous for power saving of the UE. However, one piece of indication information in this method indicates whether there is a paging message on multiple carriers, and if the paging service in the cell is busy, then the UE will be woken frequently, which loses the meaning of power saving. Thus, in case of the paging service being busy, indication information/channel may be transmitted individually on each carrier to indicate whether there is a paging message. Preferably, the base station may configure a period (frequency) of the indication information/channel. When the paging service is not busy, then, a longer period may be configured, and when the paging service is busy, a shorter period may be configured, even more, the indication information of UEs which have the same PO may be separated into a group according to UE IDs of the UEs. That is to say, as shown in the above, when the number of groups of UEs, Y>N*Ns, it indicates that multiple pieces of indication information correspond to one PO position, and therefore, UEs of a same PO may be further grouped. For example, as shown in FIG. 11, the UEs of the same PO are grouped into two groups according to UE IDs of the UEs, corresponding to indication information 1 and indication information 2. A UE calculates its corresponding indication information according to its UE ID.

The base station may configure time-domain resource information for multiple groups of indication information respectively, e.g., the number of repetitions of the indication information, and/or the time duration occupied by the indication information, and the time domain gap between the indication information and the paging position A. As shown in FIG. 11, a UE determines the positions of the indication information 1 and the indication information 2 according to time-domain resource information of two indication information. To be specific, for the indication information 1, {transmission duration 1, gap 1 to the position A} is configured, and for the indication information 2, {transmission duration 2, gap 2 to the position A} is configured. The UE determines the starting position 1 of the indication information 1 and the starting position 2 of the indication information 2 according to the position A (the position of PO), the gap to the position A, and the transmission duration. Since there may have some timing offset to the bases station when UE wakes up from the IDLE state and therefore, to avoid detecting an indication signal of another PO (false alarmed), a gap is necessary between every two pieces of indication information, or at least every two neighboring groups of indication information use different sequences to reduce the probability of a false alarm. In another example, the starting position of the indication information 1 may be determined according to the gap between the indication information 2 and the PO, the transmission duration of the indication information 2, the gap between the indication information 1 and the indication information 2, and the transmission duration of the indication information 1. However, this method is more complex than the previous one.

In addition, the method of determining the time-domain position of the indication information performs multiple-group configuration through the base station, and thus it is applicable to situations of further grouping UEs.

In an LITE, eMTC, or NB-IoT system, as described in the foregoing, a UE calculates a PF and a PO to which it belongs, i.e., the paging position A in the present disclosure, according to the parameters configured by a base station (e.g., a DRX period, nB, etc.).

PF is an SFN satisfying SFN mod T=(T div N)*(UE_ID mod N). N=min(T,nB), where T is a DTX period, and nB is an RRC parameter configured by the base station.

PO is an i_s satisfying i_s=floor(UE_ID/N) mod Ns, Ns=max(1,nB/T), and then the PO is obtained by looking up a table.

As described in the foregoing, to reduce the probability of waking up a UE (for paging other UEs), UEs that belong to a same P) may be divided into M groups. A UE may first determine a group m, to which the UE belongs according to a configuration from the base station, and then determine a time-domain resource position of an indication signal according to the above method. For example, a number of the group may be determined according to a UE ID of the UE: m=floor(UE_ID/N*Ns) mod M. To be specific, as shown in FIG. 11, if M=2, and N=4, then a UE, a UE ID of which is 0 belongs to a first group of the PO1, and a UE, a UE ID of which is 4 belongs to a second group of the PO1, and a UE, a UE ID of which is 1 belongs to a first group of the PO2, and a UE, a UE ID of which is 5 belongs to a first group of the PO2, and so on.

For a system that supports multiple carriers/narrowbands, for example:

For an eMTC system PNB=floor(UE_ID/(N*Ns)) mod Nn, where PNB is a narrowband number, Nn is the number of paging narrowbands.

In this case, in the first detailed solution, for UEs that belong to the same PO, a group number of further grouping is m=floor(floor(UE_ID/N*Ns)/Nn) mod M.

For an NB-IoT system: the paging carrier is a carrier n where n is the smallest serial number that satisfies floor (UE_ID/(N*Ns)) mod W<W(0)+W(1)+월+W(n).

In this case, in the second solution, m=floor(floor(UE_ID/N*Ns)/W) mod M.

Figure 12:
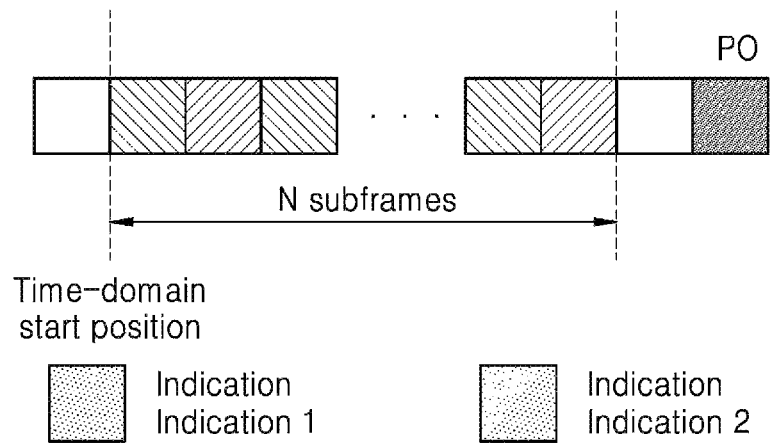
FIG. 12 is a fifth schematic diagram of determining a time-domain position of indication information according to a paging position A.

In addition, besides of transmitting multiple indication signals of a same group of POs on different time-domain positions in sequence, subgroups in each PO may be indicated by configuring multiple sequences, or to obtain a better time-diversity gain, multiple indication signals may be transmitted by turns on different time units (e.g., subframes, or a sequence of transmission units). In these two situations, the starting positions of different indication signals corresponding to one PO may be decided according to the same parameter or method, and then an actual time-domain resource position of each indication signal may be determined according to a predefined rule (e.g., each subframe, or each sequence is transmitted by turns). As shown in FIG. 12, the indication information 1 and the indication information 2 are transmitted by turns, and the UE may determine the time-domain starting positions according to configurations by the base station, and then determine the time-domain transmission positions of the indication signals to be monitored. For the configuration information of further grouping UEs corresponding to a PO, the base station may perform configuration for each paging carrier/narrowband respectively, or may configure a cell-specific parameter. Further, the parameter (including configuration parameters relevant to the indication signals) may be broadcasted in system information (SIB), or may be configured by UE-specific RRC signaling, or higher layer non-access stratum (NAS) signaling, or MME.

For the case of Ns>, it may be difficult to find an indication signal position before each PO, and then the PO mentioned in the above may be replaced with PF, and then during the calculation, the number N of PFs in each DRX period is used to replace the number N*Ns of the POs.

Figure 13:
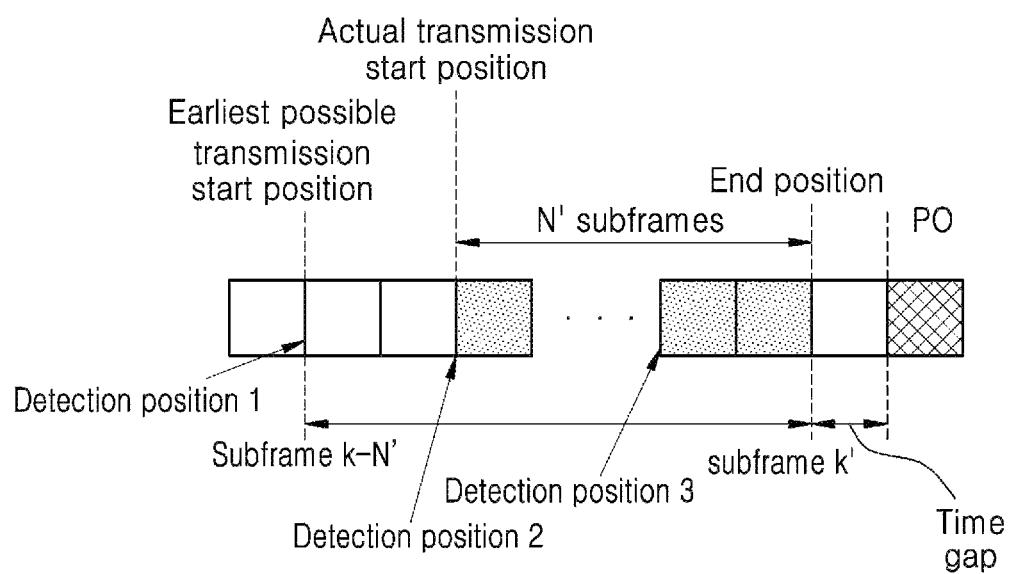
FIG. 13 is a sixth schematic diagram of determining a time-domain position of indication information according to a paging position A.

Since the transmission of indication information needs to occupy additional downlink resources, to reduce the downlink resources occupied, whether more resources should be used for paging may be decided according to whether the paging is successful, and therefore, the idea similar to the PDCCH search space may be supported. That is to say, the base station may configure an indication information maximum transmission duration (or a number of repetitions), but an actual transmission duration may be smaller than the maximum transmission duration. The UE may determine an assumed duration for detecting the indication information according to a downlink measurement, or the duration used to successfully perform the detection last time. As shown in FIG. 13, the indication information configured by the base station may occupy N subframes at most, but only N' subframes are transmitted. From the UE's aspect, the U may determine a position to perform the detection according to a downlink channel state (coverage). To be specific, if the downlink coverage of the UE is poor, then the UE needs a longer time to perform the detection, and the UE may start to detect an indication signal from a detection position 1 (a maximum transmission start position). If the UE is in a good coverage condition, then the UE may need a shorter time to perform the detection, and it may start the detection from a detection position 3. The UE may start the detection from a detection position 2, i.e., an actual position where the indication information is transmitted. If the UE performs the detection starting from the detection position 1, and a probability of successfully detecting the indication signal is low, then if the base station does not receive a random access request from the UE, the base station may select the maximum transmission duration to transmit the indication information on the next PO, so as to guarantee the detection performance. However, compared to a situation where the base station only transmits the indication information of N' substations when taking the system overhead into consideration, in the present disclosure, a UE with a poor coverage condition can still possibly detect the indication signal successfully.

Besides of the foregoing, to save the time spent by the UE in waking up, an end position where the indication information is actually transmitted may be fixed, e.g., having a certain time gap (predefined or configured by the base station through an RRC) with the PO. In this way, if the UE needs a shorter time to perform the detection, then it may wake up at a later time, which can save more power. In addition, the alignment of the end position may reduce a probability of collision with the transmission of PDCCH or PDSCH in the previous PO. Under this design, the UE may determine the earliest start position that can be used to transmit the indication information according to the maximum transmission duration. UE may determine a position to start the detection when it wakes up according to a duration actually needed by the UE to perform the detection. Specifically, the UE determines the position to start the detection of the indication information according to the duration needed to perform the detection and a guard period. If the position is present before an earliest possible transmission start position, then the UE performs the detection starting from the earliest possible transmission start position. If the position is present after the earliest possible transmission start position, then the UE skips the indication information, and directly detects PDCCH. Further, the UE may determine an actual detection position according to information of valid subframes.

In addition, to avoid a mismatch between an actual detection time and an actual transmission time of the UE, some possible transmission durations (e.g., numbers of repetitions) may be predefined. To be specific, the base station may configure one of transmission durations {1, 4, 8, 16, 32, 64, 128} as the maximum transmission duration (or the number of repetitions), then the UE may determine a duration needed for an actual detection according to the possible transmission duration. To be specific, if the possible transmission duration configured by the base station is 64, then the UE may select 32 or 48 as the detection duration actually needed by the UE. The value may be one selected from the above possible transmission durations, or not.

If the UEs on one PO are divided into two or more groups, as shown in FIG. 11, then a UE that monitors the first indication information needs to calculate a position to perform the detection after the UE wakes up, by counting forwards based on the earliest possible start transmission position of the second indication information (according to the duration needed by the UE to perform the detection). For example, the UE needs to determine an end position of the first indication information according to the earliest possible start transmission position of the second indication information and a guard gap needed between the two indication information, and then determine the position where the UE starts to detect the indication information according to an actual detection time needed by the E (e.g., determined according to RSRP), The indication information may be used for channel state measurement and cell synchronization of the UE. Specifically, the UE may obtain a measurement value of RSRP or RSRQ or RSSI by measuring a channel or a signal such as a CRS signal, and/or an NRS signal, and/or the indication information or channel, and/or a synchronization signal, and/or a downlink broadcast channel (e.g., a PBCH or SIBI) on the carrier. In addition, to measure the channel state according to the indication information or channel, the UE needs to obtain a power difference between the indication information or channel and other pilot signals. The power difference may be predefined in a protocol, or may be configured through RRC signaling. Specifically, the protocol may specify a default value, and may further configure other values through the RRC. In addition, to perform joint measurement, the indication information or channel may be transmitted through one or more antenna ports. For example, the protocol may define that the indication information and a secondary synchronization signal (SSS) or a primary synchronization signal (PSS) use the same antenna port, or that the signal or channel and a physical broadcast channel (PBCH) use the same transmission format and antenna port, or may define the signal or a mapping relationship between the signal and a CRS or an NRS or a DMRS. For a multi-antenna system, when the indication information is transmitted on different units (e.g., different repetitions, different subframes), it may assume to use different antenna ports. In addition, the signal or channel may be used to perform channel estimation, to help improve the demodulation performance of a subsequent downlink channel.

In addition, to support the measurement of a neighboring cell, the base station may configure indication information of the neighboring cell. The UE may obtain configuration information of the indication information of the neighboring cell, e.g., a time-frequency resource position, a period position, a starting position, carrier information, indication information sequence or neighboring cell ID, through system information or other RRC signaling. The UE may obtain the channel states of neighboring cell(s), e.g., RSRP, RSRQ, RSSI, by measuring indication information of the neighboring cell (s).

In the methods provided in the present disclosure, for the connected mode and the idle mode, the above methods of calculating the time-domain position and the carrier position may be the same, or may be different. Different parameters may be configured for the time-domain position and the carrier position through RRC.

Figure 14:
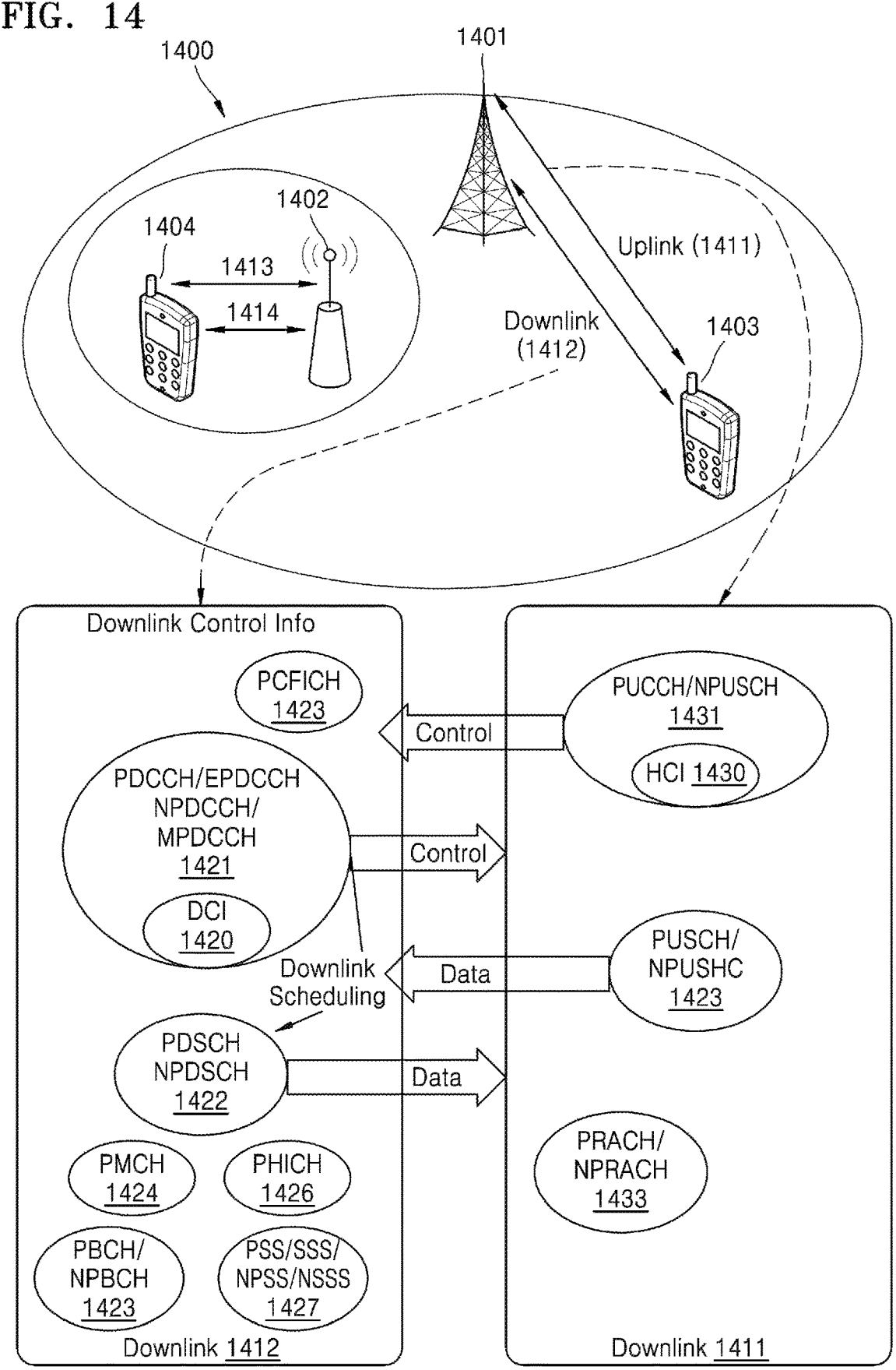
FIG. 14 is a schematic diagram of an exemplary mobile communication network according to embodiments of the present disclosure.

FIG. 14 illustrates an exemplary radio communication system 1400 according to embodiments of the present disclosure, where the UE performs detection for indication information. The radio communication system 1400 includes one or more fixed basic units to form a network distributed in a geographic area. The basic unit may be referred to as an access point (AP), an access terminal (AT), a base station (BT), a node B (Node-B), an evolved NodeB (eNB), a next generation NodeB (gNB) or other terminologies. As shown in FIG. 14, one or more basic units 1401 and 1402 may provide services for several mobile stations (MSs) or ULs or terminal devices or users 1403 and 1404 in a serving area, e.g., the serving area is a cell or a cell sector. In some systems, one or more BSs may be communicatively coupled to a controller that forms an access network, and the controller may be communicatively coupled to one or more core networks. The examples of the present disclosure are not limited to any specific radio communication system.

In the time domain and/or the frequency domain, the basic units 1401 and 1402 may respectively transmit downlink (DL) communication signals 1412 and 1413 to UEs 1403 and 1404. The UEs 1403 and 1404 respectively communicate with one or more basic units 1401 and 1402 through uplink (UL) communication signals 1411 and 1414. In an embodiment, the mobile communication system 1400 is an orthogonal frequency division multiplexing (OFDM)/orthogonal frequency division multiple access (OFDMA) system that includes multiple base stations and multiple UEs, and the multiple base stations include the base station 1401 and the base station 1402, and the multiple UEs include the UE 1403 and the UE 1404. The base station 1401 may communication with the UE1403 through the uplink link communication signal 1411 and the downlink communication signal 1412. When the base station has a downlink packet to be transmitted to the UEs, each UE will obtain a downlink allocation (resource), e.g., a group of radio resources in a physical downlink shared channel (PDSCH) or a narrowband physical downlink shared channel (NPDSCH). When the UE needs to transmit a packet to the base station through an uplink, the UE may obtain a grant from the base station, and the grant allocation includes a physical downlink uplink shared channel (PUSCH) or a narrowband physical uplink shared channel (NPUSCH) of a group of uplink radio resources. The UE may obtain downlink or uplink scheduling information from a PDCCH, or an MPDCCH, or an EPDCCH or an NPDCCH specific to the E. Downlink or uplink scheduling information and other control information carried by a downlink control channel is referred to as downlink control information (DCI). FIG. 14 further shows different physical channels of the downlink 1412 and the uplink 1411. The downlink 1412 includes a PDCCH or EPDCCH or NPDCCH or MPDCCH 1421, a PDSCH or NPDSCH 1422, a physical control formation indicator channel (PCFICH) 1423, a physical multicast channel (PMCH) 1424, a physical broadcast channel (PBCH) or NPBCH1425, a physical hybrid automatic repeat request indicator channel (PHICH) 1426 and a primary synchronization signal (PSS), a secondary synchronization signal (SSS), or a NPSS/NSSS 1427. The downlink control channel 1421 transmits a downlink control signal to a UE. The DCI 1420 is carried on a downlink control channel 1421. The PDSCH 1422 transmits data information to the UE. The PCFICH 1423 transmits information for decoding a PDCCH, e.g., dynamically indicating the number of symbols used by the PDCCH 1421. The PMCH 1424 carries broadcast and multicast information. The PBCH or NPBCH 1425 carries a master information block (MIB), used for UE early detection and cell-wide coverage. The PHICH carries hybrid automatic repeat request (HARQ) information, and the HARQ information indicates whether the base station correctly receives a transmission signal. The uplink 1411 includes a physical uplink control channel (PUCCH) 1431, a PUSCH 1432, and a physical random access channel (PRACH) 1433 that carries random access information.

In an embodiment, the radio communication network 100 may use an OFDMA or multi-carrier architecture, including adaptive modulation and coding (AMC) on an uplink and a next generation single-carrier frequency division multiple access (FDMA) architecture or multi-carrier orthogonal frequency division multiple access (OFDMA) architecture used for UL transmission. The FDMA-based single-carrier architecture includes interleaved FDMA (IFDMA), localized FDMA (LFDMA), and DFT-spread OFDM (DFT-SOFDM) of IFDMA or LFDMA. In addition, it may further include various enhanced NOMA architectures of the OFDMA system, e.g., PDMA (Pattern division multiple access), SCMA (Sparse code multiple access), MUSA (Multi-user shared access), LCRS FDS (Low code rate spreading Frequency domain spreading), NCMA (Non-orthogonal coded multiple access), RSMA (Resource spreading multiple access), IGMA (Interleave-grid multiple access), LDS-SVE (Low density spreading with signature vector extension), LSSA (Low code rate and signature based shared access), NOCA (Non-orthogonal coded access), IDMA (Interleave division multiple access), RDMA (Repetition division multiple access), GOCA (Group orthogonal coded access), WSMA (Welch-bound equality based spread MA), etc.

In an OFDMA system, mobile units are served by allocating downlink or uplink radio resources of a group of subcarriers on one or more OFDM symbols. An exemplary OFDMA protocol includes an evolved LTE and IEEE 802.16 standard of the 3GPP UMTS standard. The architecture may include a transmission technology, e.g., multi-carrier CDMA (MC-CDMA), multi-carrier direct sequence CDMA (MC-DS-CDMA), and orthogonal frequency and code division multiplexing (OFCDM). Or, the architecture may be based on a simpler time and/or frequency division multiplexing/multiple access technology, or a combination of the different technologies.

In the prior art, there are two types of relaying method, including:

The first type of relaying method is a layer 3-based relaying method in which a relay node has a base station function. In this method, from the perspective of the node being relayed (it is called a remote node in the present disclosure), the identity of the relay node is a base station with its own physical cell identity (PCID), which can realize all the functions of the base station. From the perspective of the base station, the identity of the relay node is a node. The base station schedules the communication resource requests of the relay node and the remote node as the transmission requests of the uplink and downlink services of the relay node itself, and then the relay node itself further schedules communication resources between the relay node and remote node.

The second type of relaying method is a layer 3-based relaying method designed in a device to device (D2D) communication system in a Proximity Service (ProSe). In this method, the relay node does not perform resource scheduling for the remote node. The relay node itself selects the transmission resource on the sidelink (SL) to the remote node, or the base station schedules the transmission resource on the sidelink for the relay node, which includes the transmission resources of sidelink control messages and the resources of sidelink data messages. The transmission resources are respectively located in the sidelink-dedicated control resource pool and data resource pool. The control message transmitted by the relay node indicates the transmission position of data message in the data resource pool. Within the coverage of the relay node, the remote node and other non-remote nodes both monitor and blindly detect the complete control resource pool (except for the resource position that cannot be intercepted due to the half-duplex restriction), determine the corresponding data message transmission resource position according to the received control message content, receive the data message at the corresponding resource position, and deliver it to the high layer of the node. The high layer of the remote node decodes the destination node information carried in the data message, and determines itself as the destination node of the data message; and the high layers of other non-remote node receiving the data message decode the destination node information carried in the data message, determine that itself is not the destination node of the data message, and discard the message.

However, the above two types of relay transmission method all belong to layer 3-based relaying, and they cannot guarantee the service continuity when a remote node switches a relay path (for example, switching from relay transmission to a direct transmission with the base station, or switching relay nodes) and performs handover. Neither of the above two methods is compatible with the physical layer design of existing versions of IoT UEs therefore, when the existing version of IoT UEs is used as a remote node, neither of the above two methods can implement relay transmission for a remote IoT node. That is, it is also necessary to deploy a new version of the IoT UE as the remote node, which greatly affects the system cost. In addition, moreover, since a repeat-based design in the IoT system is not supported, the reliability of the link between the relay node and the remote node cannot be ensured, when the link performance between the relay node and the remote node is poor, especially for the case of the remote IoT with limited transmission capability performing uplink transmission.

In addition, the main drawback of the first type of relay transmission method in the prior art is that: the relay node needs to implement the functions of the base station, which includes the resource scheduling and high-layer processing mechanisms, thus causing that the complexity is too high and the cost is affected. Moreover, the relay node of base station type usually has poor support for relay node mobility, causing that the deployment difficulty and cost thereof are higher than that of the relay node of UE type.

The main drawback of the second type of relay transmission method in the prior art is that: the remote node needs to blindly detect the complete sidelink control resource pool, but the resource pool may be larger than the UE-specific search space of the node, causing that the power consumption of the remote node for monitoring and blind detection increases, thereby affecting the battery life of remote node and negatively affecting the core requirements of the IoT system.

To solve the technical problem of relay transmission in the prior art, an embodiment of the present disclosure provides a relay transmission method, including: a method for transmitting a data message and a control message through relaying. For a case that the quality of the uplink and/or downlink is poor within the coverage of the cell, it is necessary to use the remote node with high repetitions. By configuring a suitable relay node for the remote node, a good link quality between the remote node and the relay node is achieved, thereby reducing the repetitions required during transmission and/or reception of the remote node and greatly saving the power consumption of the remote node; moreover, by using a relay node with a stronger UE capability, the success rate of the transmission is improved, and/or by reducing the repetitions, the utilization efficiency of air interface resources is improved. For a remote node outside the coverage of cell, by configuring a suitable relay node for the remote node outside the coverage of cell, multi-hop links between the remote node outside the coverage of cell with the base station can be established for uplink and downlink transmission, thereby realizing the improvement of the coverage of cell.

Further, compared with the two types of relay method in the background art, the beneficial effects of the present disclosure include that the present disclosure does not belong to layer 3-based relaying, and the service continuity of the remote node can be ensured by an appropriate high-layer design. In most application scenarios, the physical layer design in this application allows the use of an existing version of the IoT UE as a remote node and has good compatibility with existing deployments.

Figure 15:
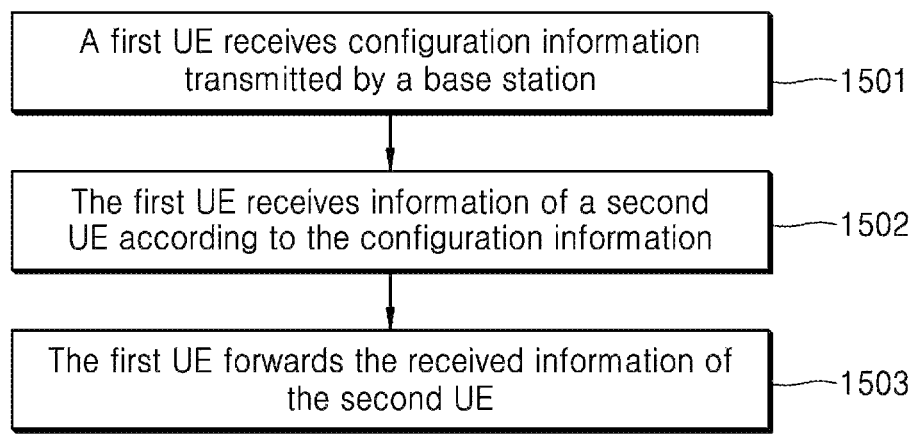
FIG. 15 is a schematic flowchart of a method for relay transmission according to an embodiment of the present disclosure.

FIG. 15 is a schematic flowchart of a method of relay transmission according to an embodiment of the present disclosure, which includes:

Step 1501: the first UE receives configuration information transmitted by a base station; Step 1501: the first UE receives information of a second UE according to the configuration information; Step 1503: the first UE forwards the received information of the second UE.

Wherein, the configuration information is used for receiving the information of the second UE.

Wherein, the configuration information includes at least one of the followings:

identity of the second UE, radio network temporary identifier (RNTI) information of the second UE, physical downlink control channel configuration information of the second TE, physical downlink control channel configuration information of the first UE, shared channel configuration information of the first UE, and shared channel configuration information of the second UE;

wherein, the physical downlink control channel configuration information includes at least one of the followings: a physical downlink control channel search space type, a maximum repetition number Rmax, a starting subframe, an offset, valid subframes, a downlink control information (DCI) format, and physical downlink control channel resource configuration information;

the shared channel configuration information includes at least one of the followings: configuration information of a physical uplink shared channel, configuration information of a physical downlink shared channel, a transmission mode of a shared channel, reference signal information, uplink valid subframes, downlink valid subframes, and Hybrid Automatic Repeat Request (HARQ) process parameters and a control region size within subframe.

Specifically, the receiving the information of the second UE according to the configuration information includes:

acquiring the physical downlink control channel configuration information of the second UE and/or physical downlink control channel configuration information of the first UE according to the configuration information, monitoring the physical downlink control channel of the second UE and/or physical downlink control channel of the first UE according to the acquired physical downlink control channel configuration information of the second U and/or physical downlink control channel configuration information of the first UE, and obtaining first scheduling information by decoding, wherein, the first scheduling information is used for indicating the reception of the shared channel of the second UE; receiving data information of the second UE according to the first scheduling information.

Specifically, the receiving, by the first UE, data information of the second UL, according to the first scheduling information includes:

receiving, by the first UE, uplink data information of the second UE on the physical uplink shared channel of the second UE, according to the first scheduling information; and/or, receiving, by the first UE, downlink data information of the second UE on the physical downlink shared channel of the second UE or the physical downlink shared channel of the first UE, according to the first scheduling information.

Wherein, the uplink data information of the second UE is transmitted by the second UE according to control information directly received from the base station, or, the uplink data information of the second UE is transmitted by the second UE according to the control information forwarded by the first UE.

Specifically, the forwarding the received information of the second UE includes:

receiving second scheduling information transmitted by the base station, wherein, the second scheduling information is used for the first UE to forward the data information of the second UE; and forwarding the received data information of the second UE according to the second scheduling information.

Wherein, the data information of the second UE at the second UE is received according to the control information directly received from the base station, or, the data information of the second UE at the second UE is received according to the control information forwarded by the first UE.

Specifically, the receiving the second scheduling information transmitted by the base station, includes:

monitoring the physical downlink control channel of the second UE and/or physical downlink control channel of the first UE, and, obtaining second scheduling information by decoding.

Specifically, the forwarding the received information of the second UE includes:

adding a Medium Access Control (MAC) header or Radio Link Control (RLC) header before the received data information of the second UE; and forwarding the data information of the second UE after adding the header.

Specifically, the receiving the information of the second UE according to the configuration information includes:

acquiring the physical downlink control channel configuration information of the second UE and/or physical downlink control channel configuration information of the first UE according to the configuration information; monitoring the physical downlink control channel of the first UE and/or physical downlink control channel of the second UE according to the acquired physical downlink control channel configuration information of the second UE and/or physical downlink control channel configuration information of the first UE; and obtaining the downlink control information by decoding;

specifically, the forwarding the received information of the second UE includes:

forwarding the downlink control information of the second UE to the second UE on the physical downlink control channel of the second UE.

After receiving the configuration information transmitted by the base station, the method further includes:

deciding whether the control information, which is obtained by decoding according to the configuration information, is used for scheduling the first UE and/or the second UE according to at least one piece of the following information:

information bit carried in the control information, scrambling RNTI of the control information, and a search space for decoding the control information.

Wherein, the content carried in the information bit includes at least one of the followings: identity of the first UE, identity of the second UE, the RNTI of the first UTE, the RNTI of the second UE and identification information of a mapping relationship between the first UE and the second UE.

A method of relay transmission is provided according to the embodiment of the present disclosure. Compared with the prior art, in the embodiment of the present disclosure, the first UE receives configuration information transmitted by a base station, wherein the configuration information is used for receiving the information of the second UE, receives the information of the second UE according to the configuration information, and forwards the received information of the second UE, so that a relay node (the first UE) can be used to perform relay transmission between the base station and the remote node (the second UE).

Figure 16:
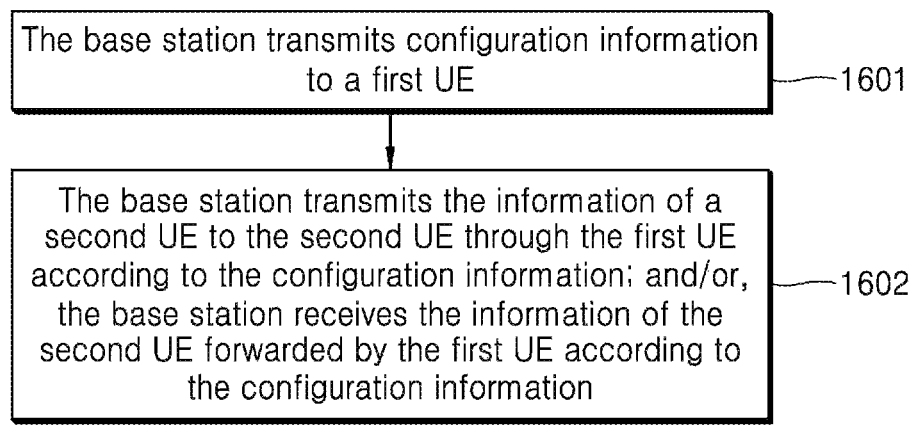
FIG. 16 is a schematic flowchart of another method for relay transmission according to an embodiment of the present disclosure.

FIG. 16 is a schematic flowchart of another method of relay transmission according to an embodiment of the present disclosure, which is executed by a base station, including:

Step 1601: the base station transmits configuration information to a first UE;

Step 1602: the base station transmits the information of a second UE to the second UE through the first UE according to the configuration information; and/or, the base station receives the information of the second UE forwarded by the first UE according to the configuration information.

Wherein, the configuration information is used for forwarding the information of the second UE at the first UE.

Wherein, the configuration information includes at least one of the followings:

identity of the second UE, RNTI information of the second UE, physical downlink control channel configuration information of the second UE, physical downlink control channel configuration information of the first UE, shared channel configuration information of the first UE, and shared channel configuration information of the second UE;

wherein, the physical downlink control channel configuration information includes at least one of the followings: a physical downlink control channel search space type, a maximum repetition number Rmax, a starting subframe, an offset, valid subframes, a DCI format, and physical downlink control channel resource configuration information;

the shared channel configuration information includes at least one of the followings: configuration information of a physical uplink shared channel, configuration information of a physical downlink shared channel, a transmission mode of a shared channel, reference signal information, uplink valid subframes, downlink valid subframes, and Hybrid Automatic Repeat Request (HARQ) process parameters and a control region size within subframe.

Specifically, the transmitting, by the base station, the information of the second UE to the second UE through the first UE according to the configuration information, includes the followings:

transmitting, by the base station, control information and data information of the second UE to the second UE through the first UE according to the configuration information; or, transmitting, by the base station, the control information to the second UE according to the configuration information, and transmitting, by the base station, the data information of the second UE to the second UE through the first UE.

Specifically, the receiving, by the base station, the information of the second UE forwarded by the first UE, according to the configuration information, includes:

transmitting, by the base station, the control information of the second UE to the second UE through the first UE according to the configuration information, and receiving, by the base station, the data information of the second UE that is forwarded by the first UE; or, transmitting, by the base station, the control information to the second UE according to the configuration information, and receiving, by the base station, the data information of the second UE that is forwarded through the first UE.

Specifically, the transmitting, by the base station, the data information of the second UE to the second UE through the first UE includes:

transmitting second scheduling information and first scheduling information to the first UE on a physical downlink control channel of the second UE and/or a physical downlink control channel of the first UE by the base station according to the configuration information, wherein the first scheduling information is used for the first UE to receive the data information of the second UE, the second scheduling information is used for the first UE to forward the data information of the second UE; transmitting the data information of the second UE to the second UE through the first UE based on the second scheduling information and the first scheduling information.

Specifically, the transmitting, by the base station, the control information of the second UE to the second UE through the first UE includes: transmitting, by the base station, the control information of the second UL to the second UE through the first UE on the physical downlink control channel of the second UE and/or the physical downlink control channel of the first UE according to the configuration information.

Specifically, the receiving, by the base station, the data information of the second UE forwarded through the first UE includes: transmitting, by the base station, the second scheduling information and the first scheduling information to the first UE on the physical downlink control channel of the second UE and/or the physical downlink control channel of the first UE according to the configuration information, wherein the first scheduling information is used for indicating the reception of the shared channel of the second UE, the second scheduling information is used for the first UE to forward the data information of the second UE; receiving the data information of the second UE that is forwarded through the first UE based on the second scheduling information and the first scheduling information.

A method of relay transmission is provided according to the embodiment of the present disclosure. Compared with the prior art, in the embodiment of the present disclosure, the base station transmits configuration information to the first UE, and the base station transmits the information of a second UE to the second UE through a first UE according to the configuration information; and/or, the base station receives the information of the second UE forwarded by the first UE according to the configuration information, wherein, the configuration information is used for forwarding the information of the second LE at the first UE, so that a relay node (the first UE) can be used to perform relay transmission between the base station and a remote node (the second UE).

An embodiment of the present disclosure provides a relaying method that is not based on layer 3. The contents of this embodiment of the present disclosure include a relaying of a physical uplink shared channel, a relaying of a physical downlink shared channel, and a relaying of a physical downlink control channel.

In the embodiment of the present disclosure, the first UE may be a relay node with capability of relaying within the coverage of cell, and the second UE may be a remote node within the coverage of cell or outside the coverage of the cell. The relay node monitors the physical downlink control channel transmitted by the base station, directly or indirectly acquires the scheduling information of the physical uplink shared channel of the remote node, the scheduling information of the physical downlink shared physical, the scheduling information of the relay node forwarding the physical uplink shared channel of the remote node, and the scheduling information of the relay node forwarding physical downlink shared channel of the remote node. The uplink transmission and/or downlink reception between the relay node and the base station and the transmission and/or reception between the relay node and the remote node are performed according to the contents of the four parts of scheduling information. The remote node monitors the physical downlink control channel transmitted by the base station and/or forwarded by the relay node, and directly acquires the scheduling information of the physical uplink shared channel of the remote node and/or the scheduling information of the physical downlink shared channel and performs uplink transmission and/or downlink reception according to the contents of the scheduling information. The base station schedules the transmission/reception between the remote node and the relay node and the uplink transmission/downlink reception between the relay node and the base station through the physical downlink control channel directly transmitted to the relay node and/or the physical downlink control channel directly transmitted or relayed to the remote node through relay node, and performs uplink reception or downlink transmission according to the contents of the scheduling information of the relay node and/or the contents of the scheduling information of the remote node.

In the embodiment of the present disclosure, each remote node uses one relay node for relaying; the relay nodes used by multiple remote nodes may be the same, that is, one relay node may provide relay functions for multiple remote nodes.

The embodiments of the present disclosure are applicable to three application scenarios. In scenario 1, the relay node only forwards the physical uplink shared channel transmission of the remote node and does not forward the physical downlink shared channel transmission of the base station and the physical downlink control channel transmission of the base station. In scenario 2, the relay node forwards the physical uplink shared channel transmission of the remote node, forwards the physical downlink shared channel transmission of the base station, and does not forward the physical downlink control channel transmission of the base station. In scenario 3, the relay node forwards the physical uplink shared channel transmission of the remote node, the physical downlink shared channel transmission of the base station and the physical downlink control channel transmission of the base station.

The scenario classification method is independent of whether uplink/downlink transmissions of other signal channels are relayed. For example, in the above scenarios, it is all supported that the relay node does not forward the downlink broadcast signals/channels and synchronization signals/channels of the base station, and the remote node itself acquires downlink broadcast messages and synchronization signals from the base station.

Hereinafter, based on the application scenario type, detailed descriptions of relay transmission are provided through several specific embodiments. Embodiment 1 is a relay transmission method in the scenario 1. Embodiment 2 is a relay transmission method in scenario 2. Embodiment 3 is a relay transmission method in scenario 3. For specific details, see the following embodiments.

Embodiment 1

This embodiment describes a scenario in which a relay node only performs uplink relaying and describes the manners of performing relay transmission in this scenario from the perspectives of a remote node, a relay node, and a base station, respectively.

(1) For physical uplink data channel/physical uplink shared channel:

The behaviors of the remote node include the following operation steps:

1. The remote node acquires the scheduling information of uplink transmission from the base station according to the behavior when there is no relay, including:

the remote node acquires the shared channel configuration information and physical downlink control channel configuration information from the base station by a Radio Resource Control (RRC) signaling, monitors the UE-specific search space of the physical downlink control channel of the remote node according to the configuration information, and blindly detects a candidate set of physical downlink control channels using a RNTI of the remote node, and obtains an uplink grant message transmitted by the base station by decoding, and acquires scheduling information of the physical uplink shared channel from the uplink grant message.

2. The remote node transmits an uplink data message to the base station, including:

the remote node transmits a physical uplink shared channel at the scheduled resource position according to the acquired content of the physical uplink shared channel scheduling information.

The behaviors of the relay node include the following operation steps:

1. the relay node acquires the configuration information of the relay node and the remote node from the base station, including:

the relay node acquires from the base station by RRC signaling the followings: the identity and/or RNTI of the remote node, the physical downlink control channel configuration information of the relay node and the remote node, and the shared channel configuration information of the relay node and the remote node.

Wherein, the physical downlink control channel configuration information of the remote node includes at least one of the followings: a physical downlink control channel search space type, a maximum repetition number Rmax, a starting subframe, valid subframes, a DCI format, and a physical downlink control channel resource configuration (e.g., a time-frequency resource position: a narrowband, a carrier, a physical resource block (PRB), a control resource set (CORESET), wherein CORESET configuration parameters include: an activation or release of CORESET, timing information, an ID, a frequency domain position, a start symbol, a duration, a resource element group (REG), a mapping type from control channel element (CCE) to REG, a precoder granularity, an interleaver column, an offset index, transmission configuration indication (TCI) state identification, demodulation reference signal (DMRS), a scrambling ID).

Wherein, the shared channel configuration information of the remote node includes at least one of the followings: configuration information of physical uplink and/or physical downlink shared channel, transmission mode of the shared channel (e.g., transmission modes 1 to 9), reference signal information, uplink valid subframes and/or downlink valid subframes, hybrid automatic repeat request (HARQ) process parameters, and a control region size within subframe.

Wherein, when the relay node has the capability of downlink reception in an uplink frequency band or an uplink subframe, the UE-specific search space of the physical downlink control channel of the relay node may be configured to be on the uplink carrier or the uplink subframe by the base station.

2. The relay node acquires scheduling information of uplink transmission of the remote node from the base station, including:

the relay node monitors the UE-specific search space of the physical downlink control channel of the remote node according to the configuration information of the remote node, blindly detects the candidate set of the physical downlink control channels by using the RNTI of the remote node, obtains the uplink grant message of the remote node transmitted by the base station by decoding, and acquires the scheduling information of the physical uplink shared channel of the remote node from the uplink grant message;

and/or, the relay node monitors the UE-specific search space of physical downlink control channel of the relay node according to the configuration information of the relay node, blindly detects the candidate set of the physical downlink control channels by using the RNTI of the relay node or the RNTI of the relay node and the remote node, obtains the uplink grant message of the remote node transmitted by the base station by decoding, and acquires the scheduling information of the physical uplink shared channel of the remote node from the uplink grant message.

Wherein, when the relay node performs relaying for multiple remote nodes, the relay node monitors in the UE-specific search space of the physical downlink control channel of all the remote nodes and/or relay nodes, and blindly detects by using the RNTI of relay node and/or all the remote nodes.

Wherein, the relay node performs blind detection successfully by using the RNTI of the relay node in the UE-specific search space of the physical downlink control channel of the relay node, obtains the uplink grant message by decoding, and determines that the uplink grant message is that to be transmitted to the remote node according to the information bits carried in the uplink grant message;

or, the relay node performs blind detection successfully by using the RNTI of the remote node in the U-specific search space of the physical downlink control channel of the relay node, obtains the uplink grant message by decoding, and determines the uplink grant message is that to be transmitted to the remote node according to the RNTI used for blind detection and/or the information bits carried in the uplink grant message;

or, the relay node performs blind detection successfully by using the RNTI of the remote node corresponding to the search space in the UE-specific search space of the physical downlink control channel of the remote node, obtains the uplink grant message by decoding, and determines the uplink grant message is that to be transmitted to the remote node according to the UE-specific search space and/or the RNTI used for blind detection and/or the information bits carried in the uplink grant message.

Wherein, the information bits carried in the uplink grant message may be an identifier (such as a UE ID) of the remote node, or an RNTI of the remote node, or identification information that indicates a mapping relationship between the relay node and the remote node. The identification information may be the index of the mapping relationship configured by the base station or predefined.

3. The relay node acquires scheduling information of the uplink relaying behavior of the relay node, including:

the relay node acquires the scheduling information of the explicitly-indicated uplink relaying behavior from the base station;

and/or, the relay node acquires scheduling information of the uplink relaying behavior which is implicitly-indicated by the base station.

Wherein, the relay node may acquire the scheduling information of a part of the explicitly-indicated uplink relaying behavior from the base station, and the scheduling information of the remaining part of the implicitly-indicated uplink relaying behavior.

Wherein, the relay node acquires the scheduling information of the explicitly-indicated uplink relaying behavior from the base station, including:

the relay node monitors the LE-specific search space of the physical downlink control channel of the remote node according to the configuration information of the remote node, blindly detects the candidate set of the physical downlink control channels by using the RNTI of the relay node, obtains the uplink grant message of the relay node transmitted by the base station by decoding, and acquires the scheduling information for forwarding the physical uplink shared channel of the relay node from the uplink grant message; and/or, the relay node monitors the UE-specific search space of physical downlink control channel of the relay node according to the configuration information of the relay node, blindly detects the candidate set of the physical downlink control channels by using the RNTI of the relay node or the RNTI of both the relay node and the remote node, obtains the uplink grant message of the relay node transmitted by the base station by decoding, and acquires the scheduling information for forwarding physical uplink shared channel of the relay node from the uplink grant message.

Wherein, when the relay node performs relaying for multiple remote nodes, the relay node monitors in the UE-specific search space of the physical downlink control channel of all the remote nodes and/or relay nodes, and performs blind detection by using RNTI of the relay node and/or all the remote nodes. The relay node successfully decodes more than one uplink grant message of the remote node and more than one uplink grant message of the relay node, and determines the mapping relationship between the uplink grant message of remote node and the uplink grant message of relay node in accordance with the search space for receiving the uplink grant message and/or RNTI used for blind detecting the uplink grant message and/or the information bits carried in the uplink grant message and/or the time sequence or the frequency domain resource position for receiving the uplink grant message.

Wherein, the relay node performs blind detection successfully by using the RNTI of the relay node in the UE-specific search space of the physical downlink control channel of the relay node, obtains the uplink grant message by decoding, and determines that the uplink grant message is that to be transmitted to the relay node according to the information bits carried in the uplink grant message;

or, the relay node performs blind detection successfully by using the RNTI of the remote node in the UE-specific search space of the physical downlink control channel of the relay node, obtains the uplink grant message by decoding, and determines the uplink grant message is that to be transmitted to the relay node according to the RNTI used for blind detection and/or the information bits carried in the uplink grant message;

or, the relay node performs blind detection successfully by using the RNTI of the remote node corresponding to the search space in the UE-specific search space of the physical downlink control channel of the remote node, obtains the uplink grant message by decoding, and determines the uplink grant message is that to be transmitted to the relay node according to the UE-specific search space and/or the RNTI used for blind detection and/or the information bits carried in the uplink grant message.

Wherein, the information bits carried in the uplink grant message may be an identifier (such as a UE ID) of the relay node, or an RNTI of the relay node, or identification information that indicates a mapping relationship between the relay node and the remote node. The identification information may be the index of the mapping relationship configured by the base station or predefined.

Wherein, the relay node acquires scheduling information of the uplink relaying behavior implicitly indicated by the base station, including:

the relay node acquires the scheduling information of the physical uplink shared channel of the remote node from the base station; the relay node determines the scheduling information of the uplink relaying behavior of the relay node by calculation according to the scheduling information of the physical uplink shared channel of the remote node and the predefined mapping relationship;

or, the relay node acquires the scheduling information of the uplink relaying behavior of the relay node from the base station; the relay node determines the scheduling information of the physical uplink shared channel of the remote node by calculation according to the scheduling information of the uplink relaying behavior of the relay node and the predefined mapping relationship.

4. The relay node receives the uplink data message transmitted by the remote node to the base station, including:

the relay node receives the physical uplink shared channel transmitted by the remote node at the scheduled resource position and successfully decodes according to the acquired content of the physical uplink shared channel scheduling information of the remote node;

wherein, the scheduled resource position may be an uplink carrier or an uplink subframe, and the relay node is required to have the capability of receiving on an uplink carrier or an uplink subframe.

5. The relay node forwards the uplink data message of the remote node to the base station, including:

the relay node forwards the physical uplink shared channel transmitted by the remote node to the base station on the scheduled carrier according to the acquired content of physical uplink shared channel scheduling information of the relaying behavior of the relay node.

The behaviors of the base station include the following operation steps:

1. The base station performs channel configuration on the remote node and the relay node, including:

the base station transmits the shared channel configuration information and physical downlink control channel configuration information of the remote node to the remote node by RRC signaling, and transmits the shared channel configuration information and physical downlink control channel configuration information of the relay node and/or remote node to the relay node.

2. The base station schedules the uplink transmission of the remote node, including:

the base station transmits an uplink grant message of the uplink data service of the remote node in the UE-specific search space of physical downlink control channel of the remote node according to the physical downlink control channel configuration information of the remote node, and scrambles the uplink grant message using the RNTI of the remote node, and the uplink grant message carries the scheduling information of the uplink data of the remote node.

3. The base station schedules the uplink forwarding of the relay node, including:

the base station transmits the uplink grant message of the uplink data service, that the relay node needs to forward, in the U-specific search space of the physical downlink control channel of the relay node according to the physical downlink control channel configuration information of the relay node, and scrambles the uplink grant message using the RNTI of the relay node or the remote node. The uplink grant message carries scheduling information of the uplink data of the relay node;

or, the base station transmits the uplink grant message of the uplink data service, that the relay node needs to forward, in the UE-specific search space of the physical downlink control channel of the remote node according to the physical downlink control channel configuration information of the remote node, and scrambles the uplink grant message using the RNTI of the relay node. The uplink grant message carries scheduling information of the uplink data of the relay node.

Wherein, in the uplink scheduling message of the relay node, the base station explicitly indicates by using the information bit, or implicitly indicates by scrambling the uplink grant message by using the RNTI, that the uplink transmission corresponding to the scheduling message is the transmission of the relay node itself or an uplink transmission of a specific remote node that needs to be forwarded. Wherein, the content explicitly indicated by using the information bit may be an identity (such as a UE ID) of the relay/remote node, or an RNTI, or identification information corresponding to a mapping relationship between the relay node and the remote node. The identification information may be the index of the mapping relationship configured by the base station or predefined.

Wherein, additionally, when the relay node performs relaying for multiple remote nodes, the base station sequentially transmits the uplink scheduling message of the relay node to the relay node in the UE-specific search space of the physical downlink control channel of the relay node in the order of transmitting the scheduling message to the multiple remote nodes.

4. The base station schedules transmissions between relay nodes and remote nodes, including:

the base station schedules the uplink transmission of the remote node as described, and configures the relay node to monitor the scheduling message of the remote node; that is, the base station enables the relay node to obtain the scheduling information of the transmission between the remote node and the relay node accordingly by scheduling the remote node without additional scheduling message transmission;

or, in addition to scheduling the uplink transmission of the remote node, the base station additionally transmits an uplink grant message of the uplink data service of the remote node or a transmission grant massage of the data service from the relay node to the remote node in the UE-specific search space of the physical downlink control channel of the relay node, and scrambles the grant message by using the RNTI of the relay node or the RNTI of the remote node.

Wherein, in the scheduling message of transmission between the relay node and the remote node, the base station explicitly indicates by using the information bit, or implicitly indicates by RNTI used for scrambling, that the scheduling message is used for scheduling the relay node or a certain remote node. Wherein, the content explicitly indicated by the information bit may be an identity (such as a UE ID) of the relay/remote node, or an RNTI, or identification information corresponding to a mapping relationship between the relay node and the remote node. The identification information may be the index of the mapping relationship configured by the base station or predefined.

Wherein, when the relay node performs relaying for multiple remote nodes, additionally, the base station sequentially transmits the scheduling messages of the transmission between the relay node and the relay node to the relay node in the UE-specific search space of the physical downlink control channel of the relay node or in the corresponding frequency domain position, according to the time sequence and or frequency domain resource position for transmitting the scheduling message to the multiple remote nodes.

Wherein, when the base station schedules the transmission between the relay node and the remote node, the scheduling message carries all the configuration information of the transmission, or carries part of the configuration information of the transmission and implicitly indicates the remaining part of the configuration information not carried in the scheduling message by the scheduling message of the uplink transmission for the remote node or the scheduling message of the uplink transmission for the relay node according to the predefined mapping relationship.

Wherein, the scheduling information of the transmission between the relay node and the remote node by the base station and the scheduling information of the transmission between the relay node and the base station by the base station may be carried in a same DCI. When the relay node performs relaying for multiple remote nodes, one DCI carries the scheduling information of transmission between one remote node and the relay node and the scheduling information of the relaying for the remote node by the relay node. Or, one DCI carries scheduling information of transmission between more than one remote nodes and the relay node and the scheduling information of the multiple times of relaying for the more than one remote nodes by the relay node. The base station uses the information field in the DCI to explicitly indicate that a specific field in the DCI is used to schedule the relay node or a specific remote node, or not explicitly indicates that a specific field in the DCI is used for scheduling the relay node or a specific remote node in the DCI, and the relay node determines a specific field in the DCI is used for scheduling the relay node or a specific remote node according to the predefined configuration information. In addition, when one DCI carries scheduling information of transmission between one remote node and the relay node and the scheduling information of the relaying for the remote node by the relay node, the base station indicates the identity information of the remote node by the RNTI by which the DCI is scrambled. The relay node determines that a specific field in the DCI is used for scheduling a relay node or the remote node according to the predefined configuration information, and determines the identity information of the remote node by the RNTI used for scrambling.

5. The base station receives the uplink forwarding of the relay node, including:

the base station receives the physical uplink shared channel transmitted by the relay node in the scheduled resource position according to the content of the scheduling information of the uplink forwarding of the relay node.

In addition, the above operation steps are not in a time sequence. The actual time sequence of each operation step needs to be determined according to the scheduling content of the base station and the content of the physical downlink control channel configuration information of the relay node and the remote node.

(2) For physical downlink data channel/physical downlink shared channel:

The remote node performs the reception of the physical downlink control channel and physical downlink shared channel according to the behavior when there is no relay, including:

The remote node acquires physical downlink control channel configuration information and physical downlink shared channel configuration information from the base station by RRC signaling; the remote node monitors the UE-specific search space of the physical downlink control channel of the remote node according to the configuration information, and blindly detects the candidate set of physical downlink control channels by using the RNTI of the remote node, obtains the downlink grant message transmitted by the base station by decoding, and acquires the scheduling information of the physical downlink shared channel from the downlink grant message; the remote node receives the physical downlink shared channel on the scheduled resource position according to the acquired content of the physical downlink shared channel scheduling information.

Further, the relay node acquires the scheduling information of the physical downlink shared channel of the remote node from the base station, and does not perform the receiving and relaying of the physical downlink shared channel.

The base station transmits the scheduling information received by the physical downlink shared channel of the remote node to the remote node, and no longer transmits the scheduling information of the physical downlink shared channel of the remote node to the relay node separately.

Figure 17:
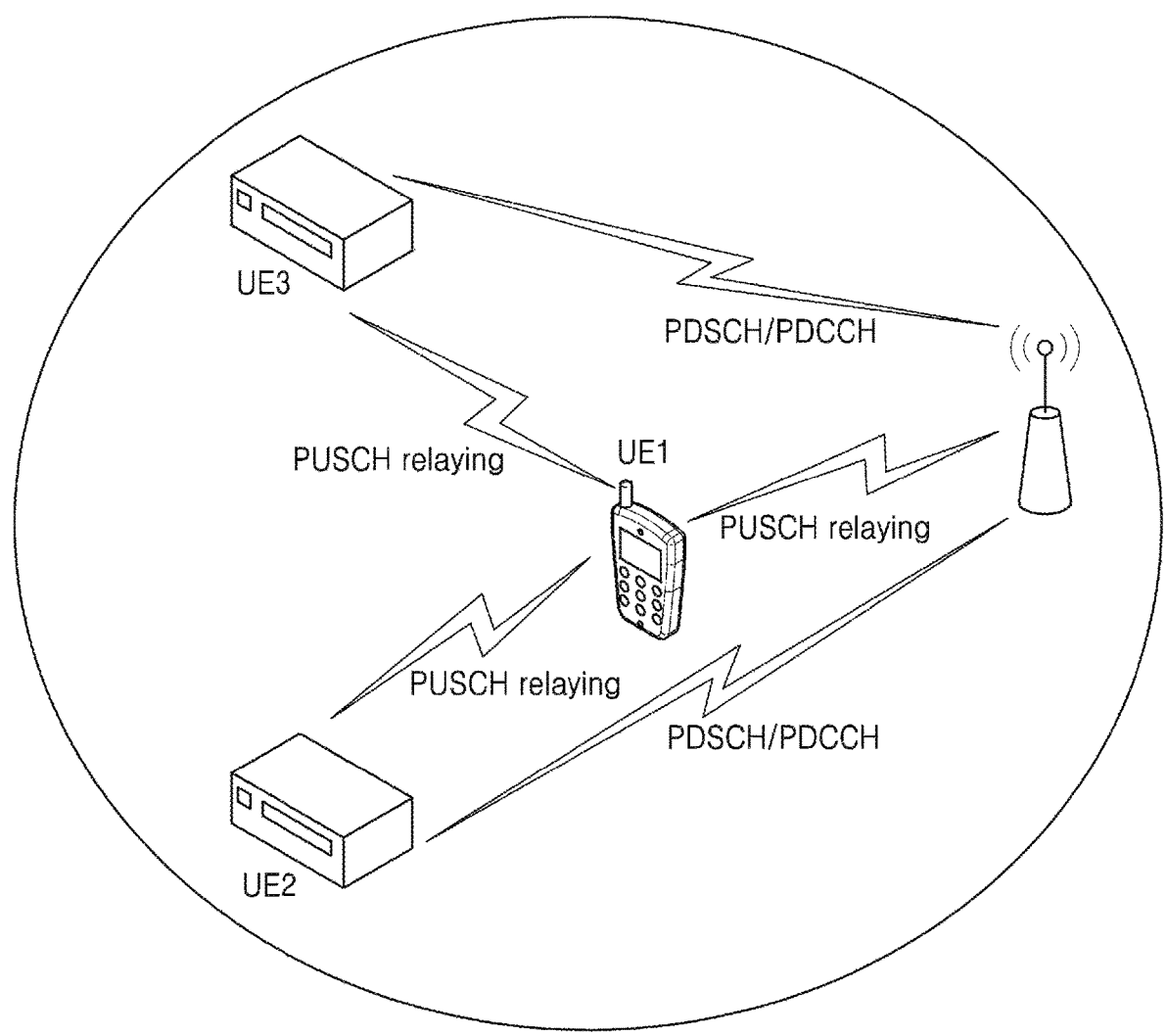
FIG. 17 is a schematic diagram of only an physical uplink shared channel using a relay in an embodiment of the present disclosure.

In the following, based on the application scenario for Embodiment 1, a relaying method for uplink data information will be described with reference to a specific example, as shown in FIG. 17. The physical uplink shared channel (PUSCH) in this example may also be EPUSCH, MPUSCH, NPUSCH. It is not limited in the embodiment of the present disclosure.

In this example, UE1 is a relay node with capability of relaying within the coverage of the cell, and UE2 and UE3 are remote nodes within the coverage of the cell. Both UE2 and UE3 use UE1 to perform relaying of the physical uplink shared channel (PUSCH), and both receive the physical downlink control channel (PDCCH) and the physical downlink shared channel (PDSCH) directly from the base station.

UE1 normally accesses the cell and has a capability of relaying. It has the capability of performing downlink reception in the uplink frequency band or uplink subframe and/or transmitting in the downlink frequency band or the downlink subframe, and informs the base station of the capability through high layer signaling. The UE1 acquires its own RNTI, the physical downlink control channel configuration information and the shared channel configuration information from the base station. Wherein, the UE-specific search space of the physical downlink control channel of UE1 may be configured on the uplink carrier/uplink subframe by the base station, or may be configured on the downlink carrier/downlink subframe.

The base station configures UE1 to perform relaying of uplink data transmissions of UE2 and UE3. The UE1 acquires the configuration information of the UE2 and the configuration information of the UE3 from the base station by the RRC signaling, wherein the configuration information includes: the ULE ID, the RNTI, the physical downlink control channel configuration information, and the shared channel configuration information.

Wherein, the physical downlink control channel configuration information of the UE2 and/or the UE3 includes: a physical downlink control channel search space type, a maximum repetition number Rmax, a starting subframe, valid subframes, a DCI format, and a physical downlink control channel resource configuration (such as time-frequency resource position: narrowband, carrier, PRB, control resource set (CORESET), wherein CORESET configuration parameters include: activation or release of CORESET, timing information, an ID, a frequency domain position, a start symbol, a duration, resource element group (REG), a mapping type from Control channel element (CCE) to REG, a precoder granularity, an interleaver column, an offset index, transmission configuration indication (TCI) state identification, demodulation reference signal (DMRS), scrambling ID).

Wherein, the shared channel configuration information of UE2 and/or UE3 includes at least one of the followings: physical uplink and/or downlink shared channel configuration information, the transmission mode of shared channel (e.g., transmission modes 1 to 9), reference signal information, valid uplink and/or downlink subframes, HARQ process parameters, and a control region size with subframe.

UE2 and UE3 within the coverage of the cell have the capability of accessing the cell. UE2 and UE3 normally access the cell, acquires its own RNTI from the base station, the physical downlink control channel configuration information and the shared channel configuration information.

UE2 and UE3 are configured by the base station to perform relaying of uplink data transmission through UE. The configuration is transparent, i.e., UE2 and UE3 do not need to know that their uplink data transmission is completed through relaying and perform uplink data transmission according to the original design of the non-relay system.

UE1, UE2, and UE3 perform monitoring and blind detection by using RNTI in the configured search space in the physical downlink control channel configured by the base station to obtain the scheduling message of the uplink transmission.

Figure 18:
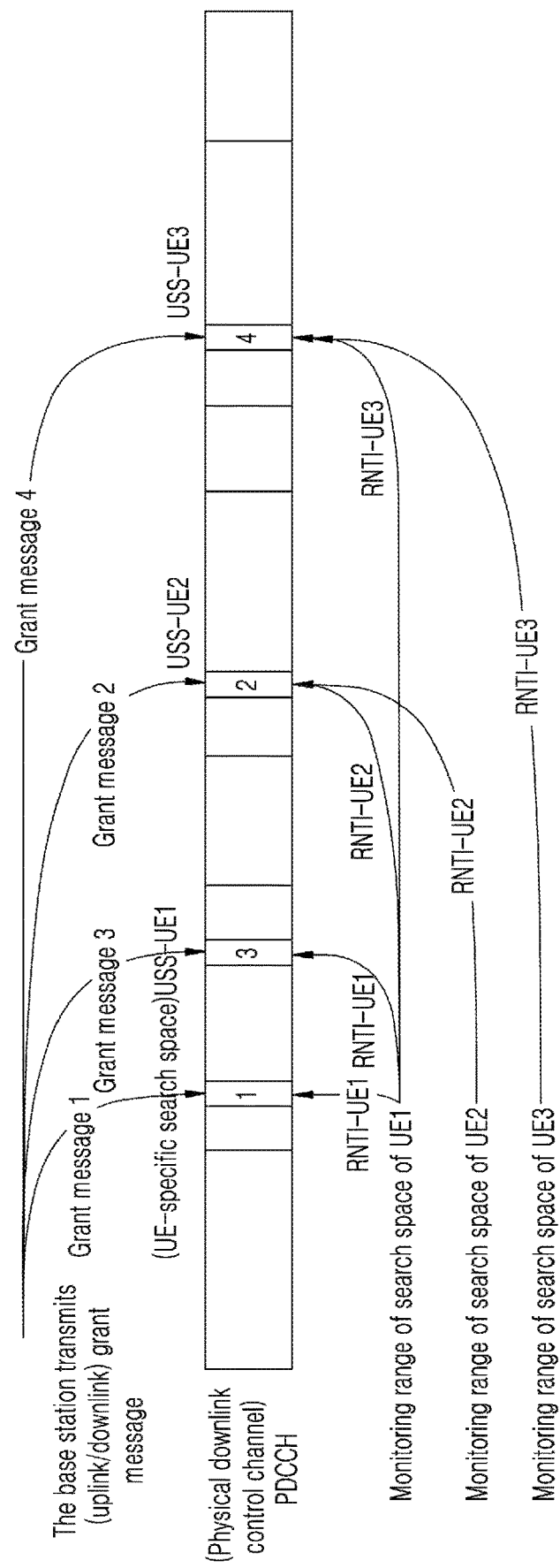
FIG. 18 is a corresponding schematic diagram of a first method of obtaining a scheduling message for uplink transmission by a first UE in Embodiment 1.
Figure 19:
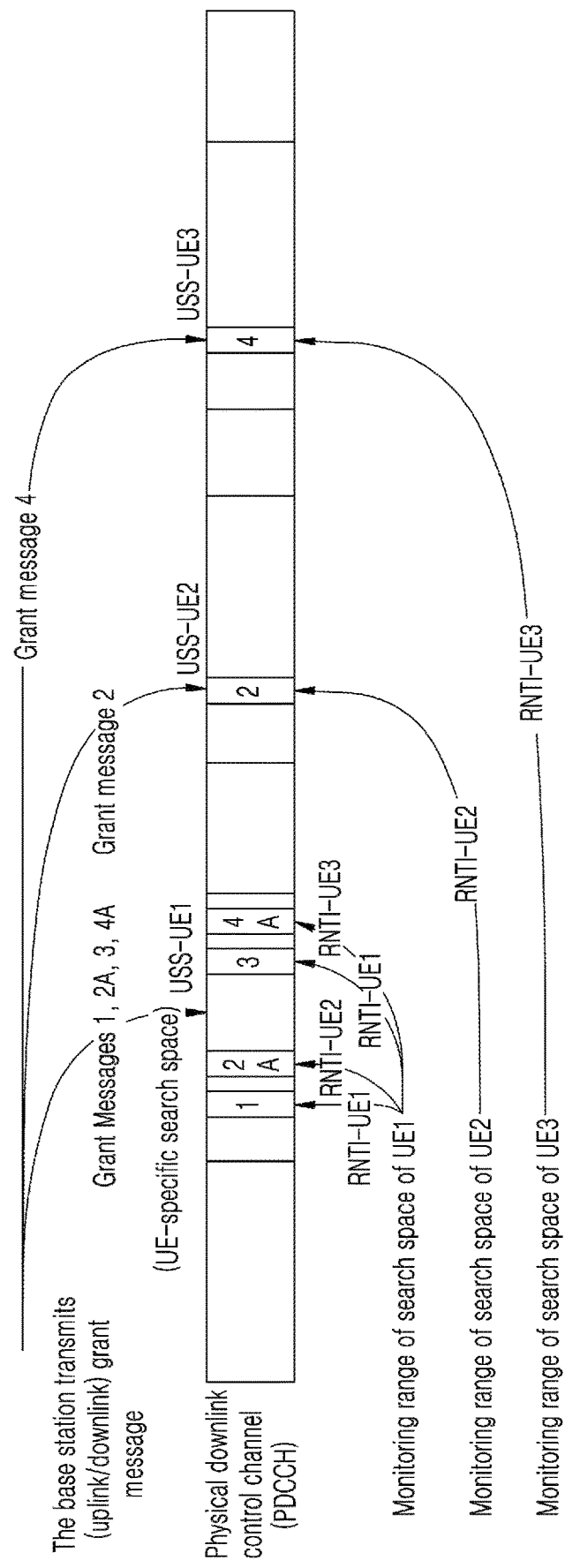
FIG. 19 is a corresponding schematic diagram of a second method of obtaining a scheduling message for uplink transmission by the first UE in Embodiment 1.
Figure 20:
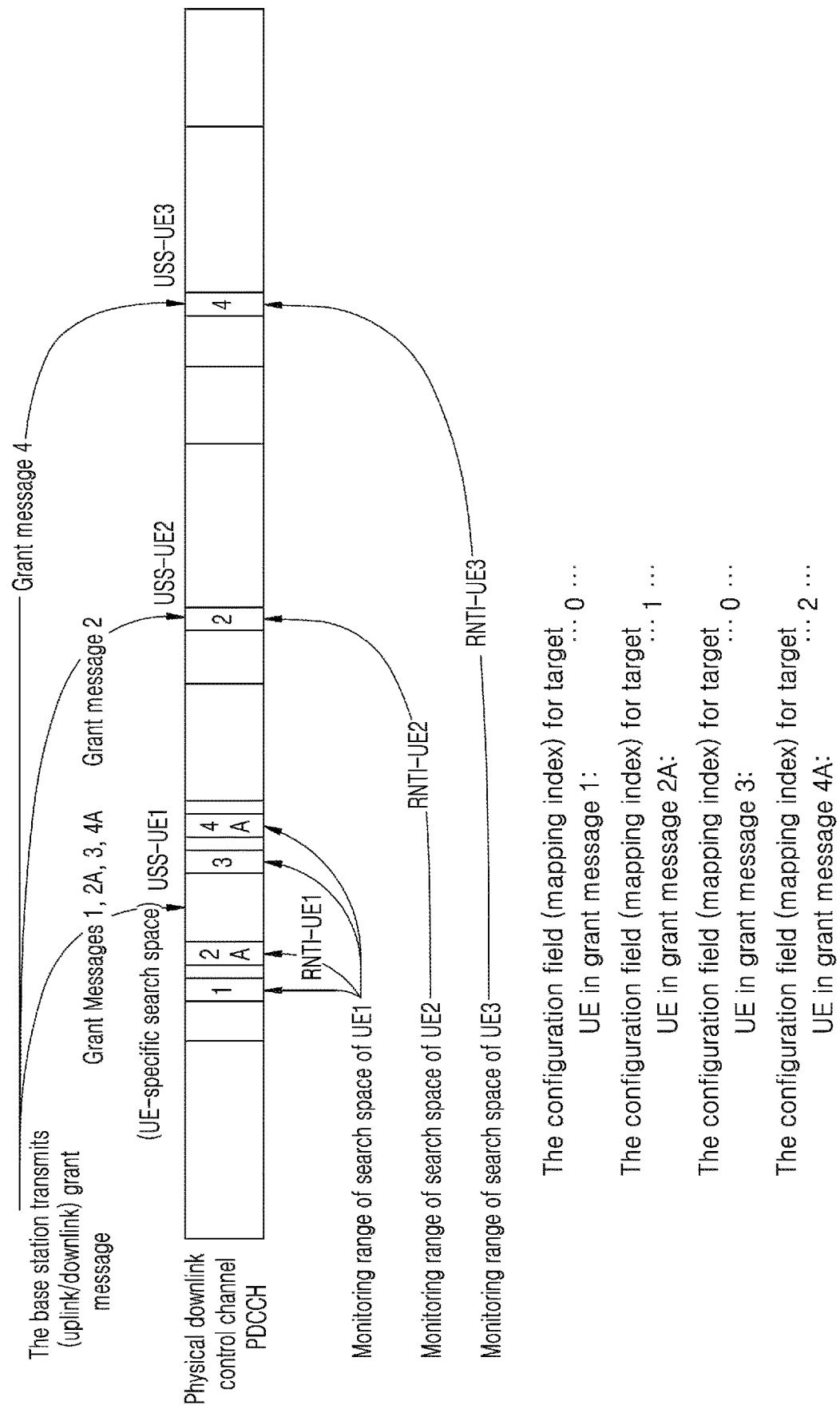
FIG. 20 is a corresponding schematic diagram of a third method of obtaining a scheduling message for uplink transmission by the first UE in Embodiment 1.

Wherein, the specific way the UE1 obtains the scheduling message of the uplink transmission includes: a method 1 (as shown in FIG. 18), a method 2 (as shown in FIG. 19), and a method 3 (as shown in FIG. 20):

Method 1: UE1 monitors the UE-specific search spaces (USSs) of UE1 and UE2 and UE3, and performs blind detection by using the RNTI corresponding to the search space;

For example, in this method, the base station transmits the uplink grant messages #1 and #3 in the UE-specific search space of the UE, and scrambles the uplink grant message by using the RNTI of the UE to sequentially indicate the scheduling information that the UE1 performs uplink forwarding for the UE2 and the scheduling information that UE1 performs the uplink forwarding for UE3; the base station transmits an uplink grant message #2 in the UE-specific search space of UE2, and scrambles the uplink grant message by using RNTI of UE2 to indicate scheduling information of uplink data transmission of UE2; the base station transmits uplink grant message #4 in a UE-specific search space of UE3, and scrambles by using RNTI of UE3 to indicate scheduling information of uplink data transmission of UE3.

UE11 performs blind detection successfully by using the RNTI of UE2 in the UE-specific search space of UE2, obtains the uplink grant message (UL grant) #2 by decoding, considers the uplink grant message as scheduling information used to indicate the uplink data transmission of UE2, and receives physical uplink shared channel (PUSCH) transmission of the UE2 according to the content of the grant message #2;

UE1 performs blind detection successfully by using the RNTI of UE3 in the UE-specific search space of UE3, obtains the uplink grant message #4 by decoding, considers the uplink grant message as scheduling information used to indicate the uplink data transmission of UE3, and receives PUSCH transmission of the UE3 according to the content of the uplink grant message #4;

When UE1 performs blind detection successfully twice by using the RNTI of UE1 in the UE-specific search space of UE1, obtains two uplink grant messages #1 and #3 by decoding, considers the uplink grant messages as scheduling information used to indicate the uplink relaying of UE1. According to the fact that the time sequence of receiving the uplink grant messages of UE2 and UE3 is UE2 is earlier than UE3, it is considered that uplink grant message #1 as scheduling information used to indicate UE to forward the uplink data of UE2 (corresponding to uplink grant message #2), and the uplink grant message #3 is considered as the scheduling information used to indicate the UE1 to forward the uplink data of the UE3 (corresponding to the uplink grant message #4). According to the content of the uplink grant message, the successfully decoded uplink data of UE2 and UE3 are forwarded.

In this method, it is additionally possible that the base station transmits another two uplink grant messages (e.g., #5 and #6) in the UE-specific search space of UE2 and UE3, and scrambles the uplink grant message by using the RNTI of UE1, to sequentially indicate the scheduling information that UE1 performs uplink forwarding for the UE2 and the scheduling information that UE1 performs uplink forwarding for UE3, but the two messages are not decoded when 1E2 and UE3 perform blind detection with their own RNTIs. When the UE1 performs blind detection successfully by using the RNTI of UE1 in the UE-specific search space of the UE2 and obtains the uplink grant message by decoding, the uplink grant message is considered as the scheduling information used to indicate the UE1 to forward the physical uplink shared channel of the UE2. Similarly, the UE1 performs blind detection successfully by using the RNTI of the UE1 in the UE-specific search space of the UE3, obtains the uplink grant message by decoding, the uplink grant message is considered as the scheduling information used to indicate UE to forward the physical uplink shared channel of UE3.

Method 2 UE1 monitors the UE-specific search space of UE1, and performs blind detection by using RNTIs of UE1, UE2 and UE3 in the UE-specific search space of UE1;

For example, in this method, the base station transmits an uplink grant message #1 (scrambled by RNTI of UE1), an uplink grant message #2A (scrambled by RNTI of UE2), and an uplink grant message #3 (scrambled by RNTI of UE) and an uplink grant message #4A (scrambled by RNTI of UE3) in the UE-specific search space of UE1, to sequentially indicate the scheduling information that the UE1 performs uplink forwarding for the UE2, the scheduling information of uplink data transmission of UE2, the scheduling information that UE1 performs uplink forwarding for UE3, and the scheduling information of uplink data transmission of UE3; the base station transmits an uplink grant message #2 in the UE-specific search space of the UE2, and scrambles it by using the RNTI of the UE2 to indicate the scheduling information of the uplink data transmission of the UE2; the base station transmits an uplink grant message #4 in the UE-specific search space of UE3, and scrambles the uplink grant message #4 by using the RNTI of the UE3 to indicate the scheduling information of the uplink data transmission of the UE3.

UE1 perform the blind detection successfully by using the RNTI of the UE2 in the UE-specific search space of the UE1, obtains the uplink grant message #2A by decoding, considers the uplink grant message as scheduling information used to indicate the uplink data transmission of UE2, and receives PUSCH transmission of the UE2 and decodes successfully according to the content of the uplink grant message #2A;

UE1 performs blind detection successfully using the RNTI of UE3 in the UE-specific search space of UE1, obtains the uplink grant message #4A by decoding, considers the uplink grant message as scheduling information used to indicate the uplink data transmission of UE3, and receives PUSCH transmission of UE3 and decodes successfully according to the content of the grant message #4A;

UE1 performs blind detection successfully twice by using the RNTI of UE1 in the UE-specific search space of UE1, obtains two uplink grant messages #1 and #3 by decoding, considers the uplink grant messages as scheduling information used to indicate the uplink relaying of UE1 According to the time sequence of receiving the uplink grant messages of UE2 and UE3 as UE2 is earlier than UE3, it is considered that uplink grant message #1 is used to indicate the scheduling information that UE1 forwards the uplink data of UE2 (corresponding to uplink grant message #2A), and the uplink grant message #3 is used to indicate the scheduling information the UE1 forwards the uplink data of the UE3 (corresponding to the uplink grant message #4A). According to the content of the uplink grant message, the successfully decoded uplink data of UE2 and UE3 are forwarded.

In this method, it is additionally possible that the uplink grant message contains an information bit explicitly indicating the target UE of the uplink grant message, and the information bit may be an identity (such as a UE ID) of UE, or an RNTI, or an index indicating the mapping relationship between the relay node and the remote node.

For example, when the base station configures UE1 to perform uplink relay for UE2/3, the index for the mapping relationship of UE1-UE2 is configured as 1, the index for the mapping relationship of UE1-UE3 is configured as 2, and the index for the mapping relationship of UE1 itself is configured as 0.

UE1 performs blind detection successfully by using the RNTI of UE3 in the UE-specific search space of UE1, obtains the uplink grant message #4A by decoding, and considers the uplink grant message #4A as the scheduling information used to indicate the PUSCH of UE3 according to the information bit explicitly indicating the target UE of the uplink grant message being the index of the mapping relationship which is configured to have an index value 2; or considers the uplink grant message #4A as the scheduling information used to indicate UE1 to forward the uplink data of UE3 to the base station according to the information bit explicitly indicating the target UE of the uplink grant message being the index for the mapping relationship which is configured to have an index value 0.

For example, when the base station configures UE1 to perform uplink relaying for UE2 and/or UE3, in the mapping relationship configuration for UE1 and all remote UEs, the index of the relay node (i.e., UE1 itself) is 0, and indexes of all the remote UEs (i.e., UE2 and/or of UE3) are 1.

UE1 performs blind detection successfully by using the RNTI of UE3 in the UE-specific search space of Il, obtains the uplink grant message #4A by decoding, and considers the uplink grant message #4A as the scheduling information used to indicate the PUSCH of UE3 according to the information bit explicitly indicating the target UE of the uplink grant message #4A being the index of the mapping relationship which is configured to have an index value 1; or considers the uplink grant message #4A as the scheduling information used to indicate UE1 to forward the uplink data of UE3 to the base station according to the information bit explicitly indicating the target U of the uplink grant message #4A being the index of the mapping relationship which is configured to have an index value 0.

For example, UE1 performs blind detection successfully by using the RNTI of UE1 in the UE-specific search space of UE1, and considers the uplink grant message as the scheduling information used to indicate UE1 to forward the uplink data of UE3 according to the information bit explicitly indicating the target UE in the uplink grant message being the RNTI of UE3.

Method 3: The UE1 monitors the UE-specific search space of the UE1, performs blind detection by using the RNTI of the UE in the UE-specific search space of the UE1, and obtains an information bit indicating explicitly the target UE in the uplink grant message.

For example, in this method, the base station transmits uplink grant messages #1, #2A, #3, and #4A in the UE-specific search space of UE1, and scrambles all of them by using the RNTI of the UE1 to sequentially indicate the scheduling information that the UE1 performs uplink forwarding for the UE2, the scheduling information of the uplink data transmission of the UE2, the scheduling information that UE1 performs the uplink forwarding for UE3, and the scheduling information of the uplink data transmission of the UE3; wherein, the base station transmits an uplink grant message #2 in the UE-specific search space of UE2, and scrambles it by using RNTI of UE2 to indicate scheduling information of uplink data transmission of UE2; the base station transmits uplink grant message #4 in the UE-specific search space of UE3, and scrambles it by using RNTI of UE3 to indicate scheduling information of uplink data transmission of UE3.

UE1 performs blind detection successfully by using the RNTI of UE1 in the UE-specific search space of UE1, obtains four uplink grant messages #1, #2A, #3, #4A by decoding it, and determines the four uplink grant messages sequentially used to schedule UE1, UE2, UE1 and UE3. It is determined that the four uplink grant messages are used to indicate the scheduling information that UE1 forwards the uplink data of UE2, the scheduling information of the uplink data of UE2, the scheduling information that UE1 forwards the uplink data of UE3, and scheduling information of uplink data of UE3, according to the reception time sequence.

Figure 21:
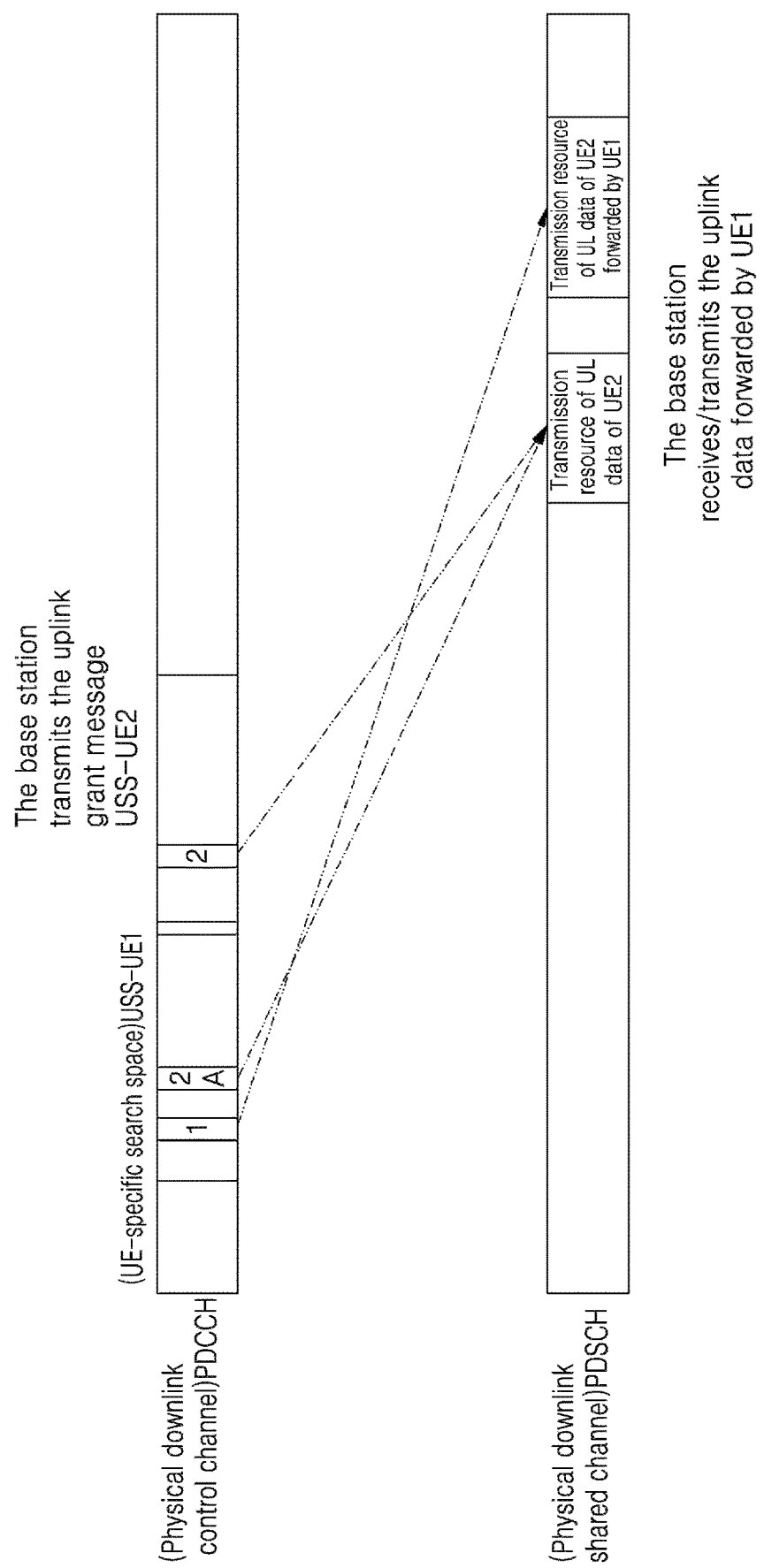
FIG. 21 is a schematic diagram of obtaining a scheduling message by the first UE through obtaining two uplink grant messages transmitted by the base station in Embodiment 1.
Figure 22:
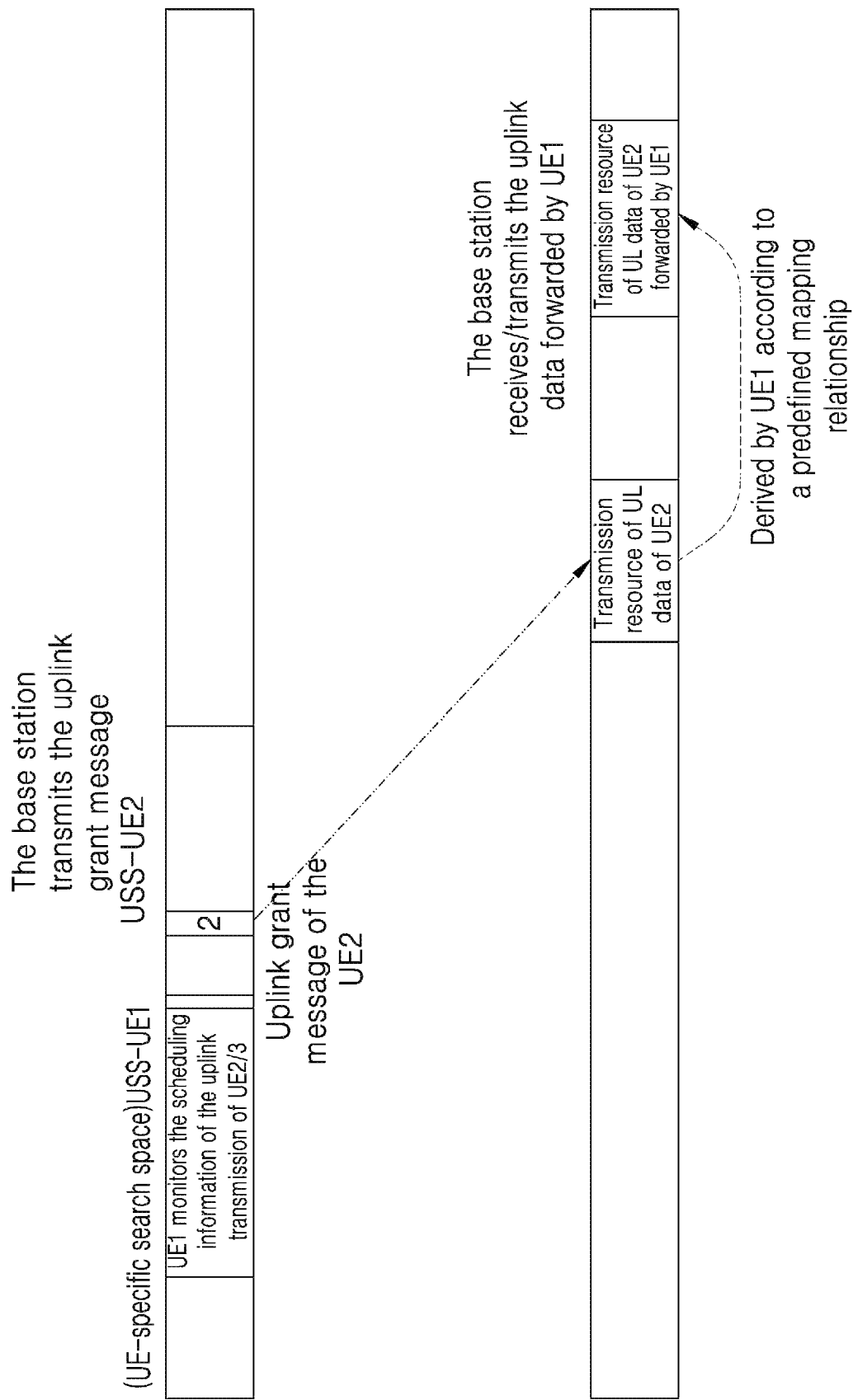
FIG. 22 is a schematic diagram of obtaining a scheduling message by the first UE through obtaining an uplink grant message transmitted by the base station in Embodiment 1.

Additionally, for UE1 to obtain the scheduling message of the uplink transmission, a combination of the three methods is used. For example, UE1 monitors the UE-specific search space of UE7 and performs blind detection by using RNTIs respectively corresponding to UE1, UE2 and UE3, and UE1 monitors the UE-specific search space of UE2 and performs blind detection by using RNTI of UE2. UE1 performs blind detection successfully by using the RNTI of the UE2 in the UE-specific search space of the UE2. In the obtained uplink grant message by decoding, the information bit explicitly indicating the target UE is the index of the mapping relationship which is configured to have an index value 0. UE1 considers the uplink grant message is the scheduling information used to indicate UE1 to forwards the uplink data of the remote UE to the base station according to the mapping index value and considers the forwarded remote UE as the UE2 according to the search space; UE1 performs blind detection successfully by using the RNTI of the UE2 in the UE-specific search space of the UE1, and obtains the uplink grant message by decoding. UE1 considers the uplink grant message is the scheduling information used to indicate UE1 to forward the uplink data of the remote UE to the base station according to the search space, and considers the forwarded remote UE as the UE2 according to RNTI By the above method, UE1 relays uplink data for UE2, and obtains two uplink grant messages transmitted by the base station by search space monitoring and blind detection using of RNTI (for example, uplink grant messages #A and #1 or #2 and #1 in FIG. 21) respectively to indicate uplink scheduling information of UE2 and uplink transmission scheduling information of UE1 forwarding the data of UE2;

or, UE1 obtains an uplink grant message (for example, uplink grant message #2 in FIG. 22) transmitted by the base station to indicate uplink scheduling information of UE2, and UE1 derives the uplink transmission scheduling information of the UE1 forwarding the data of UE2 according to the predefined mapping relationship and according to the uplink transmission scheduling information of UE2. For example, the time domain of the resource position of UE1 forwarding starts at the first valid subframe calculated from the fourth subframe after the UE2 uplink transmission ends, and the frequency domain position uses the carrier and repetition number pre-configured by the base station; or, similarly, UE1 obtains an uplink grant message transmitted by the base station that indicates the scheduling information of uplink transmission for UE1 to forward the data of UE2, and UE1 derives the uplink transmission scheduling information for UE2 according to the predefined mapping relationship and the scheduling information of the forwarding;

or, UE1 obtains one uplink grant message transmitted by the base station, indicates the uplink transmission scheduling information of UE2, and also indicates the uplink transmission scheduling information that UE1 forwards the data of UE2. The first N1 bits in the uplink grant message are used to indicate uplink transmission scheduling information of UE2, including indicating the UE ID of the UE2 or indicating the RNTI of the UE2 or indicating an index of the mapping relationship between the UE1 and the UE2, and the last N2 bits are used to indicate the uplink transmission scheduling information that the UE1 forwards the data of the UE2;

or, the UE1 obtains two uplink grant messages transmitted by the base station, wherein one or two message contains incomplete scheduling information, and the scheduling information of the part not provided by the base station is derived and calculated according to the obtained scheduling information and predefined configuration parameters, for example, UE1 obtains the uplink grant message #2, transmitted by the base station, for scheduling the uplink transmission of the UE2, which includes the resource position of uplink transmission of UE2, and obtains the uplink grant message #1, transmitted by the base station, for scheduling the UE1 to relay the UE2, which includes the resource position of the uplink transmission of the UE1 and the number of repetitions; UE1 determines the number of repetitions of UE2 uplink transmission according to a predefined relay link configuration parameter.

UE2 and UE3 act as remote UEs, and maintain the behavior when there is no relay, that is, UE2/UE3 monitors its own DE-specific search space and uses its own RNTI to perform blind detection. When the blind detection is successfully and the uplink grant message is obtained by decoding, and data transmission is performed on the physical uplink shared channel according to the scheduled content of the message.

UE2 and UE3 obtains scheduling information transmitted by using their own uplink data, and perform uplink data transmission according to the content of the scheduling information.

UE1 acquires the uplink scheduling information of the UE2 and the UE3, and receives the uplink transmission of the UE2/UE3 according to the content of the uplink scheduling information, and successfully decodes. Wherein, the uplink transmission resource position of the UE2 and the UE3 is in an uplink subframe or an uplink frequency band, and UE1 performs downlink reception in an uplink subframe or an uplink frequency band.

UE1 obtains the scheduling information of the uplink forwarding of the UE1, which includes the scheduling information for forwarding for UE2 and scheduling information for forwarding for UE3. The UE1 forwards the uplink data of the UE2 and the UE3 that are successfully received and decoded according to the content of the scheduling information.

In this scenario, for downlink data transmission, UE2 and UE3 act as remote UEs, and maintain the behavior when there is no relay, that is, UE2 and/or UE3 monitors its own UE-specific search space and use its own RNTI to perform blind detection. When the blind detection is successfully and the downlink grant message is obtained by decoding, the data transmission of the base station is received according to the scheduled content of the message.

The UE1 acts as a relay UE and does not perform other operations after the blind detection is successfully and the downlink grant message of UE2 and/or UE3 is obtained by decoding.

The base station maintains the behavior when there is no relay, that is, the base station schedules reception of the downlink data of UE2 and/or UE3, and does not additionally transmit information related to the downlink scheduling to UE1.

Embodiment 2

This embodiment describes the operation behaviors executed by the remote node, the relay node, and the base station in the scenario in which the relay node performs relaying of uplink data and relaying of downlink data, and does not perform relaying on the DCI.

(1) For the physical uplink data channel and/or the physical uplink shared channel:

The specific operation behaviors executed by the remote node and the relay node are the same as that in Embodiment 1, and details will not be repeated herein.

(2) For physical downlink data/downlink shared channel:

The operation behaviors of the remote node include:

similar to the uplink relay, the remote node acquires scheduling information of the downlink reception from base station according to the behavior when there is no relay, and receives the downlink data message transmitted by the base station according to the content of the downlink scheduling information.

The operation behaviors of the relay node include:

1. the relay node acquires the configuration information of the relay node and the configuration information of the remote node from the base station, and the specific content is the same as that in Embodiment 1, and details will not be repeated herein.

2. the relay node acquires the scheduling information of the downlink reception of the remote node from the base station, and the specific method is the same as that in Embodiment 1, but the downlink grant message of the remote node transmitted by the base station is obtained by decoding.

3. the relay node acquires the scheduling information of the downlink relaying behavior of the relay node, and the specific method is the same as that in Embodiment 1, but the downlink grant message of the relay node transmitted by the base station is obtained by decoding.

Wherein, similarly, the information field carried in the downlink grant message is used to explicitly indicate the node scheduled by the downlink grant message, and may be the identity of the remote node (such as UE ID), or the RNTI of the remote node, or the index indicating the mapping relationship between the relay node and remote node, and a scheduling object for determining the downlink grant message.

4. The relay node receives the downlink data message transmitted by the base station to the relay node, including:

the relay node receives the physical downlink shared channel transmitted by the base station at the scheduled resource position according to the content of the obtained physical downlink shared channel scheduling information of the relay node, and successfully decodes it.

5. The relay node forwards the downlink data message transmitted by the base station to the remote node, including:

the relay node receives the content of the scheduling information of the physical downlink control channel according to the acquired remote node, and forwards the physical downlink shared channel transmitted by the base station to the remote node on the scheduled.

Wherein, the scheduled resource position may be a downlink carrier or a downlink subframe, and it is necessary for the relay node to have the capability of receiving on the downlink carrier or downlink subframe.

The behaviors of the base station include:

1. The base station configures the remote node and the relay node, the specific content is the same as that in Embodiment 1, and details will not be repeated herein.

2. The base station schedules the downlink reception of the remote node (that is, the downlink data forwarding of the relay node), and the specific method is the same as that in Embodiment 1, but the base station transmits the downlink grant message of the remote node.

3. The base station schedules the downlink reception of the relay node, and the specific method is the same as that in Embodiment 1, but the base station transmits the downlink grant message of the relay node.

Wherein, similarly, the information field carried in the downlink grant message is used to explicitly indicate the node scheduled by the downlink grant message, and may be the identity of the remote node (such as UE ID), or the RNTI of the remote node, or the index indicating the mapping relationship between the relay node and remote node, and a scheduling object for determining the downlink grant message.

4. The base station schedules the transmission between the relay node and the remote node. The specific method is the same as that in Embodiment 1, but the base station transmits the downlink grant message of the relay node and/or the remote node.

5. The base station transmits the downlink data message to the relay node, including.

The base station transmits the physical downlink shared channel to the relay node in the scheduled resource position according to the content of the scheduling information for the downlink reception of the relay node.

It is to be noted that, the above operation behavior steps are not in a time sequence. The actual time sequence of each operation behavior step needs to be determined according to the scheduling content of the base station and the content of the physical downlink control channel configuration information of the relay node and the remote node.

In the scenario of Embodiment 2, the relay node is configured to perform uplink data forwarding and downlink data forwarding, wherein the method for forwarding the uplink data the is the same as that in Embodiment 1. The method for forwarding the downlink data is similar to the method for forwarding the uplink data, but the used scheduling information herein is the downlink scheduling information which is acquired by decoding to obtain a downlink grant message in the physical downlink control channel.

The specific behavior of downlink data relaying is described below with reference to specific examples. The PDSCH in this example may also be EPDSCH, MPDSCH, or NPDSCH.

Figure 23:
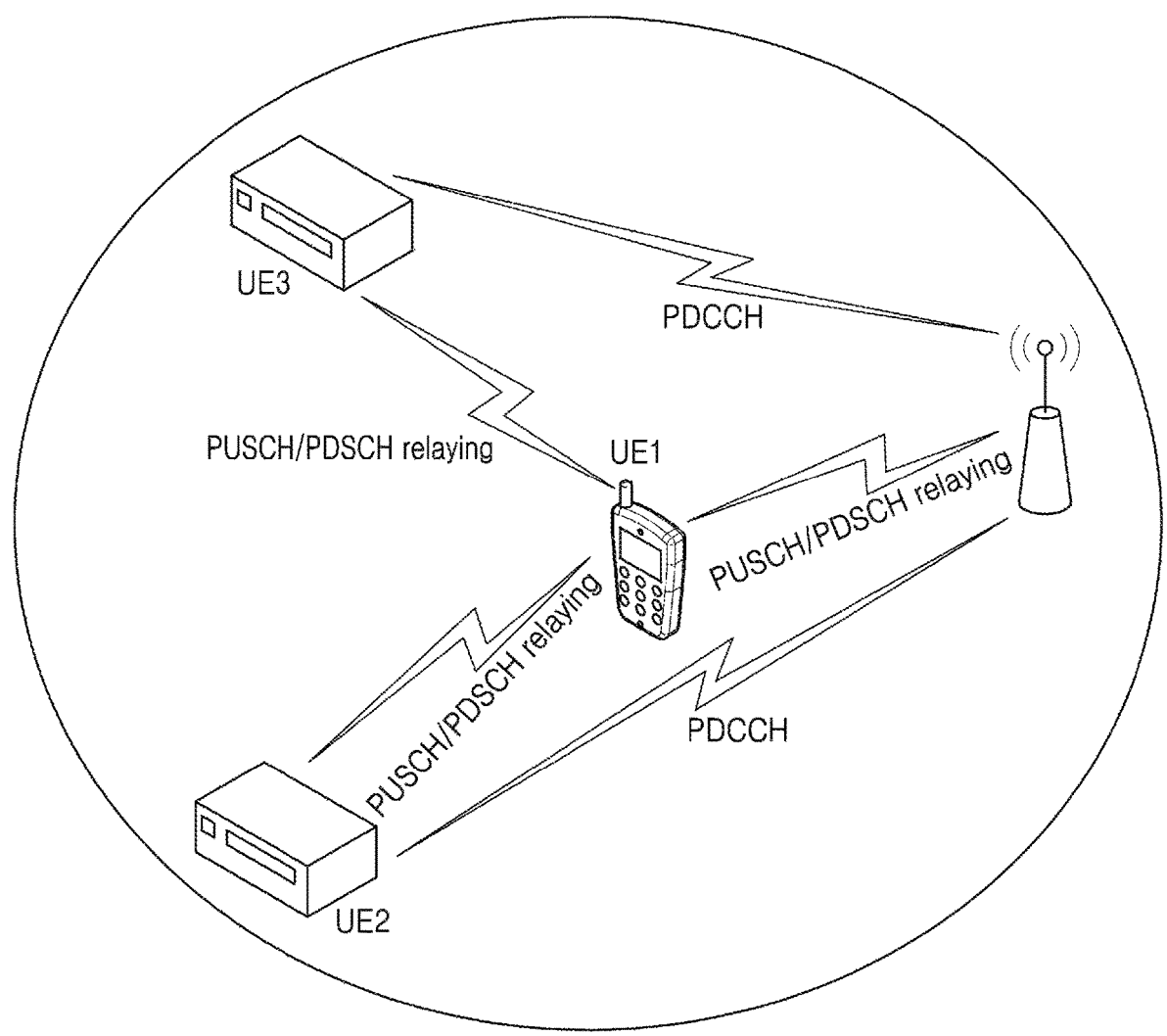
FIG. 23 is a schematic diagram of a relay node forwarding an physical uplink shared channel of a remote node and forwarding a physical downlink shared channel transmission of a base station in an embodiment of the present disclosure.

In this example, as shown in FIG. 23, UE1 is a relay node with the capability of relaying within the coverage of the cell, and UE2 and UE3 are remote nodes within the coverage of the cell. Both UE2 and UE3 use UE1 to perform relaying of the PDSCH, and both receive the PDCCH directly from the base station.

Similar to Embodiment 1, UE1 normally accesses the cell, acquires its own RNTI and various configuration information from the base station, and is configured by the base station to perform relaying of downlink data reception of UE2 and UE3, and acquires the configuration information of UE2 and UE3 from the base station through RRC signaling, the content of which is the same as that in Embodiment 1.

UE2 and UE3 have the capability of accessing the cell within the coverage of the cell. UE2 and UE3 access the cell normally, and acquire the RNTI and various configuration information from the base station. UE2 and UE3 are configured by the base station to perform relaying of downlink data reception through UE1. The configuration is transparent, that is, UE2 and UE3 do not need to know that downlink data reception is completed through relaying, and perform the downlink data reception according to the original design of the non-relay system.

UE1, UE2, and UE3 perform monitoring and blind detection by using RNTI in the configured search space in the physical downlink control channel configured by the base station to obtain a scheduling message of downlink reception.

The specific ways that the base station transmits the downlink scheduling message and UE1, UE and UE3 obtain the scheduling message of the downlink reception are the same as that Embodiment 1, but the scheduling message of the downlink reception of the physical downlink shared channel of UE 1/2/3 is carried in the downlink grant message.

UE1 obtains the scheduling information that the UE1 performs the downlink reception from the base station, which includes the scheduling information of the downlink data that needs to be forwarded to the UE2 and the scheduling information of the downlink data that needs to be forwarded to the UE3. UE1 receives the downlink data that needs to be forwarded to the UE2/UE3 transmitted by the base station according to the content of the scheduling information.

UE1 obtains the scheduling information of the downlink reception of the UE2 and UE3, and the UE1 forwards the downlink data that needs to be forwarded to the UE2/UE3 transmitted by the base station to the UE2/UE3 on corresponding resource position according to the content of the scheduling information. Wherein, the resource positions of downlink reception of UE2 and UE3 are in a downlink subframe or a downlink frequency band, and UE1 transmits in the downlink subframe or the downlink frequency band. UE2 and UE3 obtain scheduling information of their own downlink data reception, and receive downlink data according to the content of the scheduling information.

Embodiment 3

In Embodiment 3, the operation behaviors corresponding to the remote node, the relay node, and the base station in the scenario in which the relay node performs relaying of uplink data, downlink data, and DCI are described.

From the perspective of the system, the difference between Embodiment 3 and Embodiment 1 and Embodiment 2 is that the relay node additionally relays forwards the DCI transmitted by the base station to the remote node, and the remote node acquires from the relay node instead of the base station the uplink scheduling information and the downlink scheduling information, the base station does not directly transmit the DCI to the remote node, but transmit the DCI to the relay node.

From the perspective of the remote node, all the relaying operations in Embodiment 3 are transparent, that is, the remote node does not need to know that the transmission (reception) of its uplink/downlink data and DCIs is completed through relaying, and performs the transmission (reception) of uplink data and downlink data and DCIs according to the original design of the non-relay system. Therefore, the behavior of the remote node is the same as that in Embodiment 1 and/or Embodiment 2. It will not be repeated herein From the perspective of the relay node:

(1) For the physical uplink and downlink data channels/shared channels:

the method of the relay node acquiring the scheduling information of the uplink data transmission and the downlink data reception of the remote node and the relay node from the base station in Embodiment 1 and Embodiment 2 can still be used in Embodiment 3. After acquiring the scheduling information of the remote node and the relay node, the method for the relay node to perform uplink/downlink transmission (forwarding)/reception according to the content of the scheduling information is the same as that in Embodiment 1/2. It will not be repeated herein.

(2) For the physical downlink control channel:

The relay node receives the DCI of the remote node and decodes it, and forwards the successfully decoded DCI to the remote node.

Wherein, the behavior of the relay node includes:

1. The relay node acquires configuration information of the relay node and the remote node from the base station, as described in Embodiment 1 and Embodiment 2. It will not be repeated herein.

2. The relay node receives the DCI of the remote node, and reuses the method of the relay node acquiring the scheduling information of the remote node from the base station in Embodiment 1 and Embodiment 2, but all the type of control message successfully decoded of the remote node in Embodiment 3 are included in the control information of the remote node, and are not limited to the uplink grant message and/or the downlink grant message of the remote node. For example, the relay node receives and successfully decodes a Transmitter Power Control (TPC) command transmitted by the base station to the remote node, and forwards the TPC command to the remote node in the next step.

3. The relay node forwards the successfully received DCI of the remote node to the remote node, including:

The relay node receives the DCI of the remote node and decodes it successfully; the relay node determines the position of the earliest UE-specific search space of physical downlink control channel of the remote node after the decoding succeeds according to the configuration information of the remote node; the relay node forwards the DCI to the remote node in the UE-specific search space of physical downlink control channel.

From the perspective of the base station:

(1) For the physical uplink and downlink data/shared channels:

The method of base station performing uplink data reception and downlink data transmission to the remote node and/or the relay node in Embodiment 1 and Embodiment 2 is still applicable to Embodiment 3.

(2) For the physical downlink control channel:

The method of base station transmitting the scheduling information of a communication between the relay node and the base station and the scheduling information between the relay node and the remote node to the relay node in Embodiment 1 and Embodiment 2 is still applicable to Embodiment 3. The method can be similarly applicable to transmitting of the other DCIs to the remote node by the base station, and further the step of the base station transmitting the DCI of the remote node to the relay node. The base station will not transmit the DCI to the remote node additionally, except for the relay node.

Further, the base station determines the position of the earliest UE-specific search space of physical downlink control channel of the remote node after the relay node decodes the DCI of the remote node that needs to be forwarded, according to the physical shared channel and the physical control channel configuration information of the relay node and the remote node, determines the content of the base station performing resource scheduling for the remote node and/or the relay node in the control message according to the position, and adjusts the timing of the transmitting behavior and/or the timing of the receiving behavior of the base station accordingly.

The relaying method of the DCI is described below based on the scenario of Embodiment 3. The PDCCH in this example may also be an EPDCCH, an MPDCCH, or an NPDCCH.

Figure 24:
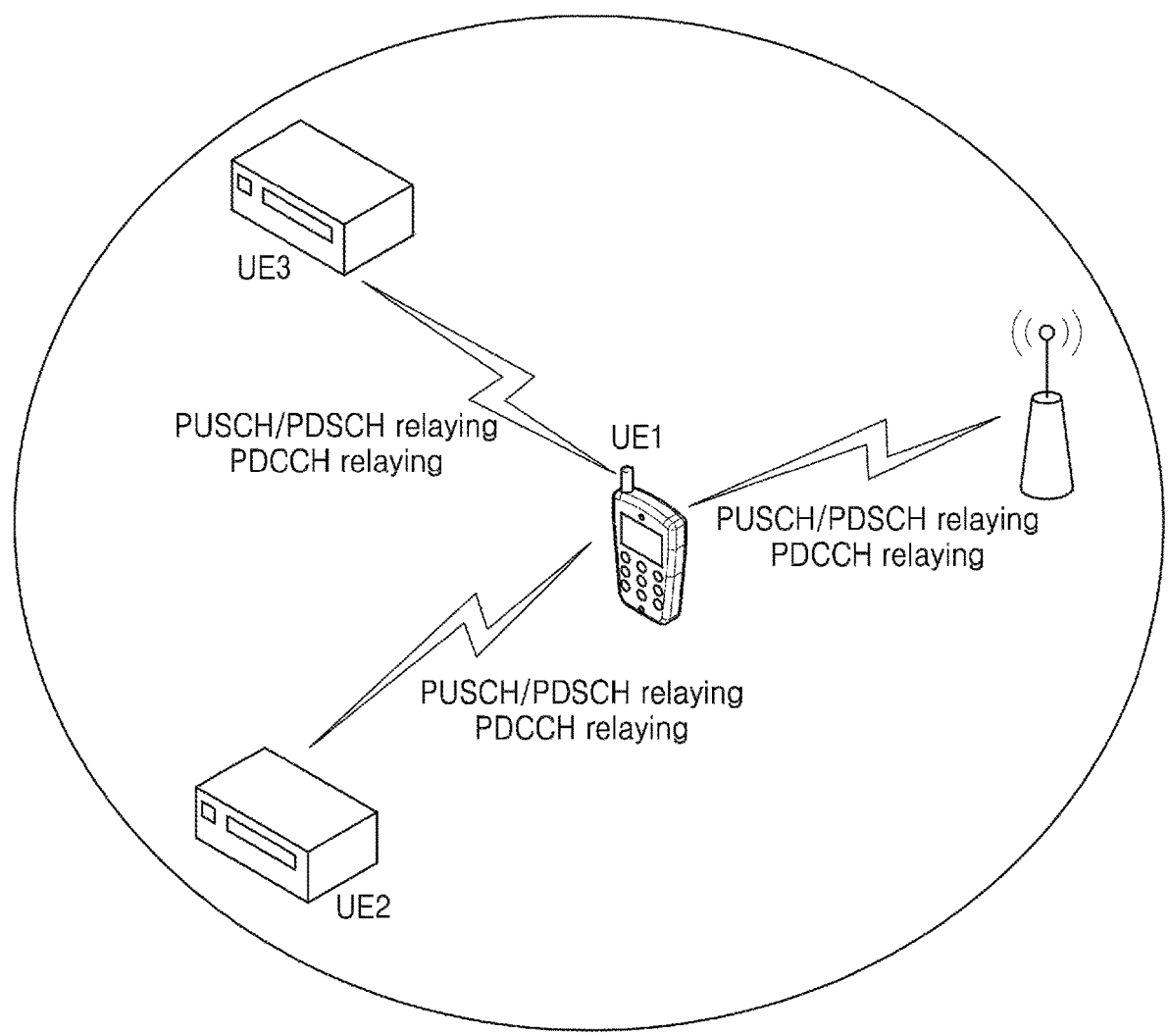
FIG. 24 is a schematic diagram of a relay node forwarding an physical uplink shared channel of a remote node and forwarding a physical downlink shared channel transmission and a physical downlink control channel transmission of a base station in an embodiment of the present disclosure.

In this example, as shown in FIG. 24, UE1 is a relaying node with the capability of relaying within the coverage of the cell, and UE2 and UE3 are remote nodes within the coverage of the cell. Both UE2 and UE3 use UE1 to perform forwarding of the PUSCH, the PDCCH, and the PDSCH.

Similar to Embodiment 1 and Embodiment 2, UE1 accesses the cell normally, acquires its own RNTI and various configuration information from the base station, and is configured by the base station to perform relaying of physical downlink control channel of UE2 and UE3, and acquires the configuration information of the UE2 and UE3 from the base station through RRC signaling, the content of which is the same as that in Embodiment 1 and Embodiment 2. It will not be repeated herein.

UE2 and UE3 have the capability of accessing the cell within the coverage of the cell. UE2 and UE3 access the cell normally, and acquire its own RNTIs and various configuration information from the base station. UE2 and UE3 are configured by the base station to perform relaying of physical downlink control channel through UE1. The configuration is transparent, that is, UE2 and UE3 do not need to know that physical downlink control channel reception is completed through relaying, and perform the DCI reception according to the original design of the non-relay system.

The specific way the UE1 obtains the DCI is the same as the way the UE obtains the scheduling message of downlink reception in Embodiment 1 and Embodiment 2. As shown in FIG. 19 or FIG. 20, UE1 obtains, by decoding, the DCI #1 and the DCI #3 of UE1, the DCI #2 of UE2, and the DCI #4 of UE3. It should be noted that the methods in Embodiments 1 and 2 also support that UE1 obtains the DCI of UE2 in the UE-specific search space of UE2 by decoding, and the DCI transmitted by the base station may be decoded by UE2 through blind detecting the UE-specific search space, and may not be directly decoded by UE2 due to link quality, etc., and both does not affect the process in which UE1 relays the DCIs.

Figure 25:
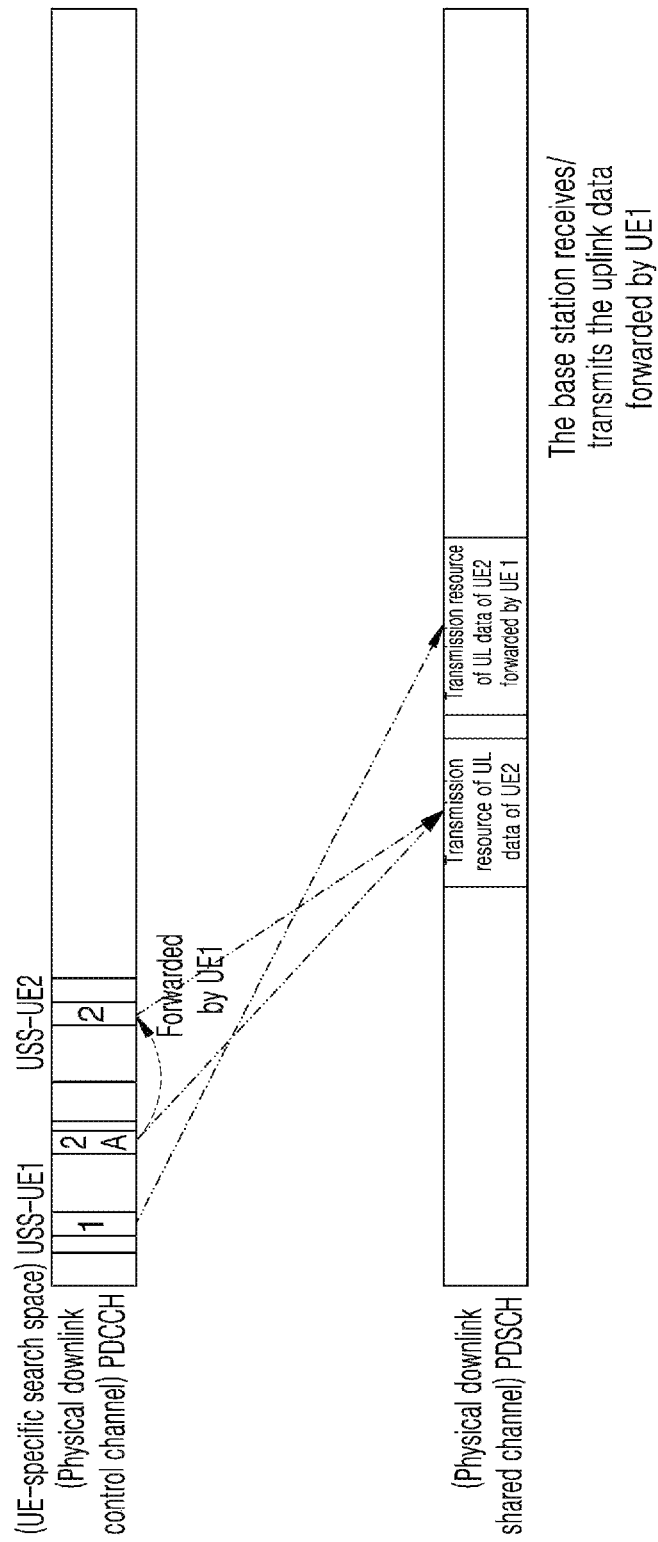
FIG. 25 is a schematic diagram of the position of the earliest UE-specific search space of physical downlink control channel of UE2 and/or the position of the earliest UE-specific search space of physical downlink control channel of UE3 after UE1 decodes successfully, being in the same period with the UE-specific search space of physical downlink control channel of UE in which the UE1 decodes successfully.
Figure 26:
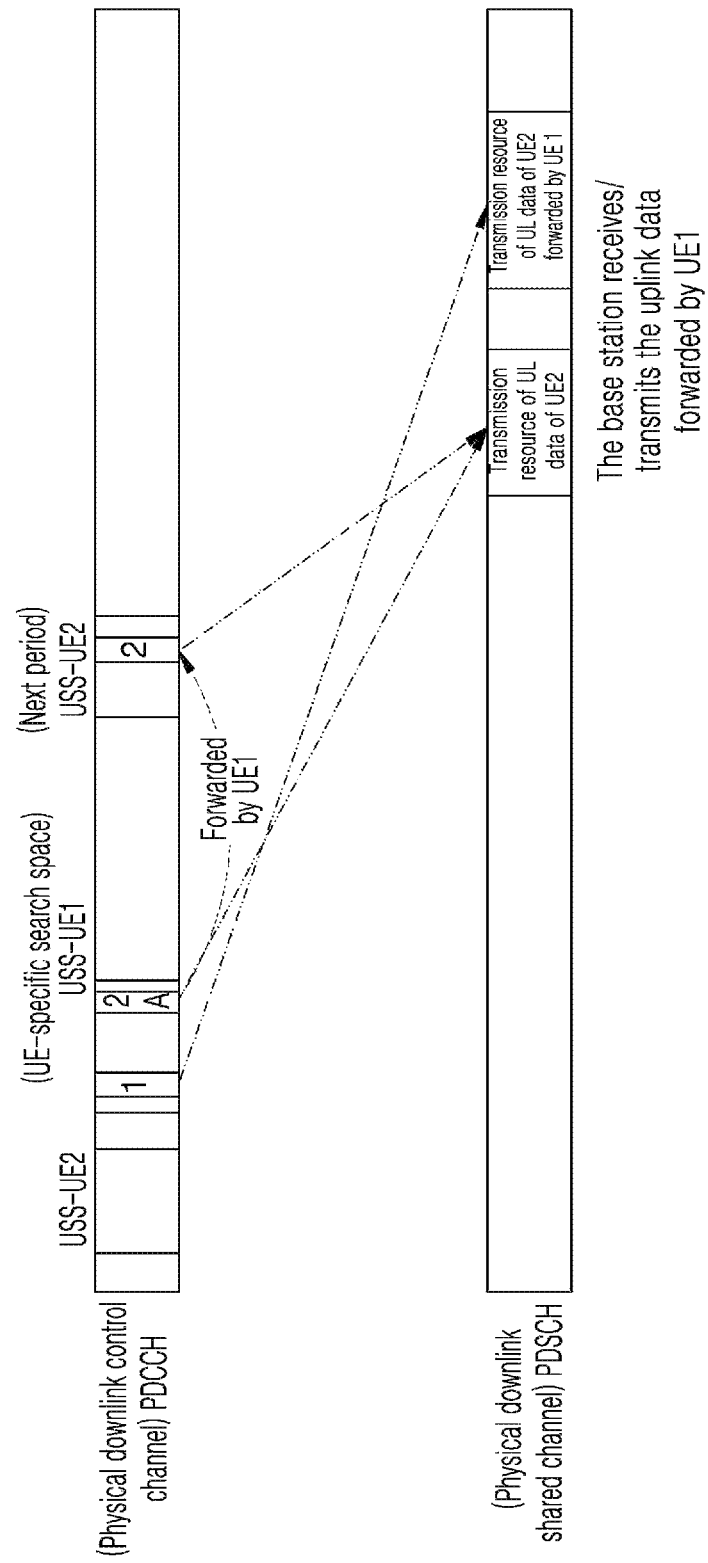
FIG. 26 is a schematic diagram of the position of the earliest UE-specific search space of physical downlink control channel of UE2 and/or the position of the earliest UE-specific search space of physical downlink control channel of UE3 after UE1 decodes successfully, being in the different periods from the UE-specific search space of physical downlink control channel of UE in which the UE1 decodes successfully.
Figure 27:
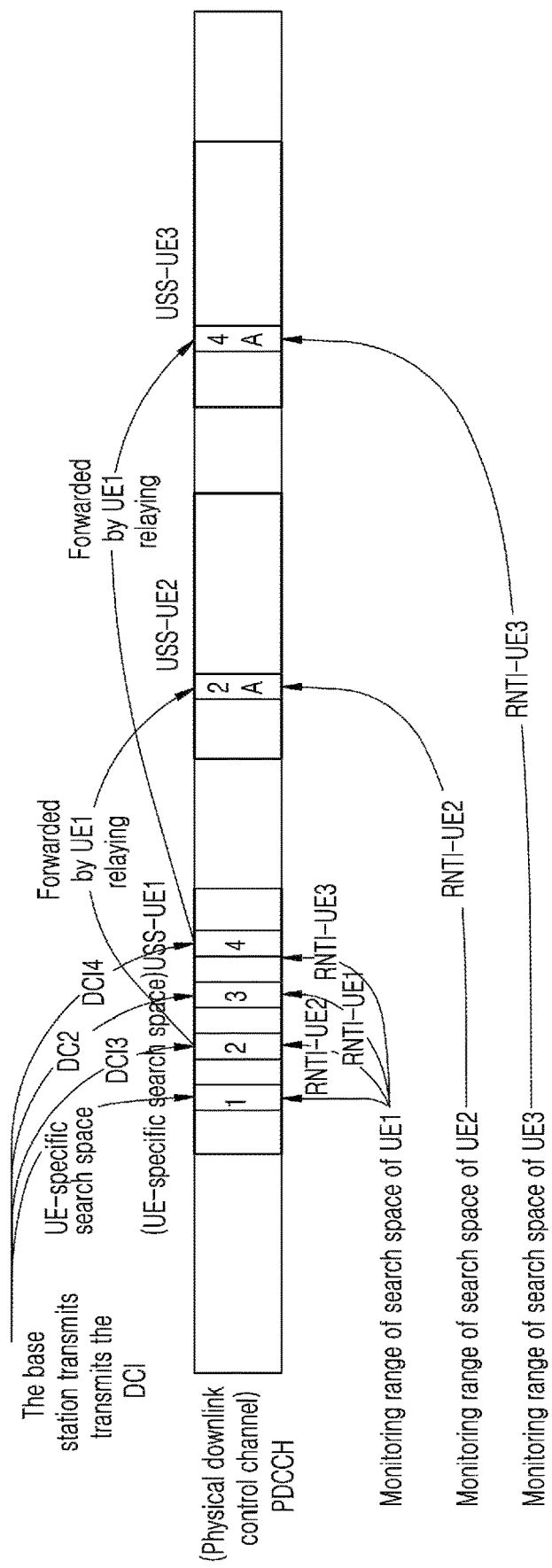
FIG. 27 is a schematic diagram of relaying of DCIs of UE2 and/or UE at a candidate position in a UE-specific search space of UE2 and/or UE3.
Figure 28:
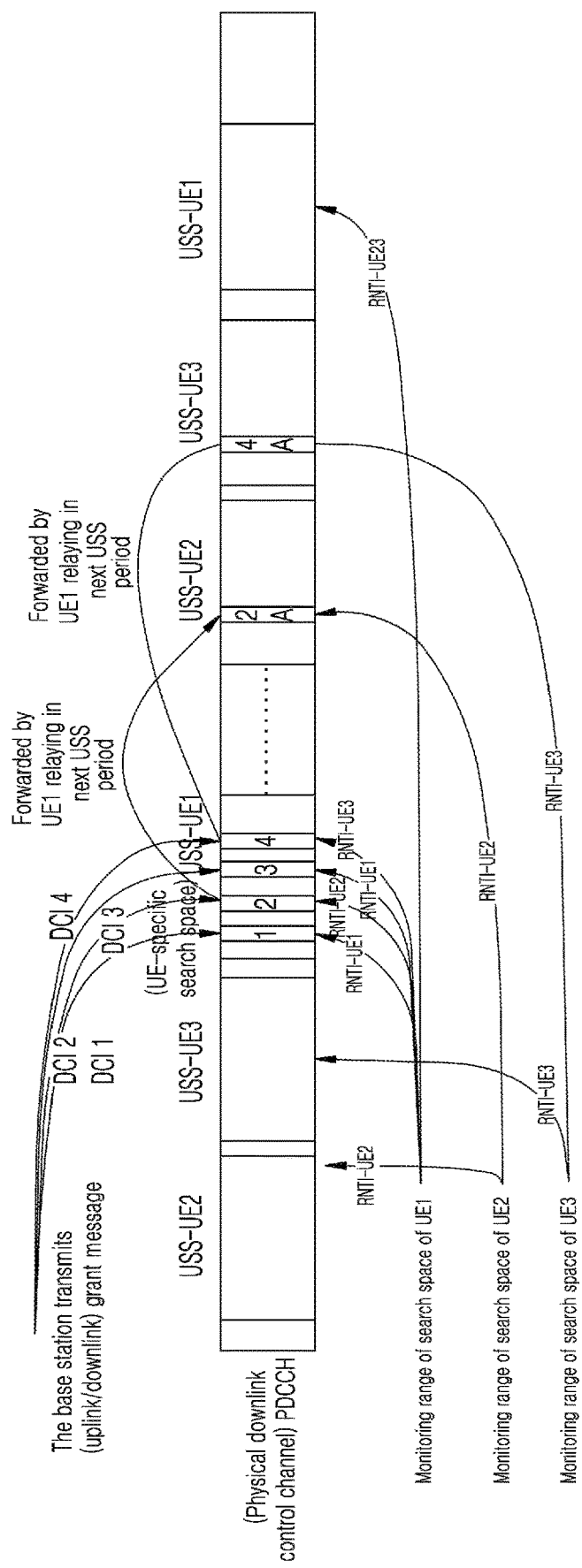
FIG. 28 is a schematic diagram of the resource position scheduled by the base station for the uplink/downlink data transmission is not earlier than the n subframes after the end position of the earliest UE-specific search space of the UE2 and/or the UE3 after the UE1 completes decoding.

UE1 relays the DCI #2 and the DCI #4. UE1 determines the position of the earliest UE-specific search space of physical downlink control channel of UE2 and/or the position of the earliest UE-specific search space of physical downlink control channel of UE3 according to the control channel configuration message of the UE2 and/or the control channel configuration message of the UE3. The position may be in the same period or in a different period as the UE-specific search space of physical downlink control channel of UE1, as shown in FIG. 25 and FIG. 26. UE11 determines the candidate position and physical layer parameters of the DCI in the position of the UE-specific control space of the physical downlink control channel of the UE2 and/or the UE3 according to the control channel configuration message of the UE2 and/or the control channel configuration message of the UE3; accordingly, the DCIs of UE2 and/or UE3 are relayed at candidate positions in the UE-specific search space of UE2 and/or UE3, as shown in FIG. 27. When the base station schedules the resource position of the data transmission/reception for UE1 and UE2/3, the base station determines the positions of UE-specific search space of the UE1 and UE2 and/or UE3 according to the physical downlink control channel configuration information of UE1 and UE2 and/or UE3, and calculates the position of the earliest UE-specific search space of UE2 and/or UE3, after decoding the DCI that needs to be forwarded by UE1, and determining the earliest start position of the resource scheduling according to the position. For example, when UE1 forwards the grant message of the uplink data or downlink data for UE2 and/or UE3, the resource position scheduled by the base station for the uplink/downlink data transmission is not earlier than the n subframes after the end position of the earliest UE-specific search space of UE2 and/or UE3 after UE1 completes decoding, as shown in the FIG. 28.

UE2 and UE3 act as remote ULs, and maintain the behavior when there is no relay, that is, UE2 and/or UE3 monitor its own UE-specific search space and perform blind detection by using its own RNTI, and obtain the DCI by decoding when the blind detection is successfully.

Embodiment 4

In Embodiment 1, Embodiment 2, and Embodiment 3, the relay node does not change the message content or information bits of the forwarded uplink data and/or the downlink data and the DCI, and changes or does not change transmission parameters, such as the repetition number, modulation and coding scheme (MCS). For example, when the transmission parameters configured by the base station for the remote node and the forwarding transmission parameters configured for the relay node are different, the forwarding is performed according to the transmission parameters configured by the base station.

Further, the relay node changes the forwarded message content or information bits during forwarding.

For example, when the relay node forwards the DCI for the remote node, the number of repetitions and the MCS in the DCI transmitted by the base station to the remote node are changed according to the link quality from the relay node to the remote node.

Figure 29:
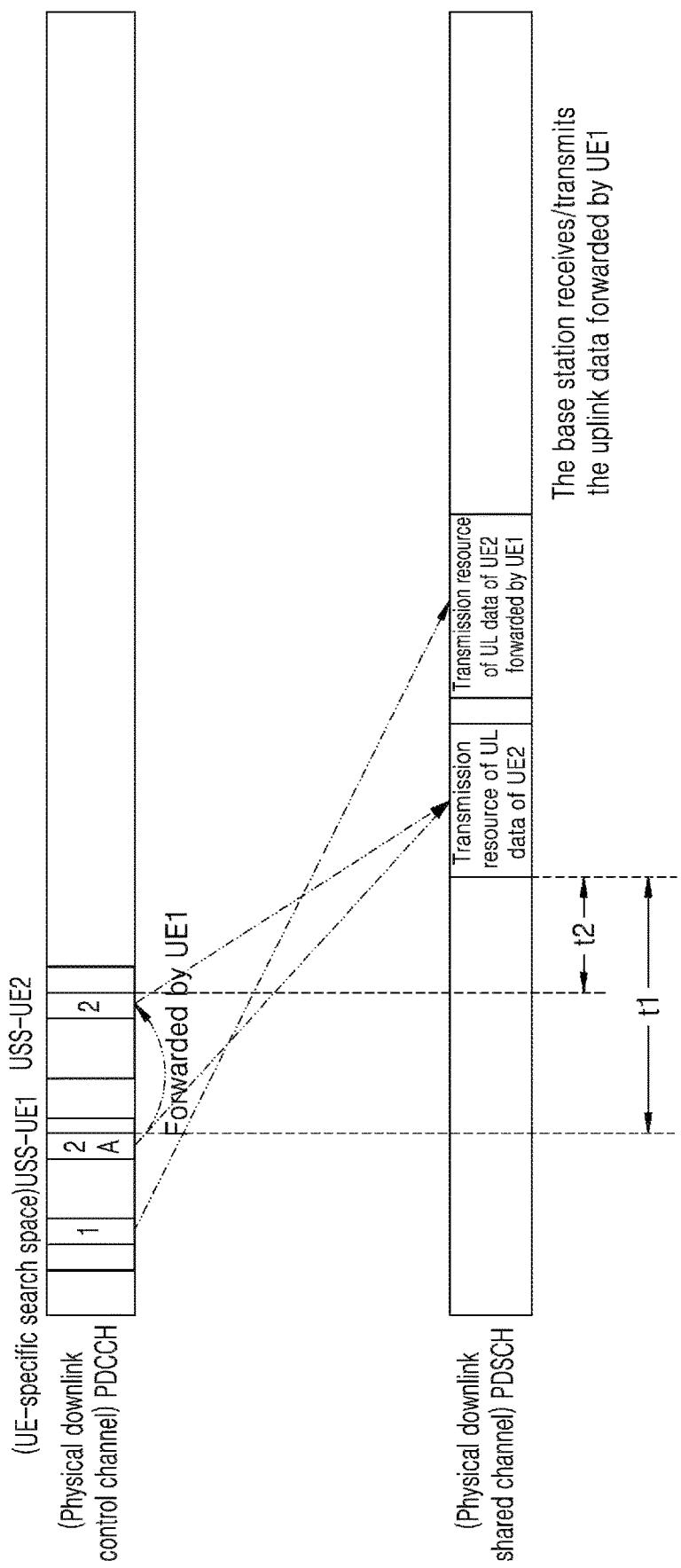
FIG. 29 is a schematic diagram of an example of forwarding an uplink data.

For another example, in a scenario where the relay node forwards the DCI of the data transmission for the remote node, the resource position where the remote node performs the uplink and downlink data transmission (reception) is indicated in the form of the time domain offset (which may be the number of subframes) between the data transmission resource and the control message transmission resource in the DCI for scheduling. In the uplink grant message and/or the downlink grant message that needs to be forwarded transmitted by the base station to the relay node, the indicated offset is the offset between the uplink grant message and/or downlink grant message and the data resources of the remote node; when the relay node forwards the uplink and/or downlink grant message to the remote node, the relay node changes the value of the offset indicated in the control message forwarded by the relay node according to the time domain position of the actual transmission resource of control message of the relay node and the data resource position of remote node calculated by the relay node. FIG. 29 is an example of uplink data forwarding, in the uplink grant message #2A transmitted by the base station to the relay node for indicating the data resource position of the remote node, the indicated offset is t1; in the uplink grant message #2 forwarded by the relay node to the remote node, the message field is modified, and the indicated offset is t2.

In addition, Embodiment 1, Embodiment 2, and Embodiment 3 describe a transparent relaying method, in which the remote node does not know whether the transmission and/or reception of the shared and/or control channel is completed through the relay node. Additionally, the system may also use a non-transparent relaying method, that is, the remote node knows that the transmission and/or reception of its shared and/or control channel is completed through relaying. Further, the remote node does not know the identity of the relay node, or know that the relay node is a specific UE.

For the case of non-transparent transmission, the remote node acquires configuration information of the remote node itself from the relay node through RRC signaling; further, the remote node acquires configuration information of the relay node from the base station through RRC signaling. Wherein the configuration information of the remote node and/or the configuration information of the relay node include: a UE ID, an RNTI, physical downlink control channel configuration information, and shared channel configuration information.

Through this design, the remote node outside the coverage of the cell has the capability of acquiring its own configuration information, thereby enabling communication with the base station through the forwarding of the relay node, so that the scenario range supported by the design includes the remote nodes within the coverage of cell and the remote nodes outside the coverage of cell.

Further, the remote node has obtained configuration information of the relay node from the base station through RRC signaling, and the remote node uses the RNTI of the relay node in its own UE-specific search space to perform blind detection, and the blind detection succeeds and obtains the DCI by decoding, and determines an indication object of the DCI according to a search space used by the DCI and/or a RNTI for blind detection and/or a carried target-UE information bit, and other operations is performed according to content in the DCI For example, a remote node obtains its own uplink data scheduling information and uplink forwarding scheduling information of the relay node, and performs uplink transmission in a cooperative manner with the relay node in the forwarding resource position of the relay node, thereby enhancing transmission power.

Figure 30:
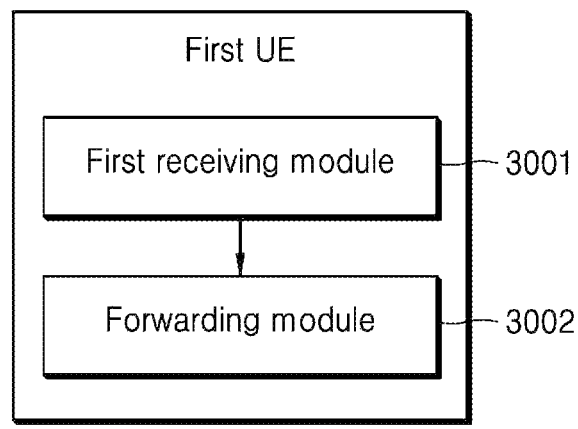
FIG. 30 is a schematic structural diagram of a device of a first UE in an embodiment of the present disclosure.

The embodiment of the present disclosure provides a first UL, as shown in FIG. 30, including: a first receiving module 3001, a forwarding module 3002, wherein:

the first receiving module 3001 is configured to receive configuration information transmitted by the base station.

Wherein, the configuration information is used to receive information of the second UE.

The first receiving module 3001 is further configured to receive the information of the second UL according to the configuration information.

The forwarding module 3002 is configured to forward the information of the second UE received by the first receiving module 3001.

Wherein, the configuration information includes at least one of the followings:

an identity of the second UE, RNTI information of the second UE, physical downlink control channel configuration information of the second UE, physical downlink control channel configuration information of the first UE, shared channel configuration information of the first LE, and shared channel configuration information of the second UE;

wherein, the physical downlink control channel configuration information includes at least one of the followings: a physical downlink control channel search space type, a maximum repetition number Rmax, a starting subframe, an offset, valid subframes, a DCI format, and a physical downlink control channel resource configuration information;

the shared channel configuration information includes at least one of the followings: configuration information of the physical uplink shared channel, configuration information of the physical downlink shared channel, transmission mode of the shared channel, reference signal information, uplink valid subframes, downlink valid subframes, and HARQ process parameters and a control region size within subframe.

Specifically, the first receiving module 3001 is configured to acquire physical downlink control channel configuration information of the second UE and/or physical downlink control channel configuration information of the first UE according to the configuration information; monitors the physical downlink control channel of the second UE and/or physical downlink control channel of the first UE according to the acquired physical downlink control channel configuration information of the second UE and/or physical downlink control channel configuration information of the first UE; and obtain the first scheduling information by decoding, wherein the first scheduling information is used for indicating the reception of the shared channel of the second UE.

The first receiving module 3001 is further configured to receive data information of the second UE according to the first scheduling information.

Specifically, the first receiving module 3001 is specifically further configured to receive uplink data information of the second UE on the physical uplink shared channel of the second UE according to the first scheduling information.

The first receiving module 3001 is specifically further configured to receive downlink data information of the second UE on the physical downlink shared channel of the second UE or the physical downlink shared channel of the first UE according to the first scheduling information.

Wherein, the uplink data information of the second UE is transmitted by the second UE according to the control information directly received by the base station, or the uplink data information of the second UE is transmitted by the second UE according to the control information forwarded by the first UE.

Specifically, the forwarding module 3002 is specifically configured to receive second scheduling information transmitted by the base station.

Wherein, the second scheduling information is used for the first UE to forward data information of the second UE.

The forwarding module 3002 is further specifically configured to forward the received data information of the second UE according to the second scheduling information.

Wherein, the data information of the second UE is received at the second UE according to the control information directly received from the base station, or the data information of the second UE is received at the second UE according to the control information forwarded by the first UE.

Specifically, the first receiving module 3001 is further configured to monitor the physical downlink control channel of the second UE and/or the physical downlink control channel of the first UE, and obtain the second scheduling information by decoding.

Specifically, the forwarding module 3002 is further specifically configured to add a Medium Access Control (MAC) header or a radio link control (RLC) header before received data information of the second UE.

The forwarding module 3002 is further specifically configured to forward data information of the second UE after adding the header.

Specifically, the first receiving module 3001 is further specifically configured to acquire physical downlink control channel configuration information of the second UE and/or physical downlink control channel configuration information of the first UE according to the configuration information.

The first receiving module 3001 is further specifically configured to: monitor the physical downlink control channel of the first UE and/or the physical downlink control channel of the second UE according to the acquired physical downlink control channel configuration information of the second UE and/or physical downlink control channel configuration information of the first UE, and obtain the DCI of the second UE by decoding.

The forwarding module 3002 is further specifically configured to forward the DCI of the second UE to the second UE on the physical downlink control channel of the second UE.

Further, the device further includes: a determining module 3003 (not shown).

The determining module 3003 is configured to determine whether the control information which is obtained by decoding according to the configuration information is used to schedule the first UE and/or the second TE, according to at least one piece of the following information: the information bits carried in the control message, scrambled RNTI of the control information, and a search space for decoding the control information.

Wherein, the content carried in the information bit includes at least one of the followings: an identity of the first UE, an identity of the second UE, an RNTI of the first UE, an RNTI of the second UE, and identification information of the mapping relationship between a first UE and the second UE.

The embodiment of the present disclosure provides a first UE. Compared with the prior art, the first UE in the embodiment of the present disclosure receives configuration information transmitted by a base station, wherein the configuration information is used to receive information of the second UE, and receives the information of the second UE according to the configuration information, then forwards the received information of the second UE, so that the base station and the remote node (the second UE) can perform relay transmission through the relay node (the first UE).

Figure 31:
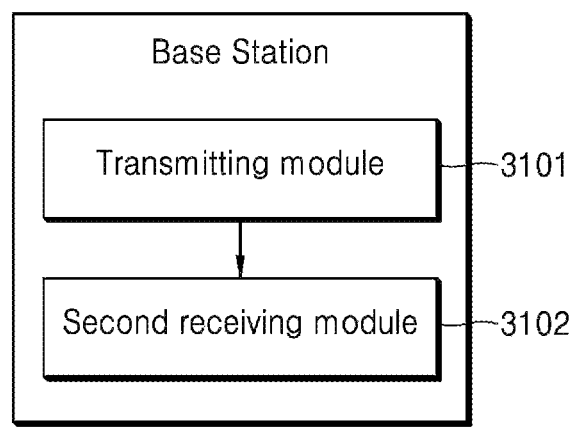
FIG. 31 is a schematic structural diagram of a device of a base station in an embodiment of the present disclosure.

An embodiment of the present disclosure provides a base station, as shown in FIG. 31, including: a transmitting module 3101, and a second receiving module 3102, wherein: the transmitting module 3101 is configured to transmit configuration information to the first UE.

The transmitting module 3101 is further configured to transmit information of the second UE to the second UE through the first UE according to the configuration information.

The second receiving module 3102 is configured to receive information of the second UE forwarded by the first UE according to the configuration information.

Wherein, the configuration information is used to forward information of the second UE at the first UE.

Wherein, the configuration information includes at least one of the followings: an identity of the second UE, RNTI information of the second UE, physical downlink control channel configuration information of the second UE, physical downlink control channel configuration information of the first UE, shared channel configuration information of the first UE, and shared channel configuration information of second UE;

wherein, the physical downlink control channel configuration information includes at least one of the followings: a physical downlink control channel search space type, a maximum repetition number Rmax, a starting subframe, an offset, valid subframes, a DCI format, and a physical downlink control channel resource configuration information;

the shared channel configuration information includes at least one of the followings: configuration information of the physical uplink shared channel, configuration information of the physical downlink shared channel, transmission mode of the shared channel, reference signal information, uplink valid subframes, downlink valid subframes, and HARQ process parameters and a control region size within subframe.

The transmitting module 3101 is specifically configured to transmit the control information and data information of the second UE to the second UE through the first UE according to the configuration information.

The transmitting module 3101 is further specifically configured to transmit the control information to the second UE, and transmit the data information of the second UE to the second UE through the first UE according to the configuration information.

The second receiving module 3102 is specifically configured to transmit the control information of the second UE to the second UE through the first UE according to the configuration information, and receive the data information of the second UE that is forwarded by the first UE.

The second receiving module 3102 is further specifically configured to transmit control information to the second UE by the base station according to the configuration information, and receive data information of the second UE that is forwarded by the first UE.

The transmitting module 3101 is further specifically configured to transmit the second scheduling information and the first scheduling information to the first UE on the physical downlink control channel of the second UE and/or the physical downlink control channel of the first UE according to the configuration information.

Wherein, the first scheduling information is used for the first UE to receive the data information of the second UE, and the second scheduling information is used for the first UE to forward the data information of the second UE.

The transmitting module 3101 is further specifically configured to transmit the data information of the second U to the second UE through the first UE based on the second scheduling information and the first scheduling information.

The transmitting module 3101 is further specifically configured to transmit the control information of the second UE to the second UE through the first UE on the physical downlink control channel of the first UE and/or the physical downlink control channel of the second UE according to the configuration information.

The second receiving module 3102 is further specifically configured to transmit the second scheduling information and the first scheduling information to the first UE on the physical downlink control channel of the second UE and/or the physical downlink control channel of the first UE according to the configuration information.

Wherein, the first scheduling information is used for indicating the reception of the shared channel of the second UE, and the second scheduling information is used for the first UE to forward the data information of the second UE.

The second receiving module 3102 is further specifically configured to receive the data information of the second UE that is forwarded through the first UE based on the second scheduling information and the first scheduling information.

The embodiment of the present disclosure provides a base station. Compared with the prior art, the base station in the embodiment of the present disclosure transmits the configuration information to the first UE, and then the base station transmits the information of the second E to the second UE through the first UE according to the configuration information; and/or, the base station receives the information of the second UE that is forwarded by the first UE according to the configuration information, wherein the configuration information is used to forward the information of the second UE at the first UE, (second UE).

A further embodiment of the present disclosure provides a first UE, including: a processor; and a memory configured to store machine readable instructions, wherein the instructions that, when executed by the processor, cause the processor to perform the method of relay transmission.

Yet another embodiment of the present disclosure provides a base station, including: a processor; and a memory configured to store machine readable instructions that, when executed by the processor, cause the processor to perform the method of relay transmission.

Figure 32:
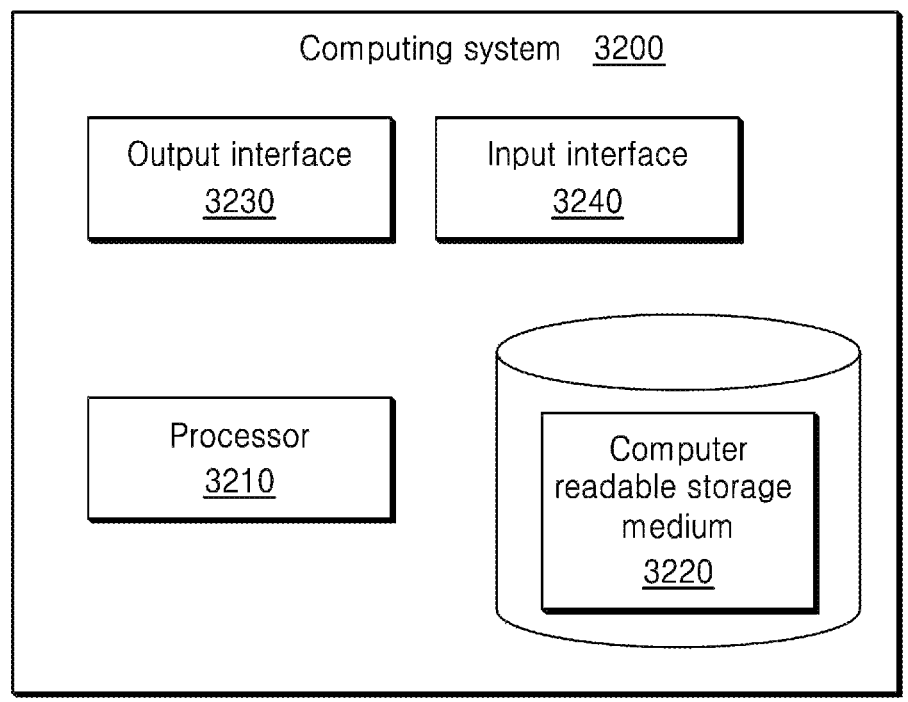
FIG. 32 is a block diagram of a computing system of a base station or a user equipment in an embodiment of the present disclosure.

FIG. 32 schematically illustrates a block diagram that a computing system that can be used to implement a base station or user equipment of the present disclosure according to an embodiment of the present disclosure.

As shown in FIG. 32, a computing system 3200 includes a processor 3210, a computer readable storage medium 3220, an output interface 3230, and an input interface 3240. The computing system 3200 can perform the method described above with reference to FIG. 15 or FIG. 16 to configure a reference signal and perform data transmission based on the reference signal.

Specifically, the processor 3210 can include, for example, a general-purpose microprocessor, an instruction set processor, and/or a related chipset and/or a special-purpose microprocessor (e.g., an application specific integrated circuit (ASIC)), and the like. The processor 3210 may also include an onboard memory for caching purposes. The processor 3210 may be a single processing unit or multiple processing units for performing different actions of the method flow described with reference to FIG. 15 or FIG. 16.

Computer readable storage medium 3220, for example, can be any medium that can contain, store, transfer, propagate, or propagation instructions. For example, a readable storage medium may include, but is not limited to, an electronic, magnetic, optical, electromagnetic, infrared, or semiconductor system, apparatus, device, or propagation medium. Specific examples of the readable storage medium include: a magnetic storage device such as a magnetic tape or a hard disk (HDD); an optical storage device such as a compact disk (CD-ROM); a memory such as a random-access memory (RAM) or a flash memory; and/or a wired/wireless communication link.

The computer readable storage medium 3220 can include a computer program, which can include code/computer executable instructions that, when executed by the processor 3210, cause the processor 321 to perform, for example, the method flow described above with reference to FIG. 15 or FIG. 16, and any variations thereof.

The computer program can be configured to have, for example, computer program code including a computer program module. For example, in an example embodiment, the code in a computer program can include one or more program modules, including, for example, module 1, module 2, 쳄 It should be noted that the division manner and number of modules are not fixed, and those skilled in the art may use suitable program modules or program module combinations according to actual situations. When these program module combinations are executed by the processor 3210, the processor 3210 can perform the method flow, for example, described above with reference to FIG. 15 or FIG. 16, and any variations thereof.

According to an embodiment of the present disclosure, the processor 3210 may use the output interface 3230 and the input interface 3240 to perform the method flow described above with reference to FIG. 15 or FIG. 16 and any variations thereof.

Figure 33:
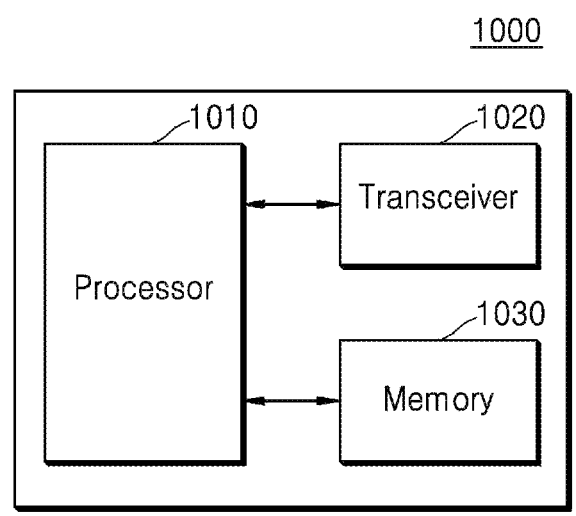
FIG. 33 is a diagram illustrating a device according to another embodiment of the present disclosure.

FIG. 33 is a diagram illustrating a device 1000 according to another embodiment of the present disclosure.

Referring to the FIG. 33, the device 1000 may include a processor 1010, a transceiver 1020 and a memory 1030. However, all of the illustrated components are not essential. The device 1000 may be implemented by more or less components than those illustrated in FIG. 33. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the device 1000 may be implemented by the processor 1010.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the device 1000. The memory 1030 may be connected to the processor 1010 and store at least one instruction or a protocol or a parameter for the proposed function, process, and/or method. The memory 1030 may include read-only memory (ROM) and/ or random access memory (RAM) and/or hard disk and/or CD-ROM and/or DVD and/or other storage devices.

The embodiment of the present disclosure provides a first UE. Compared with the prior art, the first UE in the embodiment of the present disclosure receives configuration information transmitted by a base station, wherein the configuration information is used to receive information of the second E, and receives the information of the second UE according to the configuration information, then forwards the received information of the second UE, so that the relay transmission can be performed between the base station and the remote node (second UE) through the relay node (first UE).

The embodiment of the present disclosure provides a base station. Compared with the prior art, the base station base station in the embodiment of the present disclosure transmits configuration information to the first UE, and then the base station transmits information of the second UE to the second UE by using the first UE according to the configuration information; and/or, the base station receives the information of the second UE that is forwarded by the first UE according to the configuration information, wherein the configuration information is used to forward the information of the second UE at the first UE, so that the relay transmission can be performed between the base station and the remote node (second UE) through the relay node (first UE).

It should be understood by those skilled in the art that the present disclosure involves devices for carrying out one or more of operations as described in the present disclosure. Those devices can be specially designed and nanufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present disclosure may be alternated, changed, combined or deleted. Further, other steps, measures and solutions in the operations, methods and flows already discussed in the present disclosure can also be alternated, changed, rearranged, decomposed, combined or deleted. Further, the steps, measures and solutions of the prior art in the operations, methods and operations disclosed in the present disclosure can also be alternated, changed, rearranged, decomposed, combined or deleted.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

What is claimed is:

1. A method of performing communication, by a user equipment (UE), in a wireless communication system, the method comprising:
    receiving configuration information including time-domain information of indication information via higher layer signaling;
    identifying a time gap between a time position where the UE starts to monitor a first physical downlink control channel (PDCCH) for detection of the indication information and a position where the UE starts to monitor a second PDCCH, based on the time-domain information;
    monitoring the first PDCCH for detecting the indication information based on the identified time gap; and
    monitoring the second PDCCH, based on the indication information detected via the first PDCCH.

2. The method of claim 1, wherein the monitoring of the first PDCCH is not required during a predetermined period prior to the position where the UE starts to monitor the second PDCCH.

3. The method of claim 1, wherein the monitoring of the first PDCCH comprises monitoring the first PDCCH for receiving the indication information on an anchor cell in which a synchronization signal is provided.

4. The method of claim 1, wherein the indication information is configured for one or more UEs including the UE.

5. A method of performing communication, by abase station (BS), in a wireless communication system, the method comprising:
    transmitting, to a user equipment (UE), configuration information including time-domain information of indication information including wake up indication via higher layer signaling;
    identifying a time gap between a time position where the UE starts to monitor a first physical downlink control channel (PDCCH) for detection of the indication information and a position where the UE starts to monitor a second PDCCH, based on the time-domain information; and
    transmitting, to the UE, the indication information via the first PDCCH based on the identified time gap,
    wherein the second PDCCH is monitored at the UE based on the indication information detected via the first PDCCH.

6. The method of claim 5, wherein, the UE is not required to monitor the first PDCCH during a predetermined period prior to the position where the UE starts to monitor the second PDCCH.

7. The method of claim 5, wherein the first PDCCH is monitored at the UE for receiving the indication information on an anchor cell in which a synchronization signal is provided.

8. The method of claim 5, wherein the indication information is configured for one or more UEs including the UE.

9. A base station (BS) of performing communication, in a wireless communication system, the BS comprising:

a transceiver; and a processor configured to:

transmit, via the transceiver to a user equipment (UE), configuration information including time-domain information of indication information including wake up indication via higher layer signaling, identify a time gap between a time position where the UE starts to monitor a first physical downlink control channel (PDCCH) for detection of the indication information and a position where the UE starts to monitor a second PDCCH, based on the indication information, and transmit, via the transceiver to the UE, the indication information via the first PDCCH, based on the identified time gap, wherein the second PDCCH is monitored at the UE based on the indication information detected via the first PDCCH.

10. The BS of claim 9, wherein, the UE is not required to monitor the first PDCCH during a predetermined period prior to the position where the UE starts to monitor the second PDCCH.

11. The BS of claim 9, wherein the first PDCCH is monitored at the UE for receiving the indication information on an anchor cell in which a synchronization signal is provided.

12. The BS of claim 9, wherein the indication information is configured for one or more UEs including the UE.

* * * * *